(12) United States Patent
Morisaki

(10) Patent No.: US 9,544,548 B2
(45) Date of Patent: Jan. 10, 2017

(54) OBJECT IMAGE DISPLAYING SYSTEM

(75) Inventor: Mitsunori Morisaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1177 days.

(21) Appl. No.: 12/480,484

(22) Filed: Jun. 8, 2009

(65) Prior Publication Data

US 2009/0303329 A1    Dec. 10, 2009

(30) Foreign Application Priority Data

Jun. 6, 2008  (JP) .................................. 2008/149244

(51) Int. Cl.
H04N 7/18    (2006.01)

(52) U.S. Cl.
CPC ..................... *H04N 7/183* (2013.01)

(58) Field of Classification Search
CPC ............ G06F 21/6245; G06K 9/00221; G06K 9/00268; G06K 9/00288; G06K 9/00771; G07C 9/00111; G08B 13/19686; H04N 7/183
USPC ........................................................ 348/159
See application file for complete search history.

(56) References Cited

U.S. PATENT DOCUMENTS

| | | | | |
|---|---|---|---|---|
| 6,108,033 | A * | 8/2000 | Ito et al. .................... | 348/152 |
| 6,208,379 | B1 * | 3/2001 | Oya ................... | G08B 13/1968 348/143 |
| 2002/0147982 | A1 * | 10/2002 | Naidoo et al. ................ | 725/105 |
| 2003/0061325 | A1 * | 3/2003 | Monroe ......................... | 709/223 |
| 2003/0197612 | A1 * | 10/2003 | Tanaka et al. ............. | 340/572.1 |
| 2004/0081338 | A1 * | 4/2004 | Takenaka ...................... | 382/118 |
| 2004/0105006 | A1 * | 6/2004 | Lazo et al. .................... | 348/169 |
| 2004/0117638 | A1 * | 6/2004 | Monroe ........................ | 713/186 |
| 2004/0216165 | A1 * | 10/2004 | Inata et al. .................... | 725/105 |
| 2005/0063569 | A1 * | 3/2005 | Colbert et al. ................ | 382/118 |
| 2005/0270371 | A1 * | 12/2005 | Sablak .......................... | 348/143 |
| 2006/0028547 | A1 * | 2/2006 | Chang ........................... | 348/143 |
| 2008/0050016 | A1 * | 2/2008 | Kawano et al. .............. | 382/175 |

FOREIGN PATENT DOCUMENTS

| | | |
|---|---|---|
| JP | 2004005511 A | 1/2004 |
| JP | 2004214934 A | 7/2004 |
| JP | 2005-51664 A | 2/2005 |
| JP | 2005057706 A | 3/2005 |
| JP | 2005-184419 A | 7/2005 |

(Continued)

OTHER PUBLICATIONS

Japanese Office Action for JP2008-149244 mailed on Jan. 15, 2012.

(Continued)

*Primary Examiner* — Christopher Biagini

(57) ABSTRACT

An object image displaying system according to an exemplary aspect of the invention includes: a plurality of cameras which image a plurality of imaging areas respectively to create image data representing the image areas; and a server which is connected to the plural cameras, wherein the server includes: an identifying unit which identifies a position at which an object exists as a identified position; a selecting unit which selects selected image data which corresponds to the identified position out of the image data created by the plural cameras; and a display control unit which controls a display unit to display the selected image data.

56 Claims, 43 Drawing Sheets

(56) References Cited

FOREIGN PATENT DOCUMENTS

| | | | |
|---|---|---|---|
| JP | 2006325129 | A | 11/2006 |
| JP | 2008040792 | A | 2/2008 |
| WO | 2006112246 | A1 | 10/2006 |

OTHER PUBLICATIONS

Japanese Office Action for JP Application No. 2008-149244 mailed on Nov. 26, 2013 with English Translation.

* cited by examiner

Fig.3A

| INSTALLATION POSITION (ID) | CAMERA (ID) |
|---|---|
| 00 | 00 |
| 01 | 01 |
| 02 | 02 |
| 03 | 03 |

Fig.3B

| INSTALLATION POSITION (ID) | CAMERA (ID) |
|---|---|
| 00 | 10 |
| 01 | 10 |
| 02 | 11 |
| 05 | 30,31,32 |

POSITION ID FOR WLAN

Fig.3C

| IMAGING POSITION (ID) | CAMERA (ID) |
|---|---|
| 00 | 00 |
| 01 | 01 |
| 02 | 02 |
| 03,04 | 03 |

Fig.3D

| INSTALLATION POSITION (COORDINATES) | CAMERA (ID) |
|---|---|
| (0,0) | 00 |
| (0,10) | 01 |
| (0,20) | 02 |
| (10,0) | 03 |

Fig.3E

| INSTALLATION POSITION (COORDINATES) | CAMERA (ID) |
|---|---|
| (0,0)-(10,10) | 00 |
| (0,10)-(10,20) | 01 |
| (0,20)-(10,30) | 02 |
| (10,0)-(20,10) | 03 |

Fig.3F

| INSTALLATION POSITION (LOCATION) | CAMERA (ID) |
|---|---|
| MEETING ROOM A | 00 |
| WORKING ROOM A | 01 |
| RESTING ROOM A | 02 |
| GUEST ROOM A | 03 |

Fig.4A

17 — | CAMERA : 00 | |
| --- | --- |
| DATE AND TIME | FILE INFORMATION |
| 20080125 10:00:00 | 20080125-001.jpg |
| 20080125 10:00:10 | 20080125-002.jpg |
| 20080125 10:00:20 | 20080125-003.jpg |

Fig.4B

17 — | CAMERA : 00 | | |
| --- | --- | --- |
| DATE | TIME | FILE INFORMATION |
| 20080125 | 10:00:00 | 20080125-001.jpg |
| 20080125 | 10:00:10 | 20080125-002.jpg |
| 20080125 | 10:00:20 | 20080125-003.jpg |

Fig.4C

17 — | CAMERA (ID) | FILE INFORMATION |
| --- | --- |
| 00 | 00-20080125-001.jpg |
| 01 | 01-20080125-001.jpg |
| 02 | 02-20080125-001.jpg |
| 03 | 03-20080125-001.jpg |

Fig.5A

| USER (ID) | POSITION INFORMATION (ID) |
|---|---|
| 00 | 00 |
| 01 | 01 |
| 02 | 02 |
| 03 | 03 |

Fig.5B

| USER (ID) | POSITION INFORMATION (COORDINATES) |
|---|---|
| 00 | (0,0) |
| 01 | (0,10) |
| 02 | (0,20) |
| 03 | (10,0) |

Fig.5C

| USER | POSITION INFORMATION |
|---|---|
| MORISAKI | MEETING ROOM A |
| TANAKA | WORKING ROOM A |
| NAKAMURA | RESTING ROOM A |
| SUZUKI | GUEST ROOM A |

Fig.6A

| USER INFORMATION (ID) | PRESENCE |
|---|---|
| 00 | 00-20080125-001.jpg |
| 01 | 01-20080125-001.jpg |
| 02 | 02-20080125-001.jpg |
| 03 | 03-20080125-001.jpg |

Fig.6B

| USER INFORMATION (ID) | PRESENCE |
|---|---|
| MORISAKI | 00-20080125-001.jpg |
| TANAKA | 01-20080125-001.jpg |
| NAKAMURA | 02-20080125-001.jpg |
| SUZUKI | 03-20080125-001.jpg |

Fig.6C

| USER INFORMATION : 00 | |
|---|---|
| DATE AND TIME | PRESENCE |
| 20080125 10:00:00 | 20080125-001.jpg |
| 20080125 10:00:10 | 20080125-002.jpg |
| 20080125 10:00:20 | 20080125-003.jpg |

Fig.6D

| USER INFORMATION : 00 | | |
|---|---|---|
| DATE | TIME | PRESENCE |
| 20080125 | 10:00:00 | 20080125-001.jpg |
| 20080125 | 10:00:10 | 20080125-002.jpg |
| 20080125 | 10:00:20 | 20080125-003.jpg |

Fig.7A

| UNIQUE ID | POSITION MEASURING DEVICE POSITION INFORMATION |
|---|---|
| 00 | 00 |
| 01 | 01 |
| 02 | 02 |
| 03 | 03 |

Fig.7B

| UNIQUE ID | POSITION MEASURING DEVICE POSITION INFORMATION |
|---|---|
| 00 | (0,0) |
| 01 | (0,10) |
| 02 | (0,20) |
| 03 | (10,0) |

Fig.7C

| UNIQUE ID | POSITION MEASURING DEVICE POSITION INFORMATION |
|---|---|
| 00 | MEETING ROOM A |
| 01 | WORKING ROOM A |
| 02 | RESTING ROOM A |
| 03 | GUEST ROOM A |

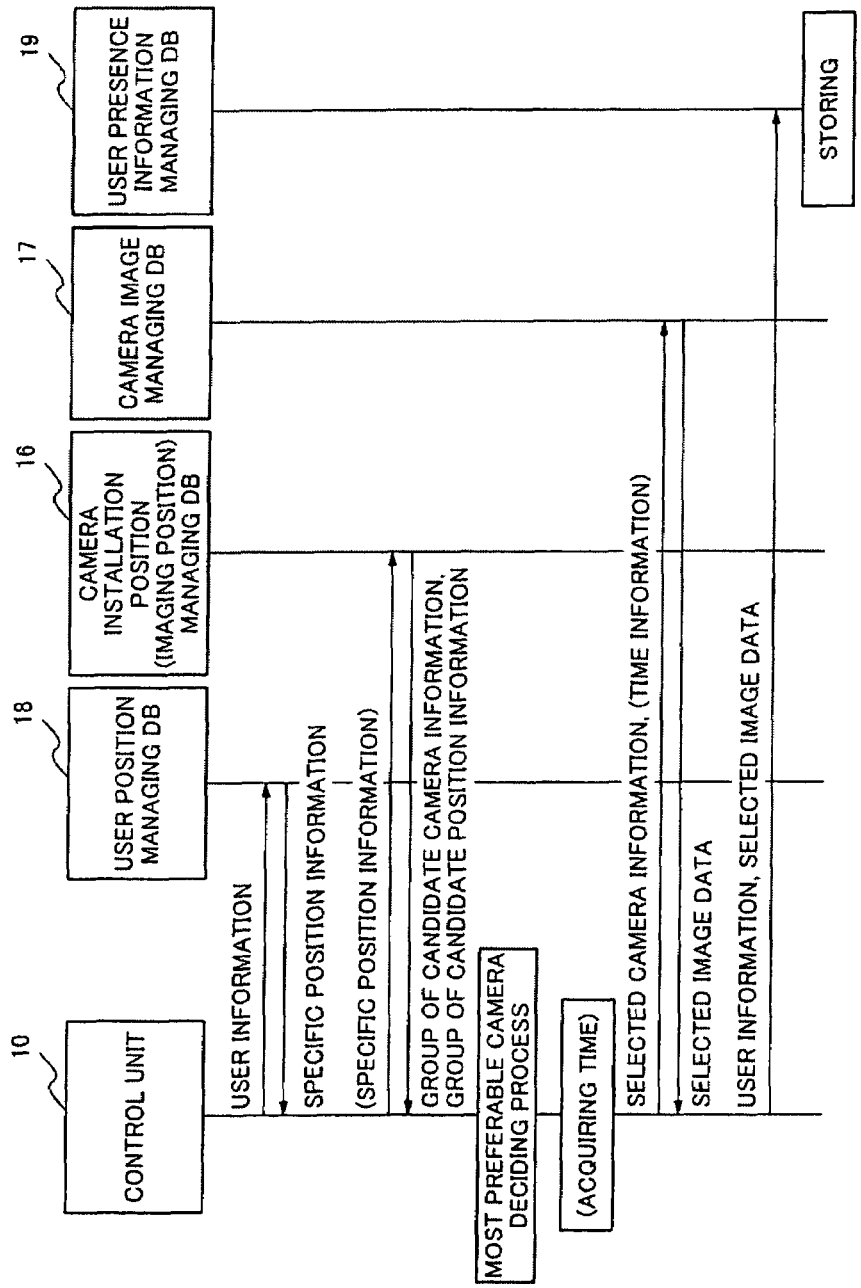

Fig.16A

| INSTALLATION POSITION (ID) | CAMERA (ID) |
|---|---|
| 00 | 10 |
| 01 | 10 |
| 02 | 11 |
| 03 | 11 |

Fig.16B

| IMAGING POSITION (ID) | CAMERA (ID) |
|---|---|
| 00 | 10 |
| 01 | 10 |
| 02 | 11 |
| 03,04 | 11 |

Fig.16C

| INSTALLATION POSITION (COORDINATES) | CAMERA (ID) |
|---|---|
| (0,0) | 10 |
| (0,10) | 10 |
| (0,20) | 11 |
| (10,0) | 11 |

Fig.16D

| INSTALLATION POSITION (COORDINATES) | CAMERA (ID) |
|---|---|
| (0,0)-(10,20) | 10 |
| (0,20)-(10,40) | 11 |
| (10,0)-(20,20) | 12 |

Fig.18A

| INSTALLATION POSITION (ID) | CAMERA (ID) |
|---|---|
| 00 | 20(,10) |
| 01 | 10 |
| 02 | 21(,11) |
| 03 | 11 |

Fig.18B

| INSTALLATION POSITION (COORDINATES) | CAMERA (ID) |
|---|---|
| (0,0) | 20(,10) |
| (0,10) | 10 |
| (0,20) | 21(,11) |
| (10,0) | 11 |

Fig.18C

| INSTALLATION POSITION (ID) | CAMERA (ID) |
|---|---|
| 00 | 10 |
| 01 | 10 |
| 02 | 11 |
| 03,04 | 11 |

Fig.18D

| IMAGING POSITION (COORDINATES) | CAMERA (ID) |
|---|---|
| (0,0) | 10 |
| (0,10) | 10 |
| (0,20) | 11 |
| (10,0) | 11 |

Fig.18E

| INSTALLATION POSITION (COORDINATES) | CAMERA (ID) |
|---|---|
| (0,0)-(10,20) | 10 |
| (0,20)-(10,40) | 11 |
| (10,0)-(20,20) | 12 |

Fig.20A

| USER (ID) | SECURITY POLICY (ID) |
|---|---|
| 00 | ALL |
| 01 | EXCEPT 20,21,22 AND 23 |
| 02 | EXCEPT 10,11,20,21,22 AND 23 |
| 03 | EXCEPT 20,21,22 AND 23 |

Fig.20B

| USER (ID) | SECURITY POLICY (IMAGING PERMITTED CAMERA ID) |
|---|---|
| 00 | 30,10,11,20,21,22,23 |
| 01 | 30,10,11 |
| 02 | 30 |
| 03 | 30,10,11 |

Fig.24A

| INSTALLATION POSITION (ID) | CAMERA (ID) | | |
|---|---|---|---|
| | LOW LEVEL | MEDIUM LEVEL | HIGH LEVEL |
| 00 | 20 | 10 | 30 |
| 01 | 21 | 10 | 30 |
| 02 | 22 | 11 | 30 |
| 03 | 23 | 11 | 30 |

Fig.24B

| INSTALLATION POSITION (COORDINATES) | CAMERA (ID) | | |
|---|---|---|---|
| | LOW LEVEL | MEDIUM LEVEL | HIGH LEVEL |
| (0,0) | 20 | 10 | 30 |
| (0,10) | 21 | 10 | 30 |
| (0,20) | 22 | 11 | 30 |
| (10,0) | 23 | 11 | 30 |

Fig.24C

| INSTALLATION POSITION (COORDINATES) | CAMERA (ID) | | |
|---|---|---|---|
| | LOW LEVEL | MEDIUM LEVEL | HIGH LEVEL |
| (0,0)-(10,10) | 20 | 10 | 30 |
| (0,10)-(10,20) | 21 | 10 | 30 |
| (0,20)-(10,30) | 22 | 11 | 30 |
| (10,0)-(20,10) | 23 | 11 | 30 |

Fig.25A

| USER (ID) | SECURITY POLICY |
|---|---|
| 00 | LOW LEVEL |
| 01 | MEDIUM LEVEL |
| 02 | HIGH LEVEL |
| 03 | MEDIUM LEVEL |

Fig.25B

| USER (ID) | SECURITY POLICY (ID) |
|---|---|
| 00 | 00 |
| 01 | 01 |
| 02 | 02 |
| 03 | 01 |

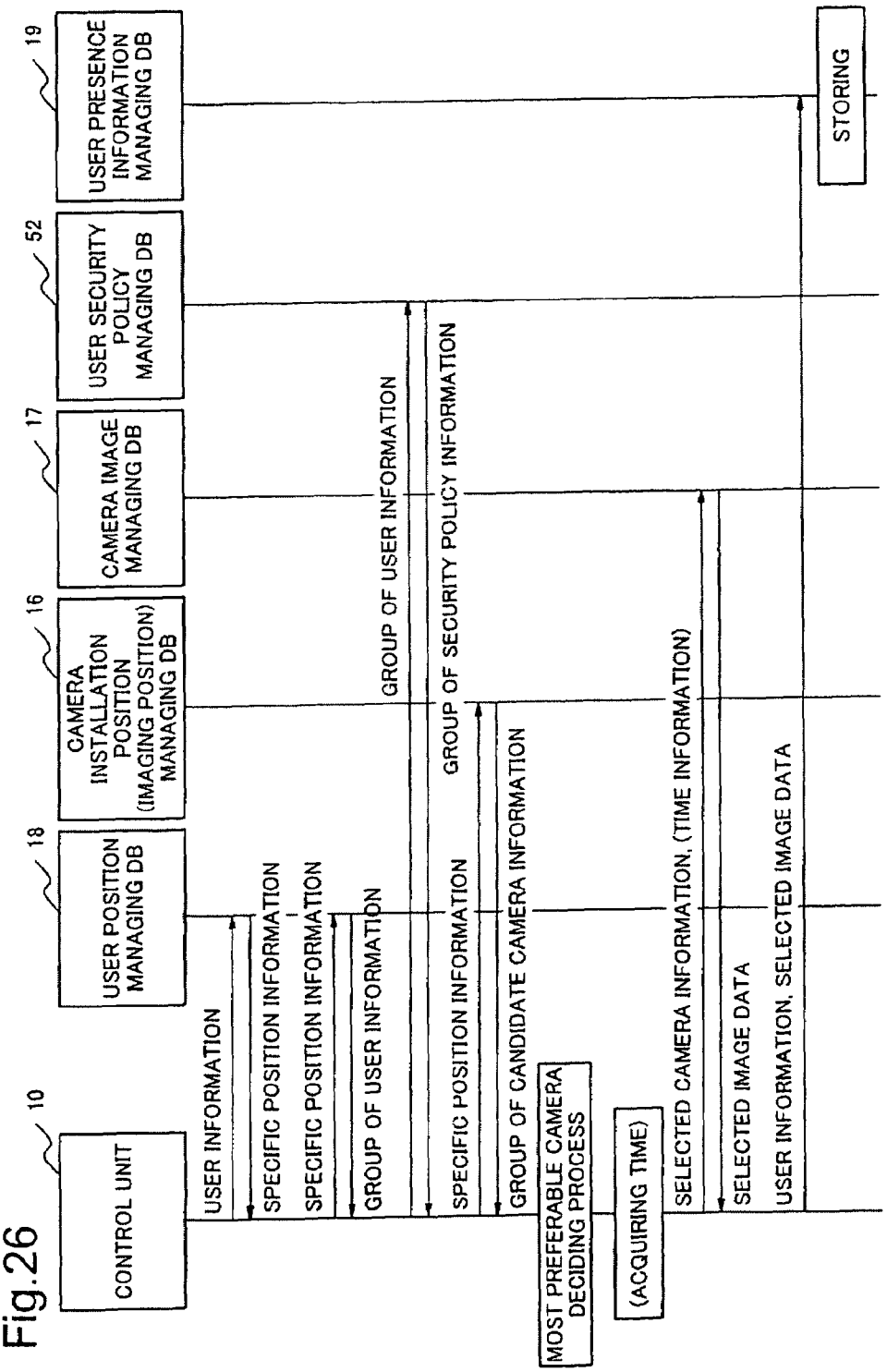

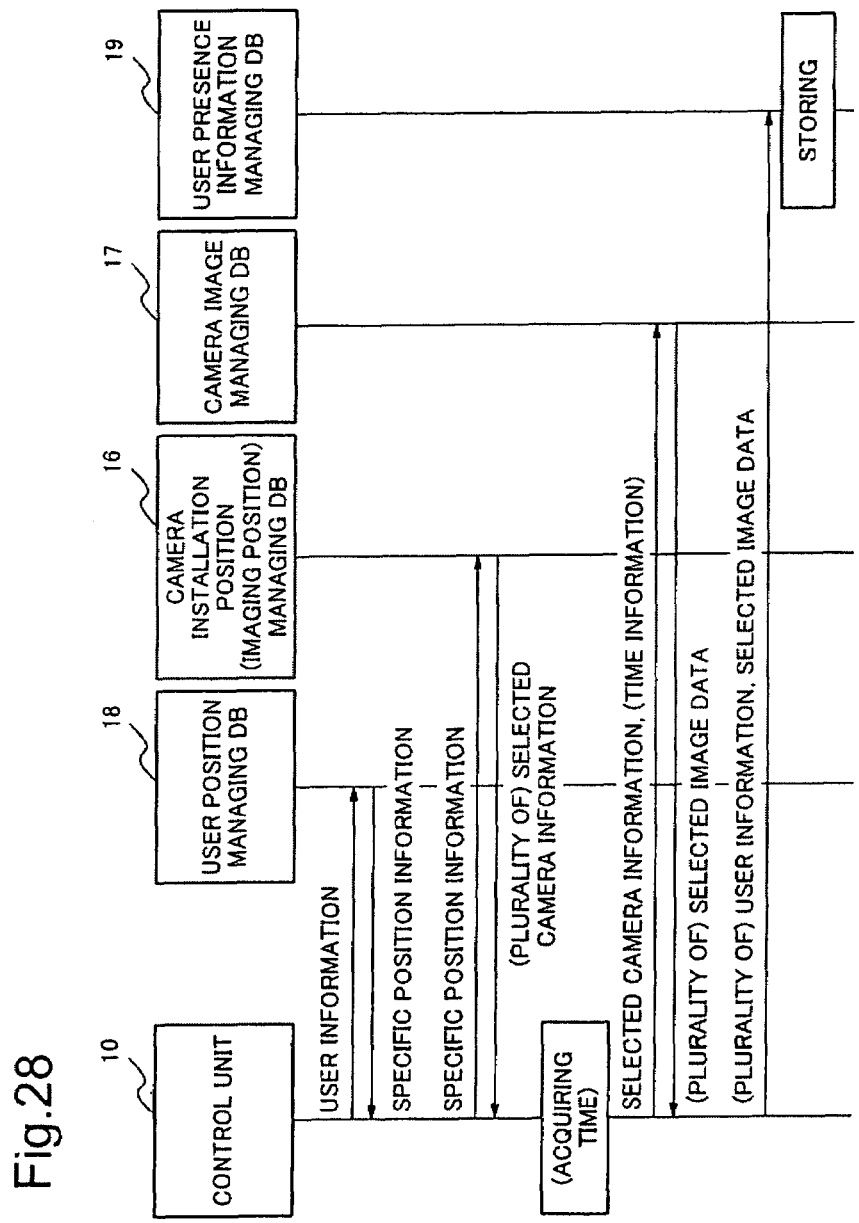

Fig.34

| USER NAME | FACE IMAGE DATA |
|---|---|
| MORISAKI | (0,0)(0,10)(0,20)(0,30)···· |
|  |  |
| ⋮ | ⋮ |
|  |  |

81

OBJECT IMAGE DISPLAYING SYSTEM

This application is based upon and claims the benefit of priority from Japanese Patent Application No. 2008-149244, filed on Jun. 6, 2008, the disclosure of which is incorporated herein in its entirety by reference.

TECHNICAL FIELD

The present invention relates to an object image displaying system which displays image data representing an image of object.

BACKGROUND ART

An organization such as a corporation (office and factory), a hospital and a store makes a rule by which a party concerned can grasp a situation (presence) of an object, such as person and substance, related to the party concerned to make work efficiency improved.

It is assumed that the object is a person, for example, an employee of the above mentioned organization. Then, it is also assumed that the party concerned is a superior of the employee or another employee working for the same department for which the employee works. In this case, the employee gives the party concerned a message on destination of the employee or leaves a memo on a message board, when the employee is going out of one room to other destination room.

However, giving a message or leaving a memo causes the following problems.

As the first problem, presence of the object is not updated automatically. For example, it is assumed that the object is a person (for example, employee). In this case, the employee has to update his presence on his own initiative, when he is going out of one room to other destination room. In case that the object is a substance, the party concerned, who is related to the substance, has to update presence of the object on own initiative.

As the second problem, situation may be different in some cases, while the object exists at the same location. For example, it is assumed that the object is a person (for example, employee), and a room where the employee stays is divided into a plurality of departments whose businesses are different each other. In this case, the employee enters into a different situation (works different business) while the employee is in the same location (room), when the employee moves from one department to other department to work business of the other department. In case that the object is a substance, the object enters into a different situation while the object is in the same location (room), when the object is moved from a department, in which a certain process for the object is carried out, to a department where next process is carried out. Even if the object stays in the same location (room), the party concerned cannot grasp a situation, in which the object moves around in the room, such as for telephoning and arguing orally.

It is desired to represent precisely the situation (presence) which cannot be represented by the conventional use of message and memo.

Here, technology in relation to management of the object will be described in the following.

Japanese Patent Application Laid-Open No. 2006-325129 discloses a presence information providing system.

The presence information providing system includes a wireless terminal apparatus, a plurality of wireless base stations and a presence server. A plurality of wireless base stations are arranged in predetermined locations and carries out wireless communication with the wireless terminal apparatus. The presence server stores and manages presence information, and provides a terminal apparatus, which issues a request for presence information, with the presence information related to a requested terminal apparatus in response to the request for presence information.

The wireless terminal apparatus includes a receiving power measuring means and a measurement result reporting means. The receiving power measuring means measures receiving power of wireless communication with the wireless base station at a present location. The measurement result reporting means reports a measurement result, which is measured by the receiving power measuring means, to the presence server.

The presence server includes a storage means, a location estimating means and a location name reporting means. The storage means stores and manages a location and a location name in association with the measurement result on the receiving power. When the location estimating means receives the measurement result at the present location from the measurement result reporting means, the location estimating means estimates a location corresponding to the measurement result, based on a stored content in the storage means. The location name reporting means reads the location name corresponding to the location, which the location estimating means estimates, from the storage means and reports the location name to the wireless terminal apparatus.

The wireless terminal apparatus includes a display means and an update reporting means. When the display means receives the location name from the location name reporting means, the display means displays the location name as the present location name. When the update reporting means detects update on the present location name which the display means displays, the update reporting means reports the update on the location name to the presence server.

The presence server includes a storage control means. When the storage control means receives the update on the location name related to the present location name, the storage control means controls the storage means to change the present location name, which the storage means stores, to new present location name based on the update.

Japanese Patent Application Laid-Open No. 2005-57706 discloses a presence information providing system.

The presence information providing system includes a schedule managing server, a presence managing server and a user terminal. The schedule managing server is connected to communication network and manages user's schedule information. The presence managing server is connected to the communication network and manages user's presence information at least. The user terminal is connected to the communication network and sends message information, based on presence information on a destination user.

The schedule managing server includes a schedule managing unit. The schedule managing unit manages schedule information of user who possesses the user terminal.

The presence managing server includes a profile information managing unit, a profile information acquiring unit, a schedule information acquiring unit, a next possible communication extracting unit and a presence updating unit. The profile information managing unit manages profile information which includes information necessary for acquiring the user's schedule information at least. In case that the profile information acquiring unit checks the presence information and consequently, finds that the presence information indicates the user terminal to be unable to communicate, the profile information acquiring unit acquires the profile information on the user who possesses the user terminal. The schedule information acquiring unit acquires the schedule information stored in the schedule managing server via the communication network, based on the profile information. The next possible communication extracting unit extracts the next possible communication time, which indicates time when the user terminal impossible to communicate at present time will be possible to communicate, based on the schedule information which the schedule information acquiring unit acquires. The presence updating unit updates the presence information of the user terminal, based on the next possible communication time.

The user terminal includes a presence information requesting unit and a display unit. The presence information requesting unit requests the presence information, which includes the next possible communication time, to the presence control server. The display unit displays the presence information which includes the next possible communication time.

Japanese Patent Application Laid-Open No. 2004-214934 discloses a presence information processing terminal.

The presence information processing terminal can communicate with other communication terminal via a network. The presence information processing terminal includes an imaging means and a sending means. The imaging means images neighborhood of the presence information processing terminal. The sending means sends a picture, which the imaging means images, to other communication terminal, as the presence information which indicates whether user of the presence information processing terminal exists around the presence information processing terminal.

SUMMARY

An exemplary object of the present invention is to provide an object image displaying system which can represent precisely a situation (presence) which cannot be represented by use of message and memo.

An object image displaying system according to an exemplary aspect of the invention includes: a plurality of cameras which image a plurality of imaging areas respectively to create image data representing the image areas; and a server which is connected to the plural cameras, wherein the server includes: an identifying unit which identifies a position at which an object exists as a identified position; a selecting unit which selects selected image data which corresponds to the identified position, out of the image data created by the plural cameras; and a display control unit which controls a display unit to display the selected image data.

A server according to an exemplary aspect of the invention includes an image acquiring unit which acquires image data created on the basis of photographing data corresponding to images of a plurality of imaging area; an identifying unit which identifies a position of an object as a identified position; a selecting unit which selects selected image data corresponding to the identified position out of the acquired image data; and a display control unit which controls a display unit to display the selected image data.

A method for displaying an object image according to an exemplary aspect of the invention includes the steps of: imaging a plurality of image areas by use of a plurality of cameras and creating image data representing the images; identifying a position of an object as a identified position; selecting selected image data corresponding to the identified position out of the image data created by the plural cameras; and displaying the selected image data on a display unit.

BRIEF DESCRIPTION OF THE DRAWINGS

Exemplary features and advantages of the present invention will become apparent from the following detailed description when taken with the accompanying drawings in which:

FIG. 3A indicates a camera installation position (imaging position) managing database of a server of an object image displaying system according to the first, the second, an eighth and a ninth embodiments of the present invention;

FIG. 3B indicates a camera installation position (imaging position) managing database of a server of an object image displaying system according to the first, the second, a seventh, the eighth and the ninth embodiments of the present invention;

FIG. 3C indicates a camera installation position (imaging position) managing database of the server of the object image displaying system according to the first, the second, the seventh, the eighth and the ninth embodiments of the present invention;

FIG. 3D indicates a camera installation position (imaging position) managing database of the server of the object image displaying system according to the first, the second, the eighth and the ninth embodiments of the present invention;

FIG. 3E indicates a camera installation position (imaging position) managing database of the server of the object image displaying system according to the first, the second, the eighth and the ninth embodiments of the present invention;

FIG. 3F indicates a camera installation position (imaging position) managing database of the server of the object image displaying system according to the first, the second, the eighth and the ninth embodiments of the present invention;

FIG. 4A indicates a camera image managing database of a server of an object image displaying system according to a first to a ninth embodiments of the present invention;

FIG. 4B indicates a camera image managing database of the server of the object image displaying system according to the first to the ninth embodiments of the present invention;

FIG. 4C indicates a camera image managing database of the server of the object image displaying system according to the first to the ninth embodiments of the present invention;

FIG. 5A indicates a user position managing database of the server of the object image displaying system according to the first to the ninth embodiments of the present invention;

FIG. 5B indicates a user position managing database of the server of the object image displaying system according to the first to the ninth embodiments of the present invention;

FIG. 5C indicates a user position managing database of the server of the object image displaying system according to the first to the ninth embodiments of the present invention;

FIG. 6A indicates a user presence information managing database of the server of the object image displaying system according to the first to the ninth embodiments of the present invention;

FIG. 6B indicates a user presence information managing database of the server of the object image displaying system according to the first to the ninth embodiments of the present invention;

FIG. 6C indicates a user presence information managing database of the server of the object image displaying system according to the first to the ninth embodiments of the present invention;

FIG. 6D indicates a user presence information managing database of the server of the object image displaying system according to the first to the ninth embodiments of the present invention;

FIG. 7A indicates a position identifying database of the server of the object image displaying system according to the first to the seventh embodiments of the present invention;

FIG. 7B indicates a position identifying database of the server of the object image displaying system according to the first to the seventh embodiments of the present invention;

FIG. 7C indicates a position identifying database of the server of the object image displaying system according to the first to the seventh embodiments of the present invention;

FIG. 13 is a flowchart showing a presence storing process, as an operation of the object image displaying system according to the second and the fourth embodiments of the present invention;

FIG. 16A indicates a camera installation position (imaging position) managing database of the server of the object image displaying system according to the third embodiment of the present invention;

FIG. 16B indicates a camera installation position (imaging position) managing database of the server of the object image displaying system according to the third embodiment of the present invention;

FIG. 16C indicates a camera installation position (imaging position) managing database of the server of the object image displaying system according to the third embodiment of the present invention;

FIG. 16D indicates a camera installation position (imaging position) managing database of the server of the object image displaying system according to the third embodiment of the present invention;

FIG. 18A indicates a camera installation position (imaging position) managing database of the server of the object image displaying system according to the fourth to the sixth embodiments of the present invention;

FIG. 18B indicates a camera installation position (imaging position) managing database of the server of the object image displaying system according to the fourth to the sixth embodiments of the present invention;

FIG. 18C indicates a camera installation position (imaging position) managing database of the server of the object image displaying system according to the fourth to the sixth embodiments of the present invention;

FIG. 18D indicates a camera installation position (imaging position) managing database of the server of the object image displaying system according to the fourth to the sixth embodiments of the present invention;

FIG. 18E indicates a camera installation position (imaging position) managing database of the server of the object image displaying system according to the fourth to the sixth embodiments of the present invention;

FIG. 20A indicates a user security policy managing database of the server of the object image displaying system according to the fifth and the sixth embodiments of the present invention;

FIG. 20B indicates a user security policy managing database of the server of the object image displaying system according to the fifth and the sixth embodiments of the present invention;

FIG. 24A indicates a camera installation position (imaging position) managing database of the server of the object image displaying system according to the fifth and the sixth embodiments of the present invention;

FIG. 24B indicates a camera installation position (imaging position) managing database of the server of the object image displaying system according to the fifth and the sixth embodiments of the present invention;

FIG. 24C indicates a camera installation position (imaging position) managing database of the server of the object image displaying system according to the fifth and the sixth embodiments of the present invention;

FIG. 25A indicates a user security policy managing database of the server of the object image displaying system according to the fifth and sixth embodiments of the present invention;

FIG. 25B indicates a user security policy managing database of the server of the object image displaying system according to the fifth and sixth embodiments of the present invention;

FIG. 26 is a flowchart showing a presence storing process, as an operation of the object image displaying system according to the sixth embodiment of the present invention;

FIG. 28 is a flowchart showing a presence storing process, as an operation of the object image displaying system according to the seventh embodiment of the present invention;

FIG. 34 indicates a face image database of the server of the object image displaying system according to the eighth embodiment of the present invention;

EXEMPLARY EMBODIMENT

An object image displaying system according to an embodiment of the present invention will be described in detail in the following with reference to an accompanying drawing.

A First Embodiment of the Present Invention

[Configuration]

Figure 1:
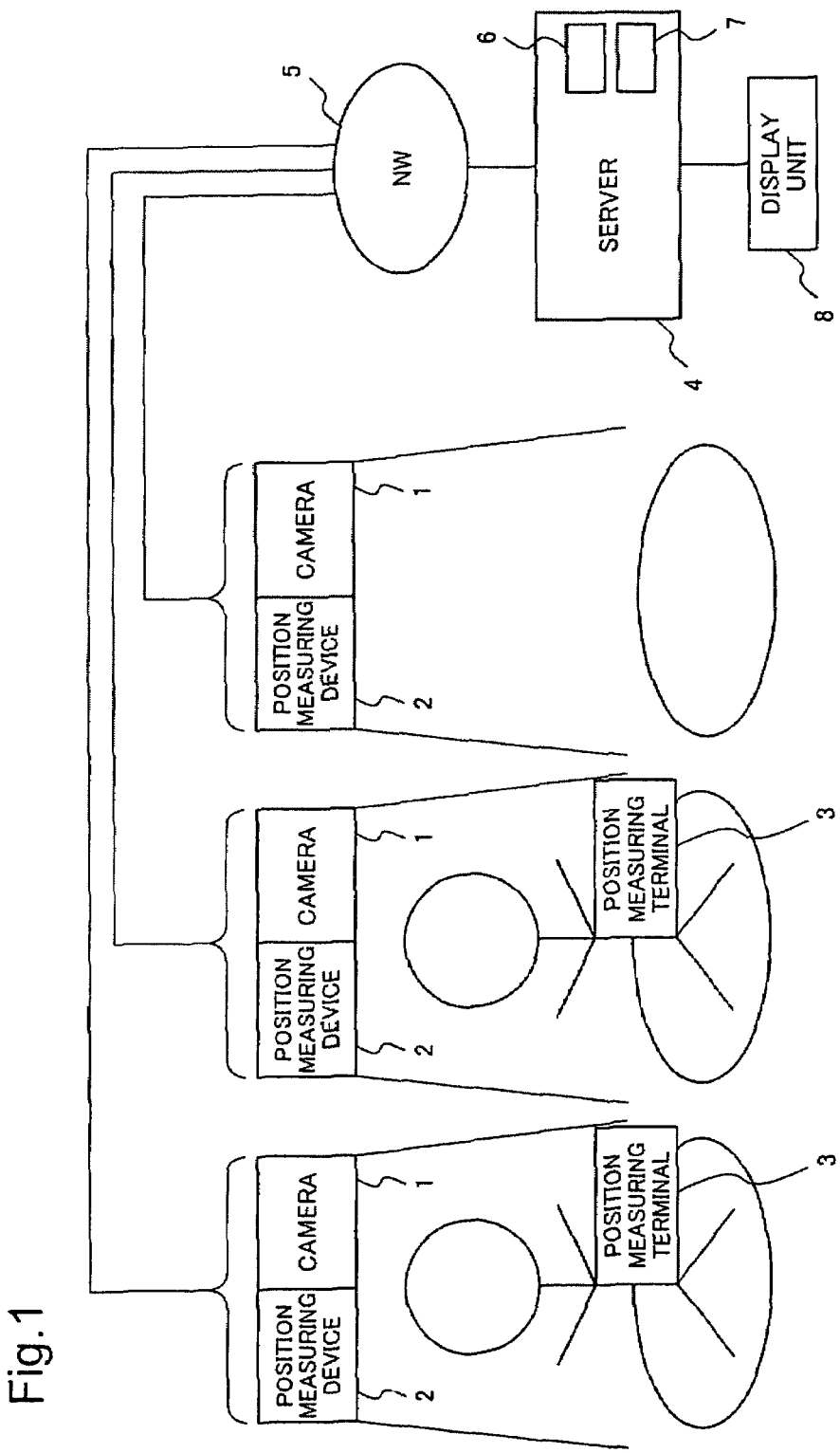
FIG. 1 indicates a configuration of an object image displaying system according to a first and a second embodiment of the present invention.

FIG. 1 indicates a configuration of an object image displaying system according to the first embodiment of the present invention. The object image displaying system according to the first embodiment of the present invention includes a plurality of cameras 1, a server 4 and a display unit 8. The server 4 is connected to a plurality of cameras 1 via a network 5, and controls a plurality of cameras 1.

The object image displaying system is used in an organization such as a corporation (office and factory), a hospital and a store so that a party concerned may grasp a situation (presence) of an object, such as person and substance, related to the party concerned to make work efficiency improved.

Hereinafter, a condition which is applied in the first embodiment of the present invention, and an operation under the condition will be described.

It is assumed that the object is a person (user) (condition 1). For example, it is assumed that the object is an employee working for the above mentioned organization. It is also assumed that the party concerned is a superior of the employee or other employee working in the same department.

Further, the object image displaying system according to the first embodiment of the present invention includes a positioning system. The positioning system includes a position measuring terminal 3, which is arranged near user or possessed by the user, and a plurality of position measuring devices 2. The server 4 is connected to the position measuring terminal 3 via a wireless network. The positioning system and the server 4 identify position of the object as an identified position (operation 1). Further, a plurality of position measuring devices 2 may or may not be connected each other via the network 5.

According to the embodiment of the present invention, the positioning system carries out the control point surveying by which the server 4 identifies the identified position (operation 2).

Details for the positioning system will be described later.

For example, it is assumed that the above mentioned organization possesses a plurality of rooms. In this case, a plurality of cameras 1 and a plurality of position measuring devices 2 is installed in each of a plurality of rooms. Each room may be arranged in the same building and may be in a different building. Further, it is assumed that each room is divided into a plurality of departments whose businesses are different each other. In this case, a plurality of cameras 1 and a plurality of position measuring devices 2 is installed in each of a plurality of departments.

The position measuring terminal 3 is a computer and includes an executing unit (not shown in the figure), which is CPU (Central Processing Unit), and a storage unit (not shown in the figure), which is a memory storing a computer program to make the executing unit execute. The executing unit reads the computer program from the storage unit, when the computer is activated, for example, and executes the computer program. The storage unit holds the object information (user information) representing the user. In case that the position measuring terminal 3 exists in each of a plurality of position measuring areas, a plurality of position measuring devices 2, each of which is computer, can carry out wireless communication with the position measuring terminal 3.

A plurality of position measuring devices 2 are installed at positions corresponding to the positions at which a plurality of cameras 1 is installed respectively. In this case, a plurality of position measuring area correspond to a plurality of imaging areas respectively (operation 3). Further, the position measuring device 2 and the camera 1 may be unified and may be separated.

By selecting installation positions of a plurality of cameras 1, a plurality of imaging areas do not overlap each other (condition 2).

The server 4 is a computer and includes an executing unit 6, which is CPU (Central Processing Unit), and a storage unit 7, which is a memory storing a computer program to make the executing unit 6 execute. The executing unit 6 reads the computer program from the storage unit 7, when the computer is activated, for example, and executes the computer program.

Figure 2:
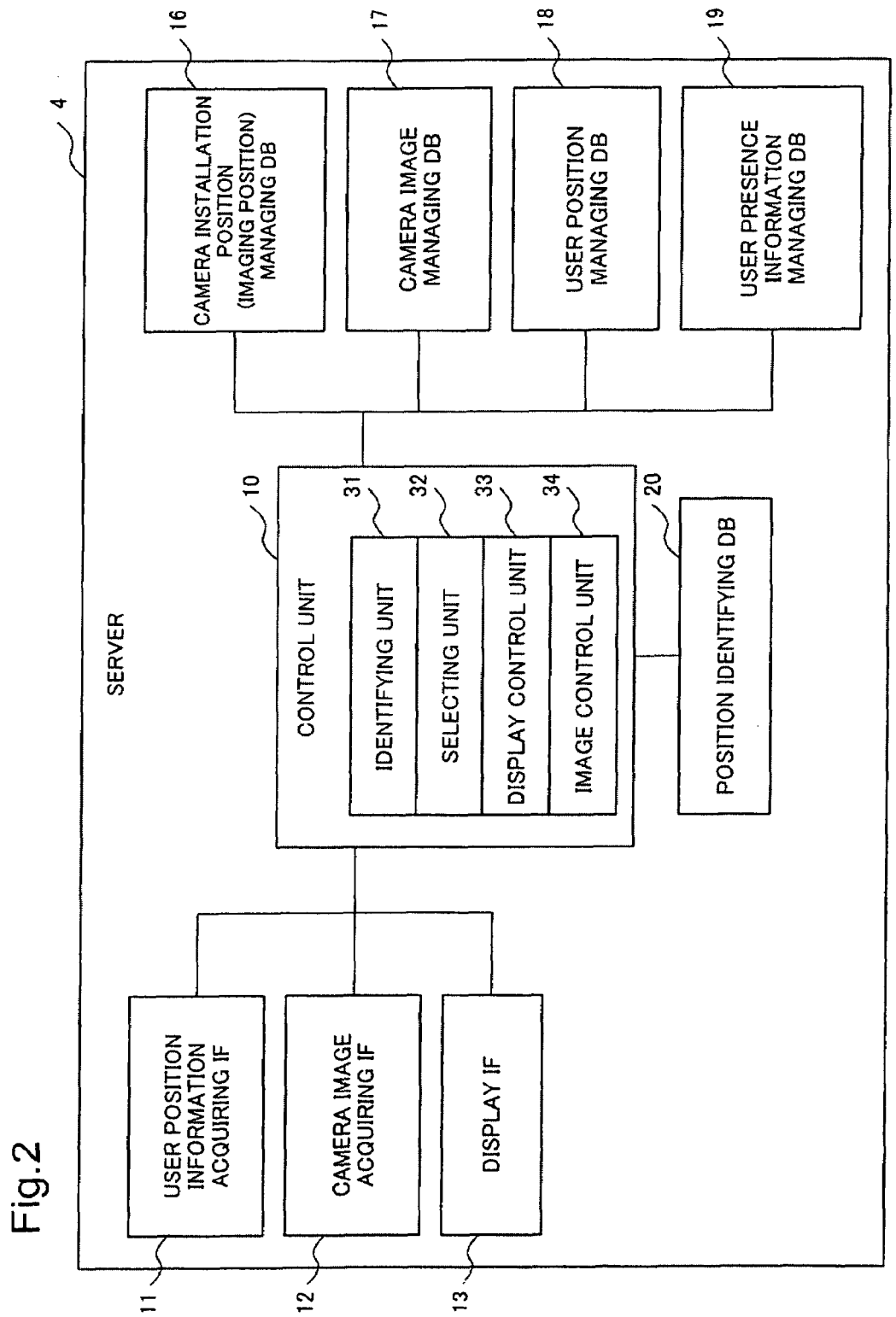
FIG. 2 indicates a configuration of a server of an object image displaying system according to a first to a fourth embodiment of the present invention.

FIG. 2 indicates a configuration of the server 4. Furthermore, the server 4 includes a user position information acquiring interface 11, a camera image acquiring interface 12 and a display interface 13. The storage unit 7 includes a camera installation position (imaging position) managing database 16, a camera image managing database 17, a user position managing database 18, a user presence information managing database 19 and a position identifying database 20. The storage unit 7 stores a control unit 10 as the computer program. The control unit 10 includes an identifying part 31, a selecting part 32, a display control part 33 and an image control part 34.

FIGS. 3A to 3F indicate an example of the camera installation position (imaging position) managing database 16. The camera installation position (imaging position) managing database 16 stores in advance a plurality of position information representing a plurality of positions respectively, and a plurality of camera information representing a plurality of cameras 1 respectively. According to the embodiment of the present invention, any one of FIGS. 3A to 3F, which are indicated as an example, may be applicable.

For example, in case that the installation position (ID) is "00", "01", "02", "03" or the like as the position information, a camera (ID) may be "00", "01", "02", "03" or the like respectively as the camera information, as shown in FIG. 3A.

For example, in case that the installation position (ID) is "00", "01", "02", "05" or the like as the position information, the camera (ID) may be "10", "10", "11", "30, 31, 32" or the like respectively as the camera information, as shown in FIG. 3B. That is, a plurality of cameras (ID) may be assigned to one installation position (ID). This assignment is very preferable in case that one position measuring area is wide and a plurality of cameras exist in the position measuring area, for example, in case of the control point surveying by use of WLAN (Wireless Local Area Network).

For example, in case that the imaging position (ID) is "00", "01", "02", "03, 04" or the like as the position information, the camera (ID) may be "00", "01", "02", "03" or the like respectively as the camera information, as shown in FIG. 3C. This assignment is preferable in case that an imaging area of camera is wide like one of a surveillance camera and a plurality of position measuring devices 2 exist in the imaging area.

For example, in case that the installation position (coordinates) is "(0, 0)", "(0, 10)", "(0, 20)", "(10, 0)" or the like as the position information, the camera (ID) may be "00", "01", "02", "03" or the like respectively as the camera information, as shown in FIG. 3D.

For example, in case that the installation position (coordinates) is "(0, 0)-(10, 10)", "(0, 10)-(10, 20)", "(0, 20)-(10, 30)", "(10, 0)-(20, 10)" or the like as the position information, the camera (ID) may be "00", "01", "02", "03" or the like respectively as the camera information, as shown in FIG. 3E. Here, the installation position (coordinates) "(0, 0)-(10, 10)" means a rectangular area whose two opposite corners are positioned at the coordinates (0, 0) and (10, 10) respectively. That is, in this case, a camera with the camera ID "00" is installed in the rectangular area whose two opposite corners are positioned at the coordinates (0, 0) and (10, 10) respectively. Hereinafter, the installation position (coordinates) has the similar meaning.

For example, in case that the installation position (location) is "meeting room A", "working room A", "resting room A", "guest room A" or the like, the camera (ID) may be "00", "01", "02", "03" or the like respectively as the camera information, as shown in FIG. 3F. Further, in case that one position measuring area is wide and a plurality of cameras exist in the position measuring area, a plurality of cameras (ID) may be assigned to one installation position (location) Further, in case that the imaging area of camera is wide like a surveillance camera and a plurality of position measuring devices 2 exist in the imaging area, a plurality of installation positions (location) may correspond to one camera (ID).

FIGS. 4A to 4C indicate an example of the camera image managing database 17. The camera image managing database 17 stores a plurality of camera information in advance and stores image data created by a plurality of cameras 1. Any one of FIGS. 4A to 4C, which are indicated as an example, may be applied to the present embodiment.

For example, in case that the camera (ID) is "00" as the camera information, the image data may be association data between date and time information "20080125 10:00:00", "20080125 10:00:10" and "20080125 10:00:20", and file information "20080125-001.jpg", "20080125-002.jpg" and "20080125-003.jpg", as shown in FIG. 4A.

For example, in case that the camera (ID) is "00" as the camera information, the image data may be association data among date information "20080125", time information "10:00:00", "10:00:10" and "10:00:20", and file information "20080125-001.jpg", "20080125-002.jpg" and "20080125-003.jpg", as shown in FIG. 4B.

For example, in case that the camera (ID) is "00", "01", "02", "03" or the like as the camera information, the image data may be file information "00-20080125-001.jpg", "01-20080125-001.jpg", "02-20080125-001.jpg", "03-20080125-001.jpg" or the like respectively as shown in FIG. 4C.

These image data may be made from moving picture.

FIGS. 5A to 5C indicate an example of the user position managing database 18. The user position managing database 18 stores the user information and the specific position information which represents the identified position. The specific position information is updated with the latest information. Any one of FIGS. 5A to 5C, which are indicated as an example, may be applied to the present embodiment.

For example, in case that the user information (ID) is "00", "01", "02", "03" or the like, the position information (ID) may be "00", "01", "02", "03" or the like respectively as the specific position information, as shown in FIG. 5A. The position information (ID) corresponds to the installation position (ID) shown in FIGS. 3A to 3C.

For example, in case that the user information (ID) is "00", "01", "02", "03" or the like, the position information (coordinates) may be "(0, 0)", "(0, 10)", "(0, 20)", "(10, 0)" or the like respectively as the specific position information, as shown in FIG. 5B. The position information (coordinates) corresponds to the installation position (coordinates) shown in FIGS. 3D and 3E.

For example, in case that the user information is "Morisaki", "Tanaka", "Nakamura", "Suzuki" or the like, the position information may be "meeting room A", "working room A", "resting room A", "guest room A" respectively as the specific position information. The position information corresponds to the installation position (location) shown in FIG. 3F.

The control unit 10 selects camera 1, which corresponds to the identified position, as a selected camera 1 out of a plurality of cameras 1 (operation 4). Details for the operation 4 will be described later.

FIGS. 6A to 6D indicate an example of a user presence information managing database 19. The user presence information managing database 19 stores the user information and the image data to be displayed by the display unit 8 (selected image data). The selected image data contains always the latest data. Any one of FIGS. 6A to 6D, which are indicated as an example, may be applied to the present embodiment.

For example, in case that the user information (ID) is "00", "01", "02", "03" or the like, the selected image data may be a presence "00-20080125-001.jpg", "01-20080125-001.jpg", "02-20080125-001.jpg", "03-20080125-001.jpg" or the like respectively, as shown in FIG. 6A. The user information (ID) corresponds to the user information (ID) shown in FIGS. 5A and 5B, and the presence corresponds to the file shown in FIG. 4C.

For example, in case that the user information is "Morisaki", "Tanaka", "Nakamura", "Suzuki" or the like, the selected image data may be the presence "00-20080125-001.jpg", "01-20080125-001.jpg", "02-20080125-001.jpg", "03-20080125-001.jpg" or the like respectively, as shown in FIG. 6B. The user information (ID) corresponds to the user information (ID) shown in FIG. 5C, and the presence corresponds to the file information shown in FIG. 4C.

For example, in case that the user information (ID) is "00", the selected image data may be association data between date and time information "20080125 10:00:00", "20080125 10:00:10" and "20080125 10:00:20", and file information "20080125-001.jpg", "20080125-002.jpg" and "20080125-003.jpg", as shown in FIG. 6C. The user information (ID) corresponds to the user information (ID) shown in FIGS. 5A and 5B, and the presence corresponds to the file information shown in FIG. 4A.

For example, in case that the user information (ID) is "00", the selected image data may be association data among date information "20080125", time information "10:00:00", "10:00:10" and "10:00:20", and file information "20080125-001.jpg", "20080125-002.jpg" and "20080125-003.jpg", as shown in FIG. 6D. The user information (ID) corresponds to the user information (ID) shown in FIGS. 5A and 5B, and the presence corresponds to the file information shown in FIG. 4B.

FIGS. 7A to 7C indicate an example of the position identifying database 20. The position identifying database 20 stores a plurality of unique IDs, each of which is held in each of a plurality of position measuring devices 2, and a plurality of position measuring device position information each of which represents a position of each of a plurality of position measuring devices 2. Any one of FIGS. 7A to 7C, which are indicated as an example, may be applied to the present embodiment.

For example, in case that the unique ID is "00", "01", "02", "03" or the like, the position measuring device position information may be "00", "01", "02", "03" or the like respectively, as shown in FIG. 7A.

For example, in case that the unique ID is "00", "01", "02", "03" or the like, the position measuring device position information may be "(0, 0)", "(0, 10)", "(0, 20)", "(10, 0)" or the like respectively, as shown in FIG. 7B.

For example, in case that the unique ID is "00", "01", "02", "03" or the like, the position measuring device position information may be "meeting room A", "working room A", "resting room A", "guest room A" or the like respectively, as shown in FIG. 7C.

[Operation]

An operation of the object image displaying system will be described in the following according to the first embodiment of the present invention. Here, it is exemplified that the user information is "00".

Figure 8:
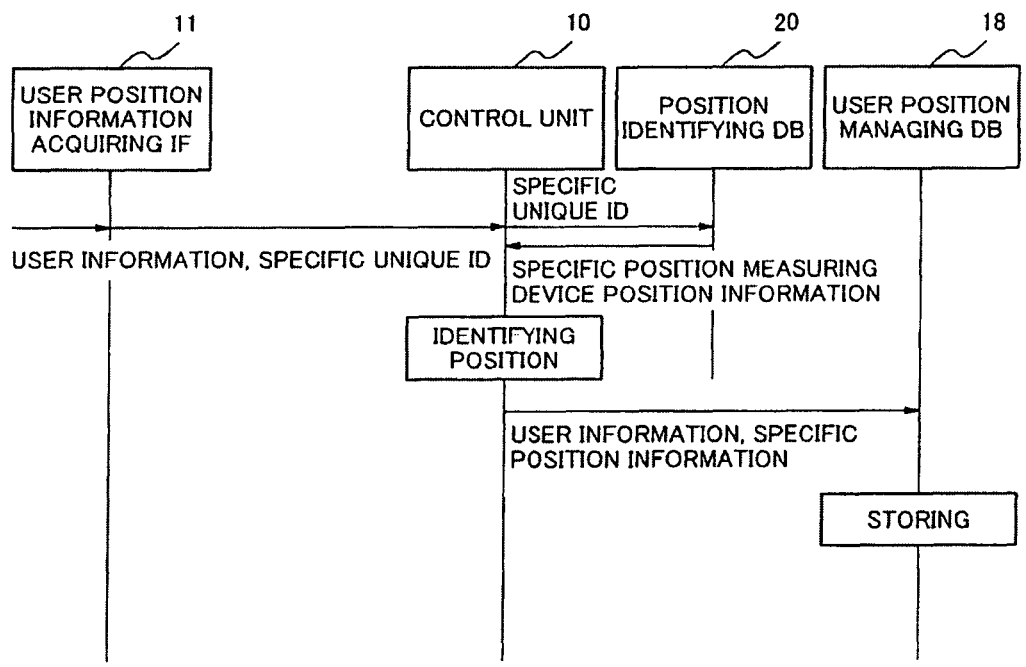
FIG. 8 is a flowchart showing a position information storing process, as an operation of the object image displaying system according to the first to the seventh embodiments of the present invention.

FIG. 8 is a flowchart showing a position information storing process.

Each of a plurality of position measuring devices 2 sends its own unique ID. The identifying part 31 of the control unit 10 identifies the identified position as follows, when the position measuring terminal 3 exists in the specific position measuring area out of plural position measuring areas. That is, the identifying part 31 identifies the position of the specific position measuring device 2 as the identified position, based on wireless communication between the position measuring terminal 3 and the specific position measuring device 2, which corresponds to the specific position measuring area, out of a plurality of position measuring devices 2.

Specifically, the position measuring terminal 3 receives the unique ID sent from the specific position measuring device 2 out of plural position measuring devices 2 through carrying out wireless communication, when the position measuring terminal 3 exists in the specific position measuring area. At this time, the position measuring terminal 3 sends the specific unique ID which corresponds to the received unique ID, and the user information, for example, user information "00" which is held by the position measuring terminal 3, to the server. Specifically, the position measuring terminal 3 sends the specific unique ID and the user information to the control unit 10 of the server 4 through the user position information acquiring interface 11.

The identifying part 31 of the control unit 10 selects specific position measuring information (position of the specific position measuring device 2) which corresponds to the specific unique ID, out of a plurality of position measuring information (positions of a plurality of position measuring devices 2), with reference to the position identifying database 20. The identifying part 31 identifies position of the specific position measuring device 2, which the specific position measuring information represents, as the identified position.

The identifying part 31 makes the user position managing database 18 to store the user information "00" and the specific position information which represents the identified position.

Further, when the position measuring terminal 3 exists in the specific position measuring area out of a plurality of position measuring areas, the specific position measuring device 2 acquires the user information "00" from the position measuring terminal 3 through wireless communication. Then, the specific position measuring device 2 outputs the specific unique ID, which is its own unique ID, and the acquired user information "00" to the control unit 10 through the user position information acquiring interface 11. Here, the control unit 10 may identify the identified position, based on the specific unique ID. Further, according to the identifying method, it is necessary for the position measuring device 2 to connect with the network 5.

Infrared rays, wireless LAN, specific power-saving wireless, Bluetooth, RFID (Radio Frequency Identification) or the like may be applied to wireless communication from the specific position measuring device 2 to the position measuring terminal 3. Moreover, wireless communication of wireless LAN and specific power-saving wireless may also be applied to communication means (wireless network mentioned above) between the position measuring terminal 3 and the server 4.

Figure 9:
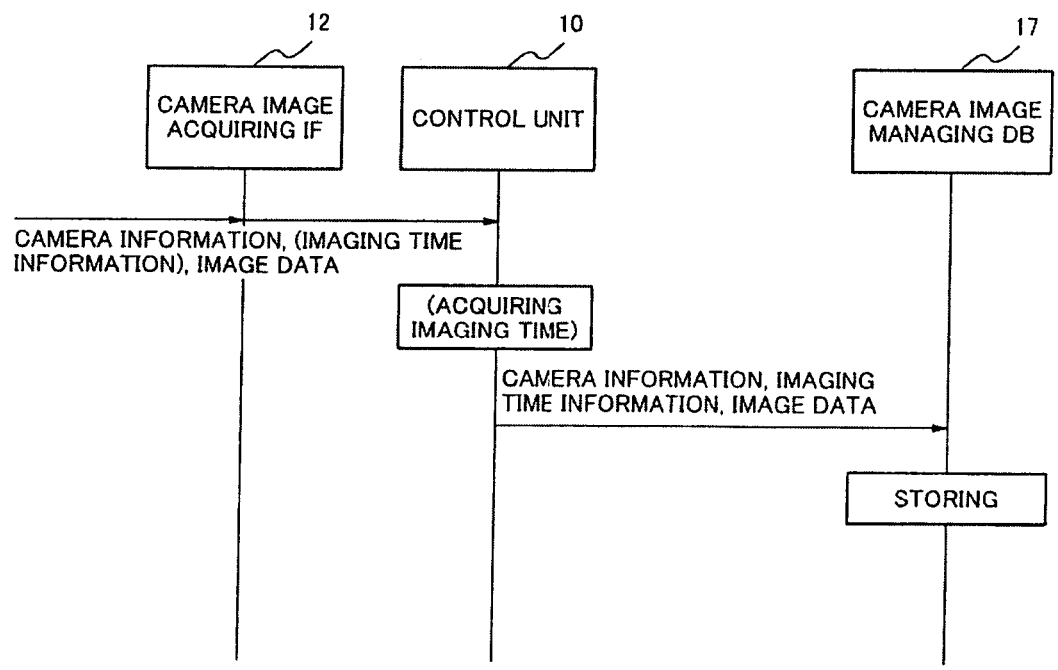
FIG. 9 is a flowchart showing a camera image storing process, as an operation of the object image displaying system according to the first to the seventh embodiments of the present invention.

FIG. 9 is a flowchart showing a camera image storing process.

A plurality of cameras 1 images a plurality of imaging areas respectively and create the image data representing the image. Each of a plurality of cameras 1 outputs its own camera information, which identifies camera, and the created image data to the control unit 10 through the camera image acquiring interface 12.

The image control part 34 of the control unit 10 makes the camera image managing database 17 store the image data, which are created by a plurality of cameras 1, associated with a plurality of camera information respectively.

Here, information, which represents imaging time (date and time) when the image data is created, may also be outputted, in case that each of a plurality of cameras 1 outputs its own camera information which identifies camera, and the created image data to the control unit 10. In this case, the image control part 34 makes the camera image managing database 17 store the imaging time (date and time) and the image data, which are created by a plurality of cameras 1, associated with a plurality of camera information respectively.

Figure 10:
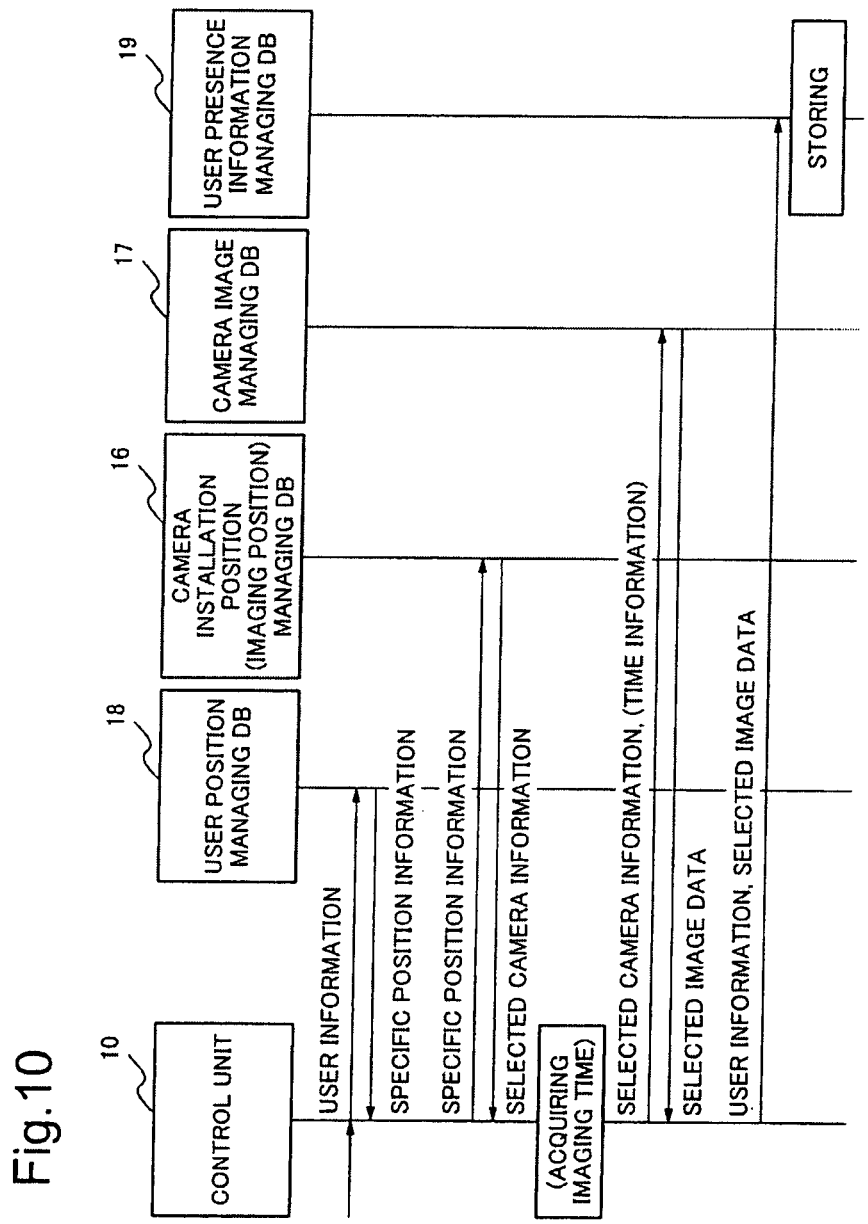
FIG. 10 is a flowchart showing a presence storing process, as an operation of the object image displaying system according to the first and the third embodiments of the present invention.

FIG. 10 is a flowchart showing a presence storing process.

The selecting part 32 of the control unit 10 retrieves the specific position information which is associated with the user information "00", with reference to the user position managing database 18. The selecting part 32 reads the specific position information from the user position managing database 18.

The selecting part 32 selects the camera information (camera 1), which corresponds to the specific position information, out of a plurality of camera information (camera 1), as the selected camera information (selected camera 1), with reference to the camera installation position (imaging position) managing database 16. The selecting part 32 reads the selected camera information from the camera installation position (imaging position) managing database 16.

The selecting part 32 selects the image data created by the selected camera 1, which the selected camera information represents, as the selected image data, with reference to the camera image managing database 17. The selecting part 32 reads the selected images data from the camera image managing database 17.

As mentioned above, the control unit 10 selects the selected image data corresponding to the identified position out of the image data created by a plurality of cameras 1.

The selecting part 32 of the control unit 10 makes the user presence information managing database 19 store the selected image data which is associated with the user information "00".

Figure 11:
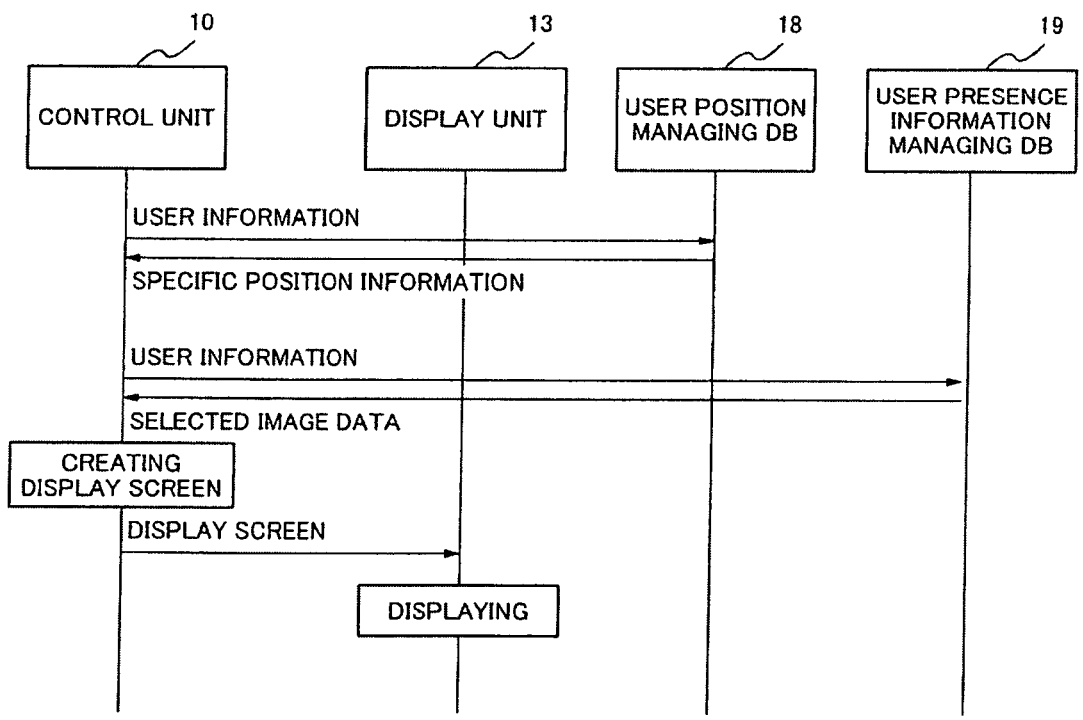
FIG. 11 is a flowchart showing a display process, as an operation of the object image displaying system according to the first to the eighth embodiments of the present invention.

FIG. 11 is a flowchart showing a display process.

For example, when the display control part 33 of the control unit 10 is given the user information "00", or the presence storing process has been completed, the display control part 33 acquires the selected images data associated with the user information "00", with reference to the user presence information managing database 19.

At this time, the display control part 33 creates a display screen to make the display unit 8 display the user information "00" and the selected image data.

The display control part 33 makes the display unit 8 display the display screen through the display interface 13.

Here, when the display control part 33 of the control unit 10 is given the user information "00", or the presence storing process has been completed, the display control part 33 may acquire the specific position information associated with the user information "00", with reference to the user position managing database 18. In this case, the display control part 33 acquires the selected image data associated with the user information "00" with reference to the user presence information managing database 19, and creates the display screen to make the display unit 8 display the user information "00", the specific position information and the selected image data and makes the display unit 8 display the display screen through the interface 13.

Figure 12A:
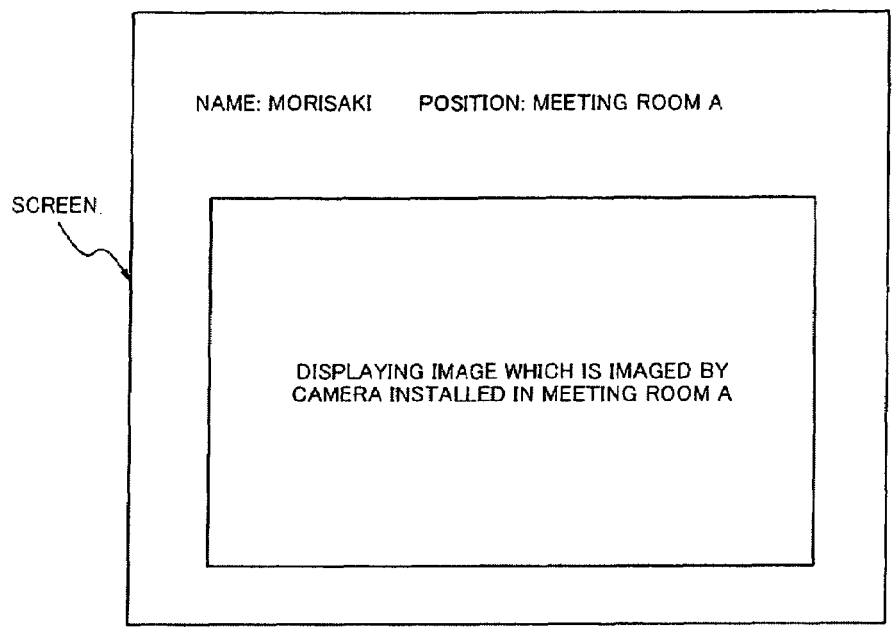
FIG. 12A indicates a display screen of a display unit of the object image displaying system according to the first to the eighth embodiments of the present invention.

Here, it is assumed that names of users, whose user information are "00", "01", "02" and "03", are "Morisaki", "Tanaka", "Nakamura" and "Suzuki" (refer to FIG. 5C) respectively, and the installation positions of the camera 1 which image these users and create the selected image data (first to fourth selected image data) are "meeting room A", "working room A", "resting room A" and "guest room A" (refer to FIG. 5C) respectively. In this case, the display screen includes, for example, the first selected image data, which images "meeting room A", the user information "Morisaki" and the installation position of the camera 1, which creates the first selected image data, that is, "meeting room A", as shown in FIG. 12A. Here, it may be preferable that the installation position "meeting room A" of the camera 1 is not displayed by the display unit 8.

Figure 12B:
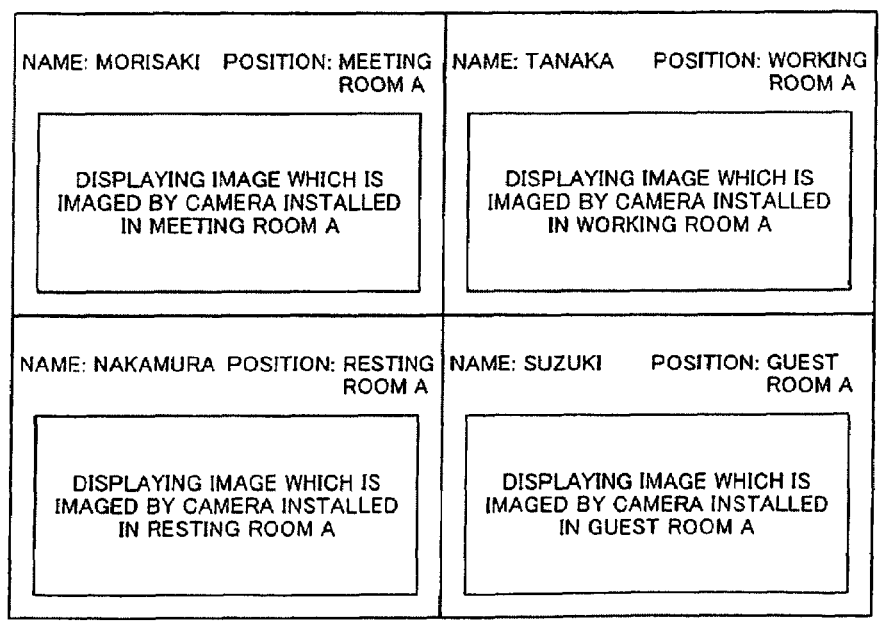
FIG. 12B indicates a display screen of the display unit of the object image displaying system according to the first to the eighth embodiments of the present invention.

For example, different users at different locations may be imaged simultaneously. In this case, a plurality of user information exists. Here, the display screen may include a first divided display screen, a second divided display screen, a third divided display screen and a fourth divided display screen as shown in FIG. 12B. The first divided display screen includes the first selected image data, which images "meeting room A", the user information "Morisaki" and the installation position of the camera 1, which creates the first selected image data, that is, "meeting room A". The second divided display screen includes the second selected image data, which images "working room A", the user information "Tanaka" and the installation position of the camera 1, which creates the second selected image data, that is, "working room A". The third divided display screen includes the third selected image data, which images "resting room A", the user information "Nakamura" and the installation position of the camera 1, which creates the third selected image data, that is, "resting room A". The fourth divided display screen includes the fourth selected image data, which images "guest room A", the user information "Suzuki" and the installation position of the camera 1, which creates the fourth selected image data, that is, "guest room A". Here, it may be preferable that the installation position of the camera 1, that is, "meeting room A", "working room A", "resting room A" or "guest room A" is not displayed by the display unit 8.

As mentioned above, the display control part 33 of the control unit 10 makes the display unit 8 display at least one or all of the selected image data, in case that the selected image data which image a plurality of users are created simultaneously.

[Effect]

The object image displaying system carries out the operations 1 to 4 under the conditions 1 and 2 mentioned above, according to the first embodiment of the present invention.

It is assumed that the object is person (user) (condition 1).

Identification of the identified position, at which the object exists, is carried out by the positioning system (includes the position measuring terminal 3 possessed by user and a plurality of position measuring devices 2) and the server 4 (operation 1).

The positioning system carries out the control point surveying by which the server 4 identifies the identified position (operation 2).

A plurality of position measuring devices 2 are installed at positions corresponding to positions at which a plurality of cameras 1 is installed respectively. In this case, a plurality of position measuring area correspond to a plurality of imaging areas respectively (operation 3).

By selecting the installation positions of a plurality of cameras 1, a plurality of imaging areas do not overlap each other (condition 2).

The control unit 10 selects the camera 1 corresponding to the identified position out of a plurality of cameras 1 as the selected camera 1 (operation 4).

As a result, the server 4 selects the selected image data, which is created by the selected camera 1, out of the image data created by a plurality of cameras 1 and makes the display unit 8 display the selected image data. For this reason, according to the object displaying system of the first embodiment of the present invention, presence of the object is updated automatically. For example, it is assumed that the object is an employee of organization and a plurality of cameras 1 and a plurality of position measuring devices 2 are installed in each of a plurality of rooms of the above mentioned organization. In this case, a person related to the employee can grasp that the employee moves from one room to anther room through watching the selected image data which is displayed by the display unit 8, according to the object image displaying system of the first embodiment of the present invention.

Moreover, it is assumed that a plurality of cameras 1 and a plurality of position measuring devices 2 are installed in each of a plurality of departments in each room. In this case, the person related to the employee can grasp the following situation through watching the selected image data which is displayed by the display unit 8, according to the object image displaying system of the first embodiment of the present invention. That is, the person related to the employee can grasp that the employee enters into a different situation (different business) while the employee stays in the same room, in case that the employee moves from one department to anther department to engage in business of the latter department. Moreover, according to the object image displaying system of the first embodiment of the present invention, the person related to the employee can grasp even a situation, in which the employee moves around in the same location (room), for example, for telephoning and arguing orally, through watching sequentially the selected image data which is displayed by the display unit 8.

Furthermore, according to the object image displaying system of the first embodiment of the present invention, the person related to the employee can grasp behavior of the employee in sequence, through watching sequentially the selected image data which is displayed by the display unit 8. That is, it is possible to analyze moving history of the employee. This is effective not only in case that the object is person but also in case that the object is substance.

The above mentioned description makes it clear that even a situation (presence), which cannot be represented by the conventional use of message and memo, can be represented precisely according to the object image displaying system of the first embodiment of the present invention.

A Second Embodiment of the Present Invention

According to the second embodiment of the present invention, an object image displaying system carries out operations 2' and 4', which will be described later, instead of the operations 2 and 4, in the first embodiment of the present invention. The description of overlapping part of the second embodiment of the present invention with the first embodiment of the present invention is omitted.

[Configuration]

According to the embodiment of the present invention, a positioning system carries out the trilateration by which the server 4 identifies the identified position (operation 2'). The control unit 10 selects a camera 1 nearest to the identified position as a selected camera 1 out of a plurality of cameras 1 (operation 4').

[Operation]

An operation of the object image displaying system will be described in the following, according to the second embodiment of the present invention. Here, it is exemplified that the user information of user is "00".

First, the position information storing process (refer to FIG. 8) and the camera image storing process (refer to FIG. 9) are carried out. Next, a presence storing process is carried out.

FIG. 13 is a flowchart showing the presence storing process.

The selecting part 32 of the control unit 10 retrieves the specific position information which is associated with the user information "00", with reference to the user position managing database 18. The selecting part 32 reads the specific position information from the user position managing database 18.

The selecting part 32 selects the position information, which corresponds to the specific position information, out of a plurality of position information, as a group of candidate position information, with reference to the camera installation position (imaging position) managing database 16. The selecting part 32 selects camera information, which corresponds to the group of candidate position information, as a group of candidate camera information out of a plurality of camera information (camera 1) with reference to the camera installation position (imaging position) managing database 16. The selecting part 32 reads the group of candidate position information and the group of candidate camera information from the camera installation position (imaging position) managing database 16. The selecting part 32 carries out a most preferable camera deciding process by use of the specific position information, the group of candidate position information and the group of candidate camera information.

Figure 14:
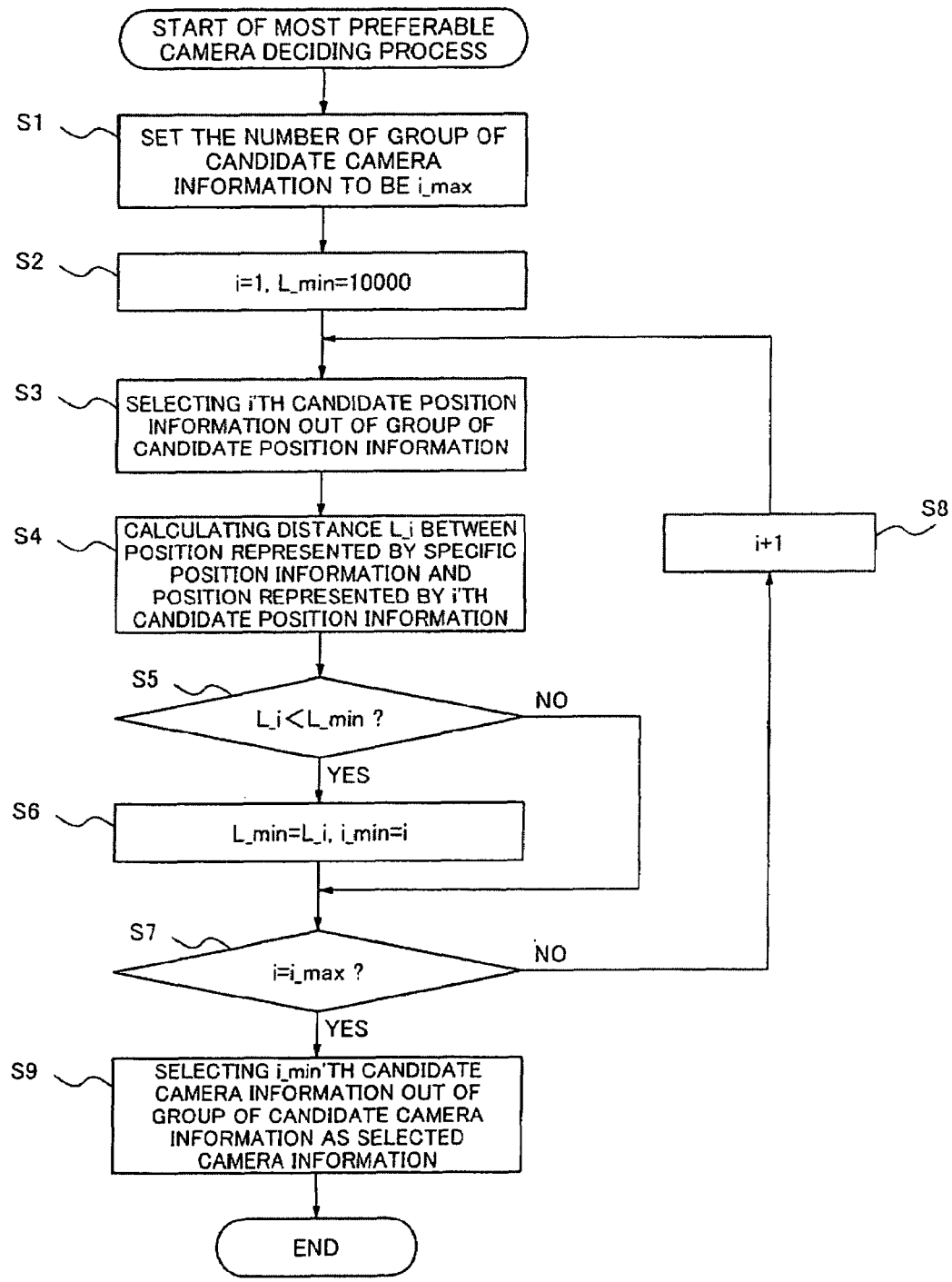
FIG. 14 is a flowchart showing a most preferable camera deciding process in the presence storing process, as an operation of the object image displaying system according to the second to the fourth embodiments of the present invention.

FIG. 14 is a flowchart showing the most preferable camera deciding process in the presence storing process.

In the most preferable camera deciding process, the selecting part 32 of the control unit 10 substitutes the number of the group of candidate camera information (or group of candidate position information) for i_max (integer) (Step S1). Number of the group of candidate camera information is the same as one of the group of candidate position information. The selecting part 32 substitutes i to be 1 and substitutes preset distance L_min for 10000, as an initial value (Step S2).

In case that the group of candidate position information includes first to i_max'th candidate position information, the selecting part 32 selects i'th candidate position information (i is integer which is not less than 1 and not larger than i_max) (Step S3).

Next, the selecting part 32 calculates distance L_i between the identified position which the specific position information represents, and the position which the i'th candidate position information represents (Step S4). Here, in case that the distance L_i is calculated, it is desirable to use the position information (coordinates) of the camera installation position (imaging position) managing database 16 shown in, for example, FIGS. 3D and 3E Next, the selecting part 32 compares the distance L_i with the preset distance L_min (Step S5). In case that the distance L_i is shorter than the preset distance L_min (yes in Step S5), the selecting part 32 substitutes the preset distance L_min for the distance L_i and substitutes i_min for i (Step S6).

On the other hand, in case that the distance L_i is not shorter than the preset distance L_min (no in Step S5), the selecting part 32 skips Step S6.

In case that i is not equal to i_max (no in Step S7), the selecting part 32 makes i increase by 1 (Step S8) and carries out Step S3.

On the other hand, in case that i is equal to i_max (yes in Step S7), the selecting part 32 selects the i_min'th candidate camera information out of the group of candidate camera information as the selected camera information (Step S9).

As mentioned above, the selecting part 32 of the control unit 10 selects the camera information (camera 1) nearest to the identified position, which the specific position information represents, out of a plurality of camera information (camera 1) as the selected camera information (selected camera 1), with reference to the user position managing database 18 and the camera installation position (imaging position) managing database 16.

The selecting part 32 of the control unit 10 selects the image data created by the selected camera 1, which the selected camera information represents, as the selected image data with reference to the camera image managing database 17. The selecting part 32 reads the selected image data from the camera image managing database 17. The selecting part 32 makes the user presence information managing database 19 store the selected image data associated with the user information "00".

Next, the display process (refer to FIG. 11) is carried out.

Further, according to the object image displaying system of the second embodiment of the present invention, the operation 2 instead of the operation 2' may be carried out.

According to the embodiment of the present invention, the positioning system carries out the control point surveying by which the server 4 identifies the identified position (operation 2).

With regard to the operation 2, the identified position is represented in coordinates, as mentioned in the first embodiment of the present invention. Since the remaining process is the same as one of the second embodiment, its description is omitted.

[Effect]

The object image displaying system carries out the operations 1, 2', 3 and 4' under the conditions 1 and 2 mentioned above, according to the second embodiment of the present invention.

It is assumed that the object is person (user) (condition 1).

Identification of the identified position, at which the object exists, is carried out by the positioning system (includes the position measuring terminal 3 possessed by user and a plurality of position measuring devices 2) and the server 4 (operation 1).

The positioning system carries out the trilateration by which the server 4 identifies the identified position (operation 2').

A plurality of position measuring devices 2 are installed at positions corresponding to positions at which a plurality of cameras 1 is installed respectively. In this case, a plurality of position measuring area correspond to a plurality of imaging areas respectively (operation 3).

By selecting the installation positions of a plurality of cameras 1, a plurality of imaging areas do not overlap each other (condition 2).

The control unit 10 selects the camera 1 nearest to the identified position out of plural cameras 1 as the selected camera 1 (operation 4').

As a result, the server 4 selects the selected image data created by the selected camera 1 out of the image data created by a plurality of cameras 1 and makes the display unit 8 display the selected image data. Therefore, according to the object image displaying system of the second embodiment of the present invention, it is possible to obtain the same effect as that of the first embodiment of the present invention and to represent precisely even a situation (presence) which cannot be represented by the conventional use of message and memo.

Moreover, according to the object image displaying system of the second embodiment of the present invention, even if the position measuring area and the imaging area are not identical each other, the image data created by the selected camera 1 can be displayed by the display unit 8 as the presence (selected images data).

A Third Embodiment of the Present Invention

According to the third embodiment of the present invention, an object image displaying system carries out an operation 3', which will be described later, instead of the operation 3, in the first embodiment of the present invention. The description of overlapping part of the third embodiment of the present invention with the first embodiment of the present invention is omitted.

[Configuration]

Figure 15:
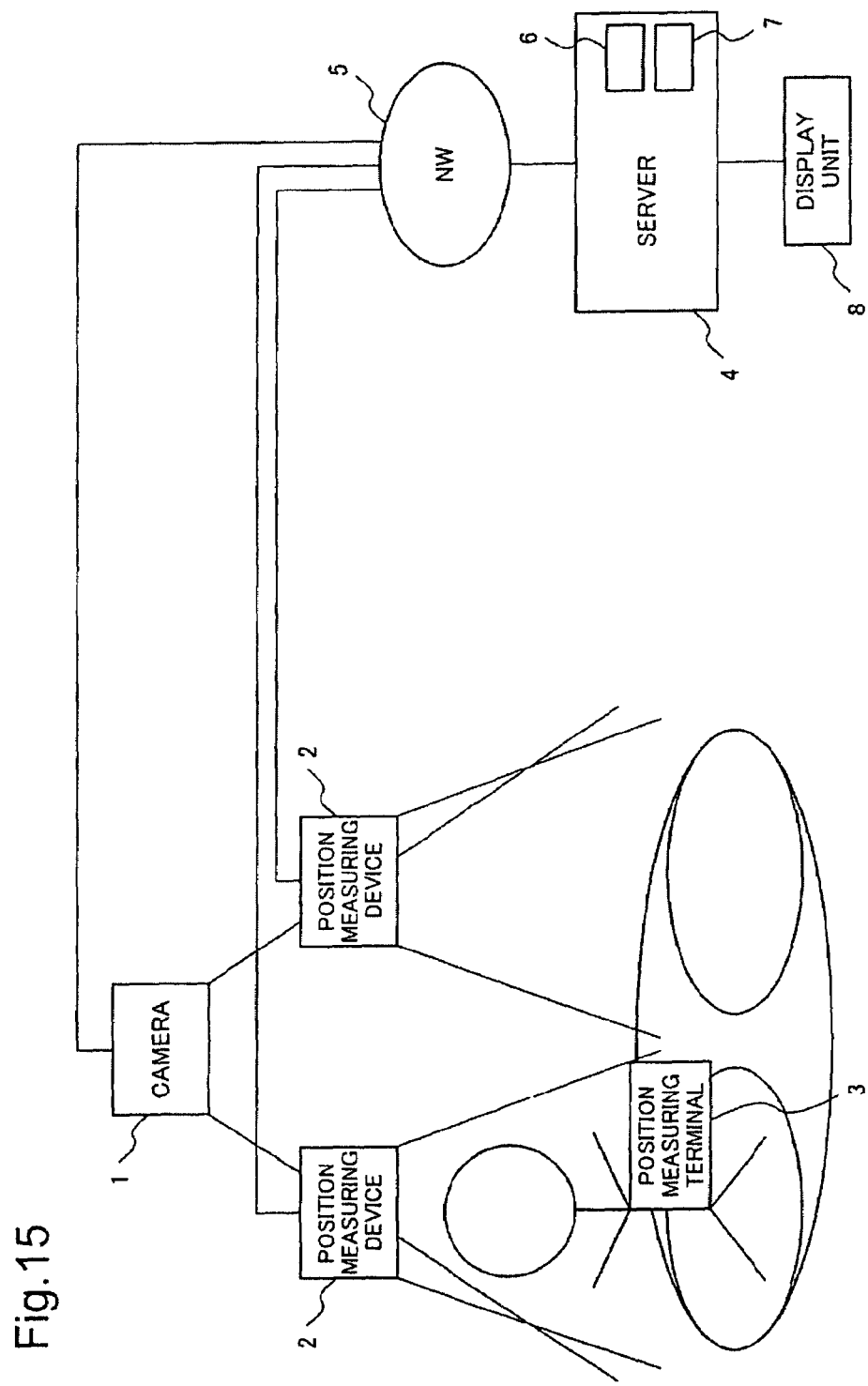
FIG. 15 indicates a configuration of the object image displaying system according to the third embodiment of the present invention.

FIG. 15 shows a configuration of the object image displaying system according to the third embodiment of the present invention. Further, a plurality of position measuring devices 2 may or may not be connected each other via the network 5.

According to the embodiment of the present invention, a plurality of position measuring devices 2 are installed at positions separating from a plurality of positions at which a plurality of cameras 1 are installed. In this case, a plurality of position measuring area are smaller than a plurality of imaging areas respectively (operation 3').

FIGS. 16A to 16D indicate an example of the camera installation position (imaging position) managing database 16. According to the embodiment of the present invention, any one of FIGS. 16A to 16D, which are indicated as an example, may be applicable.

For example, in case that the installation position (ID) is "00", "01", "02", "03" or the like as the position information, the camera (ID) may be "10", "10", "11", "11" or the like respectively as the camera information, as shown in FIG. 16A.

For example, in case that the installation position (ID) is "00", "01", "02", "03, 04" or the like as the position information, the camera (ID) may be "10", "10", "11", "11" or the like respectively as the camera information, as shown in FIG. 16B.

For example, in case that the installation position (coordinates) is "(0, 0)", "(0, 10)", "(0, 20)", "(10, 0)" or the like, the camera (ID) may be "10", "10", "11", "11" or the like respectively as the camera information, as shown in FIG. 16C.

For example, in case that the installation position (coordinates) is "(0, 0)-(10, 20)", "(0, 20)-(10, 40)", "(10, 0)-(20, 20)" or the like, the camera (ID) may be "10", "11", "12" or the like respectively as the camera information, as shown in FIG. 16D.

[Operation]

An operation of the object image displaying system according to the third embodiment of the present invention will be described in the following. Here, it is exemplified that the user information of user is "00".

First, the position information storing process (refer to FIG. 8) and the camera image storing process (refer to FIG. 9) are carried out. Next, the presence storing process (refer to FIG. 10) is carried out. Finally, the display process (refer to FIG. 11) is carried out.

Further, the object image displaying system may carry out the operations 2' and 4' instead of the operations 2 and 4, according to the third embodiment of the present invention. That is, the positioning system may carry out the trilateration by which the server 4 identifies the identified position (operation 2'). Moreover, the control unit 10 may select a camera 1 nearest to the identified position as the selected camera 1 out of a plurality of cameras 1 (operation 4'). Since the operations 2' and 4' are the same as ones of the second embodiment of the present invention, description on the operations 2' and 4' is omitted.

[Effect]

The object image displaying system carries out the operations 1, 2, 3' and 4 under the conditions 1 and 2 mentioned above, according to the third embodiment of the present invention.

It is assumed that the object is person (user) (condition 1).

Identification of the identified position, at which the object exists, is carried out by the positioning system (includes the position measuring terminal 3 possessed by user and a plurality of position measuring devices 2) and the server 4 (operation 1).

The positioning system carries out the control point surveying by which the server 4 identifies the identified position (operation 2).

A plurality of position measuring devices 2 are installed at positions separating from a plurality of positions at which a plurality of cameras 1 are installed. In this case, a plurality of position measuring areas are smaller than a plurality of imaging areas respectively (operation 3').

By selecting the installation positions of a plurality of cameras 1, a plurality of imaging areas do not overlap each other (condition 2).

The control unit 10 selects the camera 1 corresponding to the identified position out of plural cameras 1 as the selected camera 1 (operation 4).

Or the object image displaying system carries out the operations 1, 2', 3' and 4' under the conditions 1 and 2 mentioned above, according to the third embodiment of the present invention. That is, the operations 2' and 4' instead of the operations 2 and 4 are carried out.

The positioning system carries out the trilateration by which the server 4 identifies the identified position (operation 2').

The control unit 10 selects the camera 1 nearest to the identified position out of plural cameras 1 as the selected camera 1 (operation 4').

As a result, the server 4 selects the selected image data created by the selected camera 1 out of the image data created by a plurality of cameras 1 and makes the display unit 8 display the selected image data. Therefore, according to the object image displaying system of the third embodiment of the present invention, it is possible to obtain the same effect as that of the first embodiment of the present invention and to represent precisely even a situation (presence) which cannot be represented by the conventional use of message and memo.

Moreover, according to the object image displaying system of the third embodiment of the present invention, it is possible to obtain the same effect as that of the second embodiment of the present invention and even if the position measuring area and the imaging area are not identical each other, the image data created by the selected camera 1 can be displayed by the display unit 8 as the presence (selected images data).

A Fourth Embodiment of the Present Invention

According to the fourth embodiment of the present invention, an object image displaying system adopts a condition 2', which will be described later, instead of the condition 2, and carries out operations 3" and 4', which will be described later, instead of the operations 3' and 4, in the third embodiment of the present invention. The description of overlapping part of the fourth embodiment of the present invention with the first to the third embodiments of the present invention is omitted.

[Configuration]

Figure 17:
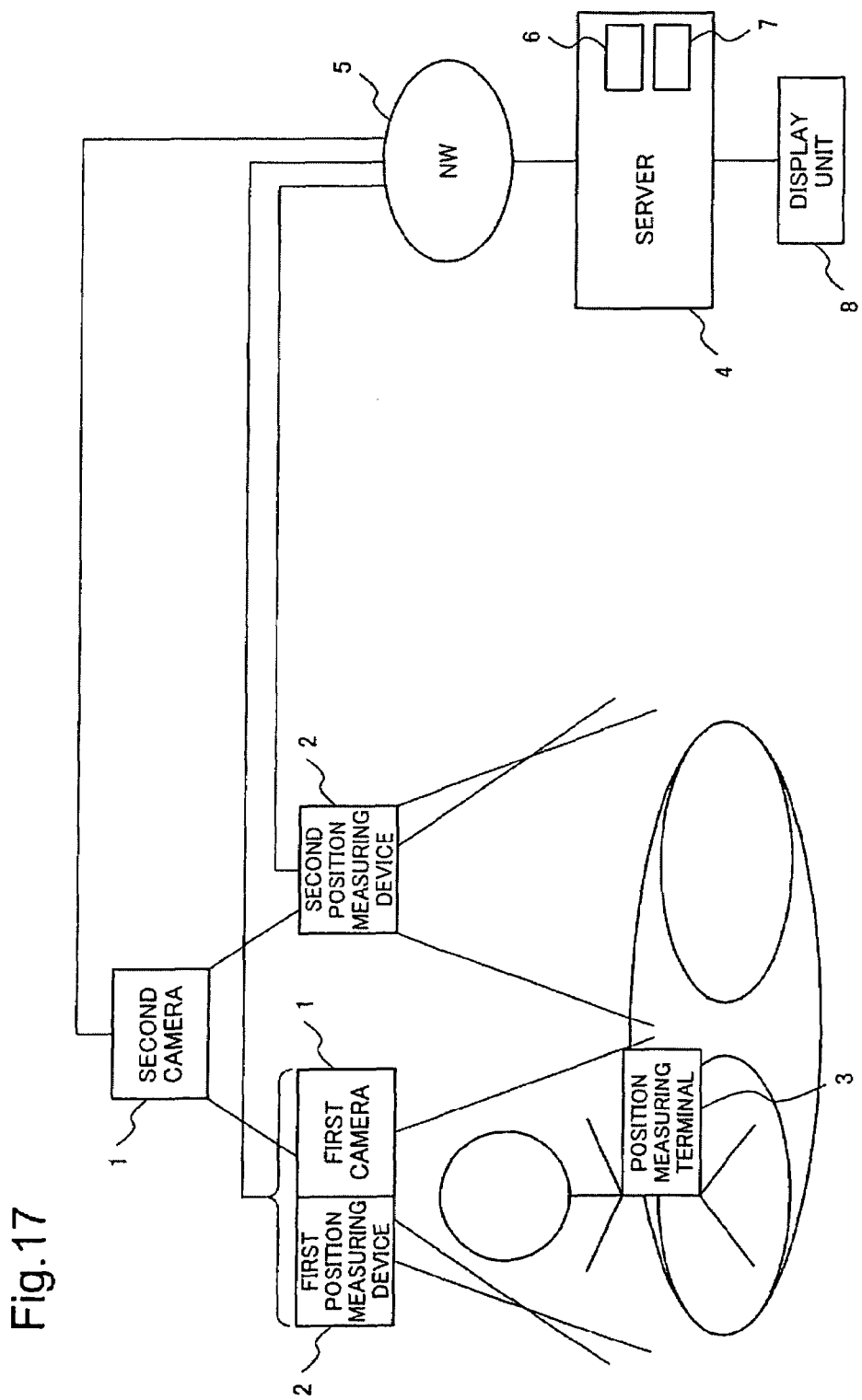
FIG. 17 indicates a configuration of the object image displaying system according to the fourth embodiment of the present invention.

FIG. 17 indicates a configuration of the object image displaying system according to the fourth embodiment of the present invention. Further, a plurality of position measuring devices 2 may or may not be connected each other via the network 5.

A first position measuring device 2 out of a plurality of position measuring devices 2 is installed at a position corresponding to a position at which a first camera 1 out of a plurality of cameras 1 is installed. A second position measuring device 2 out of a plurality of position measuring devices 2 is installed at a position separating from a plurality of positions at which a plurality of cameras 1 are installed. A second camera 1 out of a plurality of cameras 1 is installed at a position separating from the positions at which a plurality of position measuring devices 2 are installed. A first position measuring area, in which the first position measuring device 2 can carry out wireless communication, out of a plurality of position measuring areas, corresponds to the imaging area, which the first camera 1 can image, out of a plurality of imaging areas. Moreover, an imaging area, which the first camera 1 can image, and a plurality of position measuring areas are smaller than an imaging area which the second camera 1 can image (operation 3").

By selecting the installation position of a plurality of cameras 1, the imaging area, which the second camera 1 can image, overlaps with the imaging area which the first camera 1 can image (condition 2').

FIGS. 18A to 18E show the camera installation position (imaging position) managing database 16.

For example, in case that the installation position (ID) is "00", "01", "02", "03" or the like, the camera (ID) may be "20 (, 10)", "10", "21 (, 11)" and "11" or the like respectively as the camera information, as shown in FIG. 18A. In case that camera information representing a first camera and camera information representing a second camera are expressed as the camera information "20" and "10" respectively, camera information "20 (, 10)" means that the camera information "20" representing the first camera is stored in the camera installation position (imaging position) managing database 16 and the camera information "10" representing the second camera is not stored in the camera installation position (imaging position) managing database 16, since the imaging area of the first camera is smaller than one of the second camera. The camera information "21 (, 11)" has the same meaning.

For example, in case that the installation position (coordinates) is "(0, 0)", "(0, 10)", "(0, 20)", "(10, 0)" or the like, the camera (ID) may be "20 (, 10)", "10", "21 (, 11)", "11" or the like respectively as the camera information, as shown in FIG. 18B.

For example, in case that the installation position (ID) is "00", "01", "02", "03, 04" or the like, the camera (ID) may be "10", "10", "11", "11" or the like respectively as the camera information, as shown in FIG. 18C.

For example, in case that the installation position (coordinates) is "(0, 0)", "(0, 10)", "(0, 20)", "(10, 0)" or the like, the camera (ID) may be "10", "10", "11", "11" or the like respectively as the camera information, as shown in FIG. 18D.

For example, in case that the installation position (coordinates) is "(0, 0)-(10, 20)", "(0, 20)-(10, 40)", "(10, 0)-(20, 20)" or the like, the camera (ID) may be "10", "11", "12" or the like respectively as the camera information, as shown in FIG. 18E.

The control unit 10 selects a camera 1 (camera 1 having the smallest imaging area) nearest to the identified position as the selected camera 1 out of the plurality of cameras 1 (operation 4).

[Operation]

An operation of the object image displaying system will be described in the following, according to the fourth embodiment of the present invention. Here, it is exemplified that the user information of user is "00".

First, the position information storing process (refer to FIG. 8) and the camera image storing process (refer to FIG. 9) are carried out. Next, the presence storing process (refer to FIG. 13) is carried out.

The selecting part 32 of the control unit 10 retrieves the specific position information which is associated with the user information "00", with reference to the user position managing database 18. The selecting part 32 reads the specific position information from the user position managing database 18.

The selecting part 32 selects the position information, which corresponds to the specific position information, out of a plurality of position information, as a group of candidate position information, with reference to the camera installation position (imaging position) managing database 16. The selecting part 32 selects the camera information, which corresponds to the group of candidate position information, as a group of candidate camera information out of plural camera information (camera 1), with reference to the camera installation position (imaging position) managing database 16. The selecting part 32 reads the group of candidate position information and the group of candidate camera information from the camera installation position (imaging position) managing database 16.

The selecting part 32 carries out a most preferable camera deciding process by use of the specific position information, the group of candidate position information and the group of candidate camera information.

In the most preferable camera deciding process, the selecting part 32 of the control unit 10 examines whether the group of candidate camera information includes the camera information representing the first camera 1 (first camera information) and the camera information representing the second camera 1 (second camera information).

In case that the group of candidate camera information includes the first camera information and does not include the second camera information, the selecting part 32 selects the first camera information out of the group of candidate camera information as the selected camera information. That is, in case that the first camera 1 is the nearest to the identified position, the first camera information is selected as the selected position information. Here, in case of selecting the camera 1 nearest to the identified position, it is preferable to use the camera information (ID) of the camera installation position (imaging position) managing database 16 which is shown in, for example, FIGS. 18A and 18B out of FIGS. 18A to 18E.

In case that the group of candidate camera information includes the second camera information and does not include the first camera information, the selecting part 32 selects the second camera information out of the group of candidate camera information as the selected camera information. That is, in case that the second camera 1 is the nearest to the identified position, the second camera information is selected as the selected position information. Also in this case, it is preferable to use the camera information (ID) of the camera installation position (imaging position) managing database 16 which is shown in, for example, FIGS. 18A and 18B.

In case that the group of candidate camera information includes both the first camera information and the second camera information, the selecting part 32 selects the first camera information out of the group of candidate camera information as the selected camera information. That is, in case that the first camera 1 is the nearest to the identified position, the first camera information is selected as the selected position information. Also in this case, it is preferable to use the camera information (ID) of the camera installation position (imaging position) managing database 16 which is shown in, for example, FIGS. 18A and 18B.

As mentioned above, the selecting part 32 of the control unit 10 selects the camera information which represents the camera 1 nearest to the identified position represented by the specific position information, out of a plurality of camera information (camera 1) as the selected camera information (selected camera 1) with reference to the user position managing database 18 and the camera installation position (imaging position) managing database 16.

The most preferable camera deciding process (refer to FIG. 14) of the second embodiment of the present invention can be used in the fourth embodiment of the present invention, since the camera 1 nearest to the identified position is selected, according to the fourth embodiment of the present invention.

That is, in the most preferable camera deciding process, the selecting part 32 of the control unit 10 substitutes the number of the group of candidate camera information (or group of candidate position information) for i_max (integer) (Step S1). The number of the group of candidate camera information is the same as one of the group of candidate position information. The selecting part 32 substitutes i for 1 and substitutes preset distance L_min for 10000, as an initial value (Step S2).

In case that the group of candidate position information includes first to i_max'th candidate position information, the selecting part 32 selects i'th candidate position information (i is integer which is not less than 1 and not larger than i_max) (Step S3).

Next, the selecting part 32 calculates distance L_i between the identified position which the specific position information represents, and the position which the i'th candidate position information represents (Step S4). Here, in case that the distance L_i is calculated, it is preferable to use the position information (coordinates) and the camera information (ID) of the camera installation position (imaging position) managing database 16 shown in, for example, FIG. 18B. Next, the selecting part 32 compares the distance L_i with the preset distance L_min (Step S5). In case that the distance L_i is shorter than the preset distance L_min (yes in Step S5) the selecting part 32 substitutes the preset distance L_min for the distance L_i and substitutes i_min for i (Step S6). On the other hand, in case that the distance L_i is not shorter than the preset distance L_min (no in Step S5), the selecting part 32 skips Step S6.

In case that i is not equal to i_max (no in Step S7), the selecting part 32 makes i increase by 1 (Step S8) and carries out Step S3. On the other hand, in case that i is equal to i_max (yes in Step S7), the selecting part 32 selects the i_min'th candidate camera information out of the group of candidate camera information as the selected camera information (Step S9).

The selecting part 32 of the control unit 10 selects the image data created by the selected camera 1, which the selected camera information represents, as the selected images data, with reference to the camera image managing database 17. The selecting part 32 reads the selected images data from the camera image managing database 17.

The selecting part 32 makes the user presence information managing database 19 store the selected images data associated with the user information "00".

Next, the display process (refer to FIG. 11) is carried out.
[Effect]

The object image displaying system carries out the operations 1, 2, 3" and 4' under the conditions 1 and 2' mentioned above, according to the fourth embodiment of the present invention.

It is assumed that the object is person (user) (condition 1).

Identification of the identified position, at which the object exists, is carried out by the positioning system (includes the position measuring terminal 3 possessed by user and a plurality of position measuring devices 2) and the server 4 (operation 1).

The positioning system carries out the control point surveying by which the server 4 identifies the identified position (operation 2).

The first position measuring device 2 out of a plurality of position measuring devices 2 is installed at the position corresponding to the position at which the first camera 1 out of a plurality of cameras 1 is installed. The second position measuring device 2 out of a plurality of position measuring devices 2 is installed at the position separating from a plurality of positions at which a plurality of cameras 1 are installed. The second camera 1 out of a plurality of cameras 1 is installed at the position separating from the positions at which a plurality of position measuring devices 2 is installed. The first position measuring area, in which the first position measuring device 2 can carry out wireless communication, out of a plurality of position measuring areas, corresponds to the imaging area, which the first camera 1 can image, out of a plurality of imaging areas. Moreover, the imaging area, which the first camera 1 can image, and a plurality of position measuring areas are smaller than the imaging area which the second camera 1 can image (operation 3").

By selecting the installation positions of a plurality of cameras 1, the imaging area, which the second camera 1 can image, overlaps with the imaging area which the first camera 1 can image (condition 2').

The control unit 10 selects the camera 1 (camera 1 having the smallest imaging area) nearest to the identified position as the selected camera 1 out of a plurality of cameras 1 (operation 4').

As a result, the server 4 selects the selected image data, which is created by the selected camera 1, out of the image data created by a plurality of cameras 1, and makes the display unit 8 display the selected image data. Therefore, according to the object image displaying system of the fourth embodiment of the present invention, it is possible to obtain the same effect as that of the first embodiment of the present invention and to represent precisely even a situation (presence) which cannot be represented by the conventional use of message and memo.

Moreover, according to the object image displaying system of the fourth embodiment of the present invention, even if there exists the camera 1 whose imaging area overlaps with other imaging area, the image data created by the selected camera 1 can be displayed by the display unit 8 as the presence (selected images data).

A Fifth Embodiment of the Present Invention

According to the fifth embodiment of the present invention, an object image displaying system carries out operation 4", which will be described later, instead of the operation 4', in the fourth embodiment of the present invention. Description of overlapping part of the fifth embodiment of the present invention with the fourth embodiment of the present invention is omitted.
[Configuration]

Figure 19:
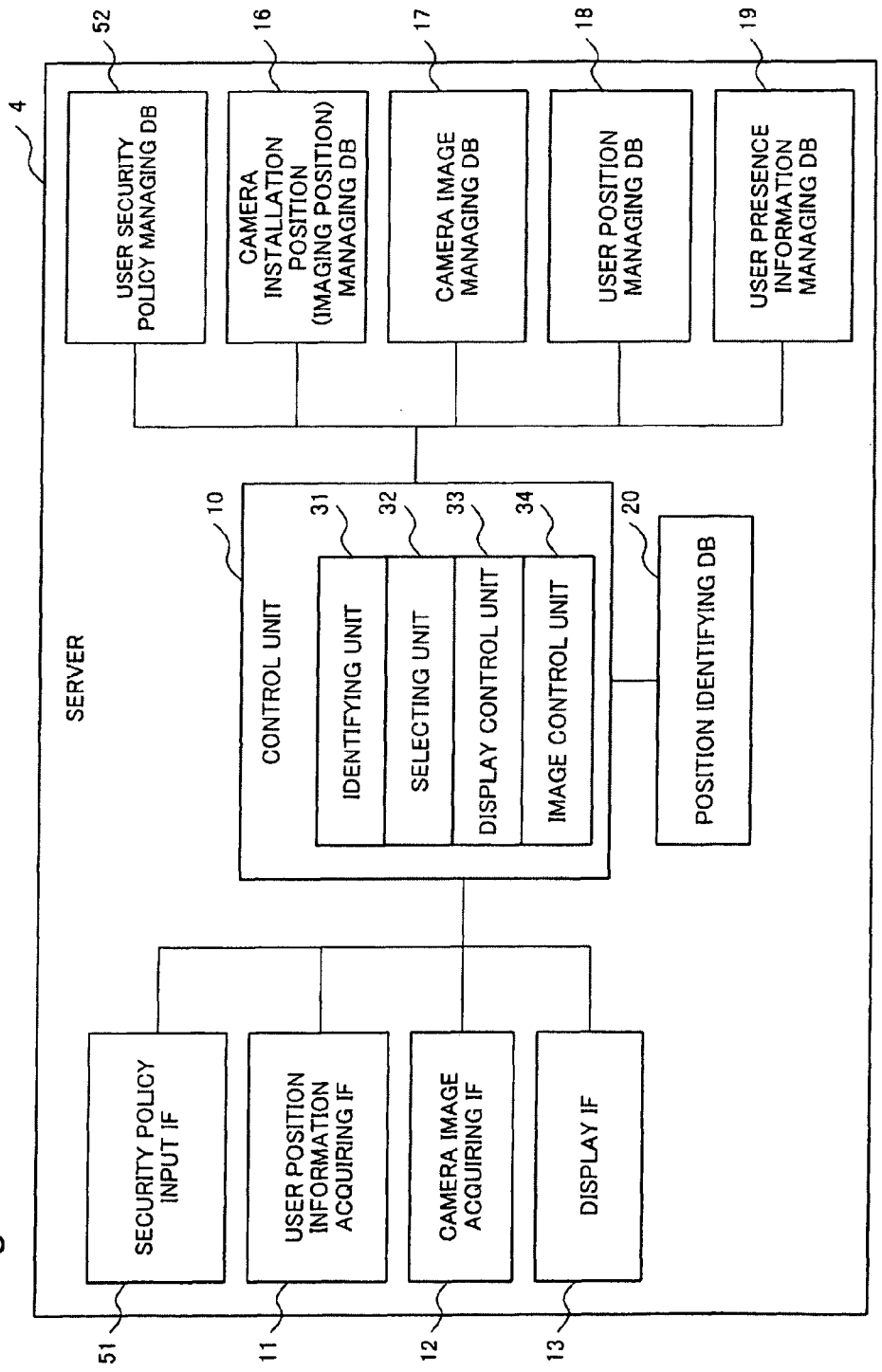
FIG. 19 indicates a configuration of the server of the object image displaying system according to the fifth embodiment of the present invention.

FIG. 19 indicates a configuration of the server 4. Further, the server 4 includes a security policy input IF 52. Further, the storage unit 7 includes a user security policy managing database 52.

FIGS. 20A and 20B indicate the user security policy managing database 52. The user security policy managing database 52 stores a plurality of user information representing a plurality of users respectively, and a plurality of security policy information. Each of a plurality of security policy information represents a group of permitted camera information. The group of permitted camera information represents a group of permitted cameras 1 which the user permits in advance.

For example, in case that the user information (ID) is "00", "01", "02", "03" or the like, the camera information (ID) may be "all", "except 20, 21, 22 and 23", "except 10, 11, 20, 21, 22 and 23" and "except 20, 21, 22 and 23" or the like respectively as the security policy information (group of permitted camera information), as shown in FIG. 20A.

For example, in case that the user information (ID) is "00", "01", "02", "03" or the like, the camera information (ID) may be "30, 10, 11, 20, 21, 22, 23", "30, 10, 11", "30", "30, 10, 11" or the like respectively as the security policy information (group of permitted camera information), as shown in FIG. 20B.

The control unit 10 selects a camera 1, which user permits in advance out of a plurality of cameras 1 and which is the nearest to the identified position (camera 1 having the smallest imaging area), as the selected camera 1 out of a plurality of cameras 1 (operation 4").

[Operation]

An operation of the object image displaying system will be described in the following, according to the fifth embodiment of the present invention. Here, it is exemplified that the user information of user is "00".

Figure 21:
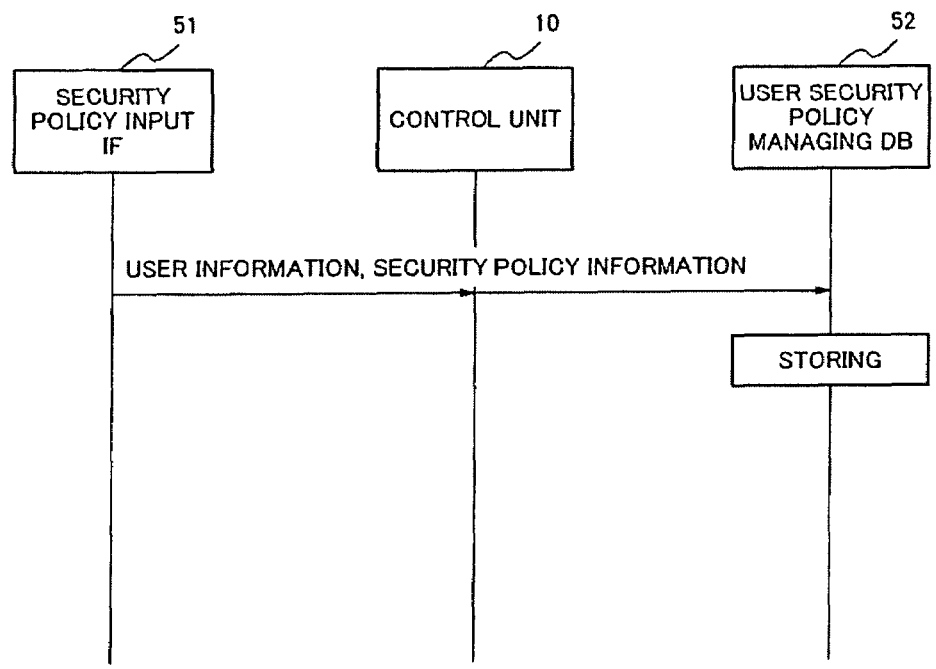
FIG. 21 is a flowchart showing a security policy storing process, as an operation of the object image displaying system according to the fifth and the sixth embodiments of the present invention.

FIG. 21 is a flowchart showing a security policy storing process.

User determines a group of camera 1 which the user permits out of a plurality of cameras 1 in advance. The group of camera 1 which the user permits is called a group of permitted camera. The user operates a terminal to output the user information "00" and the security policy information as the group of permitted camera information representing the group of permitted cameras to the control unit 10 through the security policy input IF 52. The terminal may be the position measuring terminal or other computer, on condition that the terminal can carry out the operation mentioned above.

The control unit 10 makes the user security policy managing database 52 store the user information "00" and the security policy information (group of permitted camera information).

First, the position information storing process (refer to FIG. 8) and the camera image storing process (refer to FIG. 9) are carried out. Next, a presence storing process is carried out.

Figure 22:
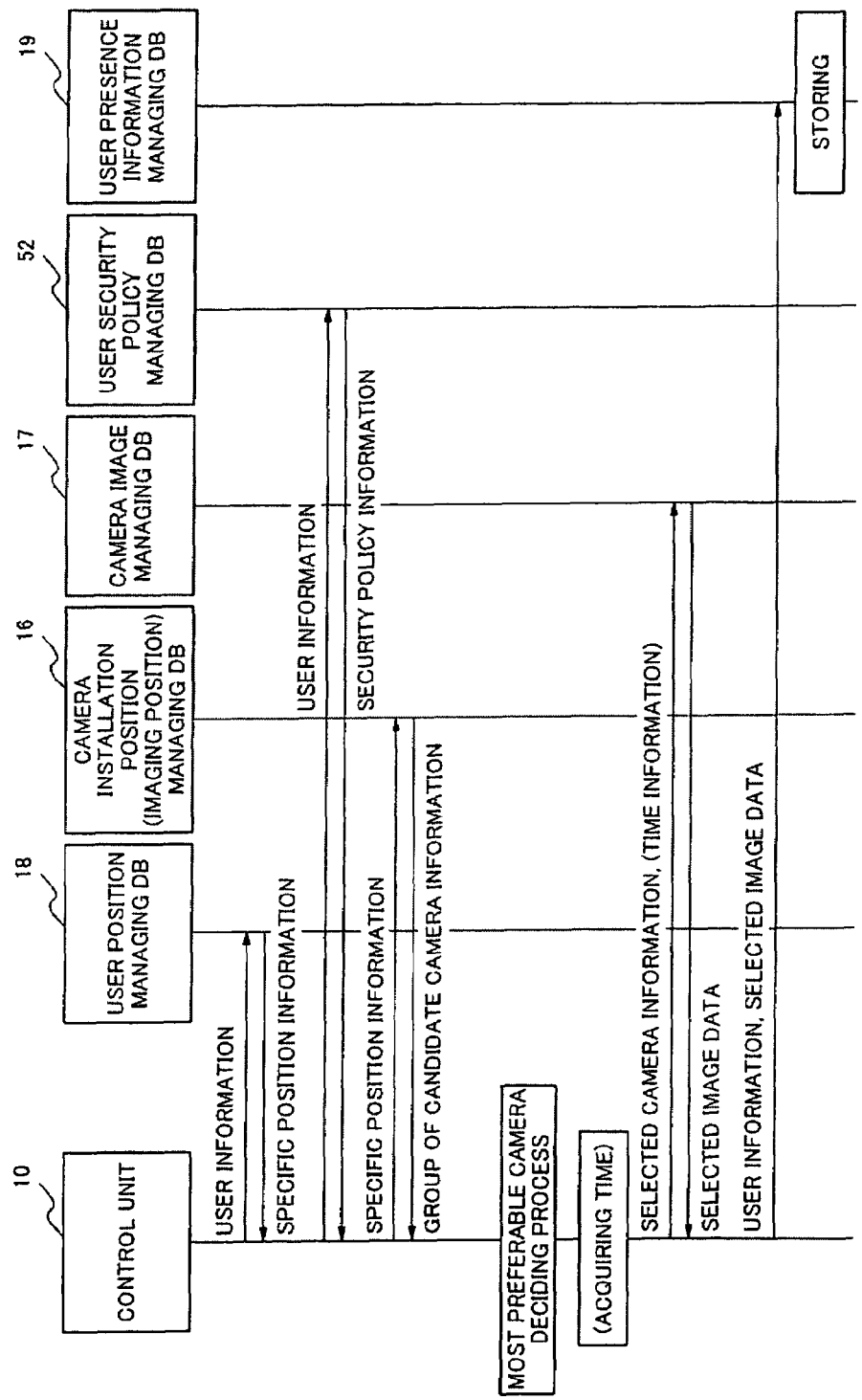
FIG. 22 is a flowchart showing a presence storing process, as an operation of the object image displaying system according to the fifth embodiment of the present invention.

FIG. 22 is a flowchart showing the presence storing process.

The selecting part 32 of the control unit 10 retrieves the specific position information which is associated with the user information "00", with reference to the user position managing database 18. The control unit 10 reads the specific position information from the user position managing database 18.

The selecting part 32 selects the security policy information, which corresponds to the user information "00", out of a plurality of security policy information, with reference to the user security policy managing database 52. The selecting part 32 reads the security policy information from the user security policy managing database 52.

The selecting part 32 selects the position information, which corresponds to the specific position information, out of plural position information, as a group of candidate position information, with reference to the camera installation position (imaging position) managing database 16. The selecting part 32 selects camera information, which corresponds to the group of candidate position information, out of a plurality of camera information (camera 1) as a group of candidate camera information, with reference to the camera installation position (imaging position) managing database 16. The selecting part 32 reads the group of candidate position information and the group of candidate camera information from the camera installation position (imaging position) managing database 16.

The selecting part 32 carries out a most preferable camera deciding process by use of the specific position information, the security policy information, the group of candidate position information and the group of candidate camera information.

In the most preferable camera deciding process, the selecting part 32 of the control unit 10 examines whether the group of candidate camera information includes the security policy information. That is, the selecting part 32 examines whether the group of candidate camera information includes a group of permitted camera information representing a group of permitted cameras which user permits in advance.

In case that the group of candidate camera information includes the group of permitted camera information, the selecting part 32 of the control unit 10 selects the group of permitted camera information out of the group of candidate camera information. Next, the selecting part 32 examines whether the group of permitted camera information includes camera information representing a first camera 1 (first camera information) and camera information representing a second camera 1 (second camera information).

In case that the group of permitted camera information includes the first camera information and does not include the second camera information, the selecting part 32 of the control unit 10 selects the first camera information out of the group of permitted camera information as the selected camera information. That is, in case that the first camera 1 is the nearest to the identified position, the first camera information is selected as the selected position information. Here, in case of selecting the camera 1 nearest to the identified position, it is preferable to use the camera information (ID) of the camera installation position (imaging position) managing database 16 which is shown in, for example, FIGS. 18A and 18B out of FIGS. 18A to 18E.

In case that the group of permitted camera information includes the second camera information and does not include the first camera information, the selecting part 32 of the control unit 10 selects the second camera information out of the group of permitted camera information as the selected camera information. That is, in case that the second camera 1 is the nearest to the identified position, the second camera information is selected as the selected position information. Also in this case, it is preferable to use the camera information (ID) of the camera installation position (imaging position) managing database 16 which is shown in, for example, FIGS. 18A and 18B.

In case that the group of permitted camera information includes both the first camera information and the second camera information, the selecting part 32 of the control unit 10 selects the first camera information out of the group of permitted camera information as the selected camera information. That is, in case that the first camera 1 is the nearest to the identified position, the first camera information is selected as the selected position information. Also in this case, it is preferable to use the camera information (ID) of the camera installation position (imaging position) managing database 16 which is shown in, for example, FIGS. 18A and 18B.

As mentioned above, the selecting part 32 of the control unit 10 selects the camera information representing the camera 1, which is permitted by user in advance and which is the nearest to the identified position represented by the specific position information, out of a plurality of camera information (camera 1) as the selected camera information (selected camera 1), with reference to the user position managing database 18, the camera installation position (imaging position) managing database 16 and the user security policy managing database 52.

In case that the most preferable camera deciding process (refer to FIG. 14) of the second embodiment of the present invention is used in the fifth embodiment of the present invention, the process can be realized by addition of a process to judge presence of the security policy information, since the camera 1 nearest to the identified position is selected according to the fifth embodiment of the present invention.

Figure 23:
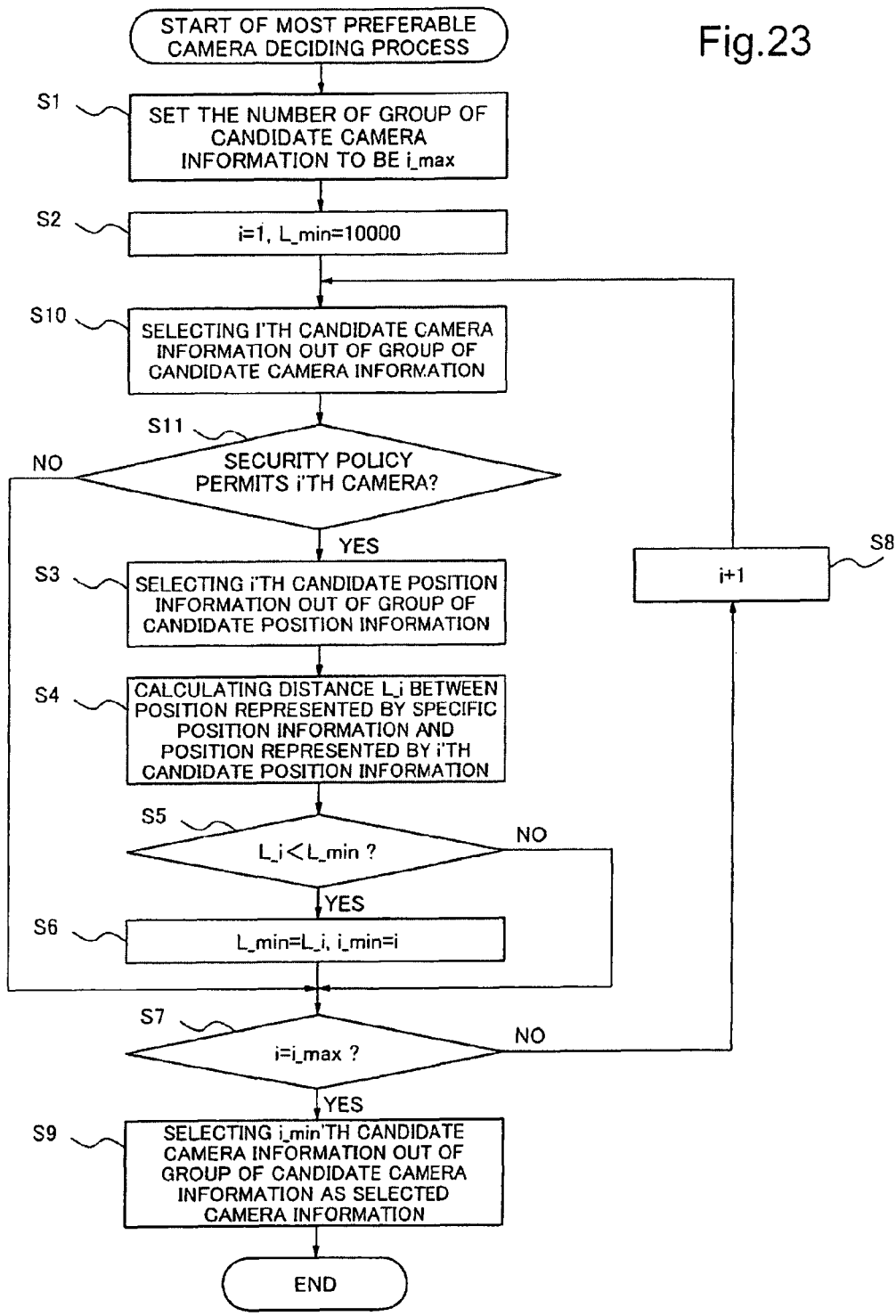
FIG. 23 is a flowchart showing a most preferable camera deciding process in the presence storing process, as an operation of the object image displaying system according to the fifth and the sixth embodiments of the present invention.

FIG. 23 is a flowchart showing the most preferable camera deciding process in the presence storing processing.

In the most preferable camera deciding process, the selecting part 32 of the control unit 10 substitutes number of the group of candidate camera information (or group of candidate position information) to be i_max (integer) (Step S1). Number of the group of candidate camera information is the same as one of the group of candidate position information.

The selecting part 32 substitutes i for 1 and substitutes preset distance L_min for 10000, as an initial value (Step S2).

In case that the group of candidate camera information includes first to i_max'th candidate camera information, the selecting part 32 selects i'th candidate camera information (i is integer which is not less than 1 and not larger than i_max) (Step S10). In case that the i'th candidate camera information is included in the group of permitted camera information representing the security policy information, that is, the group of permitted cameras 1 which user permits in advance (yes in Step S11), the selecting part 32 carries out the following process. In case that the group of candidate position information includes the first to the i_max'th candidate position information, the selecting part 32 selects the i'th candidate position information. That is, the selecting part 32 selects the i'th candidate position information which corresponds to the i'th candidate camera information (Step S3).

Next, the selecting part 32 calculates distance L_i between the identified position which the specific position information represents, and the position which the i'th candidate position information represents (Step S4). Here, in case that the distance L_i is calculated, it is preferable to use the position information (coordinates) and the camera information (ID) of the camera installation position (imaging position) managing database 16 shown in, for example, FIG. 18B.

Next, the selecting part 32 compares the distance L_i with the preset distance L_min (Step S5). In case that the distance L_i is shorter than the preset distance L_min (yes in Step S5), the selecting part 32 substrates the preset distance L_min for the distance L_i and substrates i_min for i (Step S6). On the other hand, in case that the distance L_i is not shorter than the preset distance L_min (no in Step S5), the selecting part 32 skips Step S6.

In case that the i'th candidate camera information does not represent the security policy information, that is, the i'th candidate camera information is not included in the group of permitted camera information (no in Step S11), the selecting part 32 carries out Step S7.

In case that i is not equal to i_max (no in Step S7), the selecting part 32 makes i increase by 1 (Step S8) and carries out Step S10. On the other hand, in case that i is equal to i_max (yes in Step S7), the selecting part 32 selects the i_min'th candidate camera information out of the group of candidate camera information as the selected camera information (Step S9).

The selecting part 32 selects the image data created by the selected camera 1, which the selected camera information represents, as the selected images data, with reference to the camera image managing database 17. The selecting part 32 reads the selected images data from the camera image managing database 17. The selecting part 32 makes the user presence information managing database 19 store the selected images data associated with the user information "00".

Next, the display process (refer to FIG. 11) is carried out.

Further, while the selecting part 32 of the control unit 10 selects the camera 1, which is permitted by user in advance and which is the nearest to the identified position (camera 1 having the smallest imaging area), out of a plurality of cameras 1 as the selected camera 1 according to the operation 4", the present invention is not limited to the operation 4".

It is assumed in the operation 4" that each of a plurality of cameras 1 includes the group of permitted camera with assigned priority out of the first to the last priority. It is also assumed that user has an assigned priority out of the first to the last priority. In this case, the selecting part 32 selects the camera 1, which is the nearest to the identified position, out of a plurality of cameras 1 as the group of permitted cameras 1 and furthermore, selects the camera 1, which corresponds to the user priority, out of the group of permitted cameras 1 as the selected camera 1.

This process will be described in the following with reference to FIGS. 24A to 24C and FIGS. 25A and 25B.

FIGS. 24A to 24C indicate the camera installation position (imaging position) managing database 16. The camera installation position (imaging position) managing database 16 stores in advance a plurality of position information representing a plurality of positions respectively and a plurality of camera information representing a plurality of cameras 1 respectively. With regard to order of priority from the first to the last, it is exemplified that priority has three levels, that is, high level, medium level and low level in the order of priority.

For example, in case that the installation position (ID) is "00" as the position information, the camera (ID) may be "30", "10" and "20" respectively in the order of priority, that is, "high level", "medium level" and "low level" as the camera information representing the group of permitted cameras 1. In case that the installation position (ID) is "01", the camera (ID) may be "30", "10" and "21" respectively in the order of priority, that is, "high level", "medium level" and "low level". In case that the installation position (ID) is "02", the camera (ID) may be "30", "11" and "22" respectively in the order of priority, that is, "high level", "medium level" and "low-level". In case that the installation position (ID) is "03", the camera (ID) may be "30", "11" and "23" respectively in the order of priority, that is, "high level", "medium level" and "low level".

For example, in case that the installation position (ID) is "(0, 0)", "(0, 10)", "(0, 20)", "(10, 0)" or the like instead of "00", "01", "02", "03" or the like as the position information, the camera (ID) may be the same as one shown in FIG. 3A as the camera information representing the group of permitted camera 1, as shown in FIG. 24B.

For example, in case that the installation position (ID) is "(0, 0)-(10, 10)", "(0, 10)-(10, 20)", "(0, 20)-(10, 30)", "(10, 0)-(20, 10)" or the like instead of "00", "01", "02", "03" or the like as the position information, the camera (ID) may be the same as one shown in FIG. 3A as the camera information representing the group of permitted camera 1, as shown in FIG. 24C.

FIGS. 25A and 25B indicate the user security policy managing database 52. The user security policy managing database 52 stores a plurality of user information representing a plurality of users respectively, and a plurality of security policy information in advance. Each of a plurality of security policy information represents one priority level out of the priority levels, that is, "high level", "medium level" and "low level".

For example, in case that the user information (ID) is "00", "01", "02", "03" or the like, the security policy information (priority level) may be "low level", "medium level", "high level", "medium level" or the like respectively, as shown in FIG. 25A.

For example, in case that the user information (ID) is "00", "01", "02", "03" or the like, the security policy information (priority level) may be "00", "01", "02", "01" or the like respectively which represent "low level", "medium level", "high level" and "medium level" respectively, as shown in FIG. 25B.

As a result, in the presence storing process, the selecting part 32 of the control unit 10 selects the camera information representing camera 1, which is the nearest to the identified position represented by the specific position information and which corresponds to the priority level of the user, out of a plurality of camera information (camera 1) as the selected camera information (selected camera 1), with reference to the user position managing database 18, the camera installation position (imaging position) managing database 16 and the user security policy managing database 52.

[Effect]

The object image displaying system carries out the operations 1, 2, 3" and 4" under the conditions 1 and 2' mentioned above, according to the fifth embodiment of the present invention.

It is assumed that the object is person (user) (condition 1).

Identification of the identified position, at which the object exists, is carried out by the positioning system (includes the position measuring terminal 3 possessed by user and a plurality of position measuring devices 2) and the server 4 (operation 1).

The positioning system carries out the reference point position measuring and then, the server 4 identifies the identified position (operation 2).

The first position measuring device 2 out of a plurality of position measuring devices 2 is installed at the position corresponding to the position at which the first camera 1 out of a plurality of cameras 1 is installed. The second position measuring device 2 out of a plurality of position measuring devices 2 is installed at the position separating from a plurality of positions at which a plurality of cameras 1 are installed. The second camera 1 out of a plurality of cameras 1 is installed at the position separating from the positions at which a plurality of position measuring devices 2 is installed. The first position measuring area, in which the first position measuring device 2 can carry out wireless communication, out of a plurality of position measuring areas, corresponds to the imaging area, which the first camera 1 can image, out of a plurality of imaging areas. Moreover, the imaging area, which the first camera 1 can image, and a plurality of position measuring areas are smaller than the imaging area which the second camera 1 can image (operation 3").

By selecting the installation position of a plurality of cameras 1, the imaging area, which the second camera 1 can image, overlaps with the imaging area which the first camera 1 can image (condition 2').

The control unit 10 selects the camera 1, which user permits in advance and which is the nearest to the identified position (or camera 1 which is the nearest to the identified position and corresponding to the priority level of user), out of a plurality of cameras 1 as the selected camera 1 (operation 4").

As a result, the server 4 selects the selected image data, which is created by the selected camera 1, out of the image data created by a plurality of cameras 1, and makes the display unit 8 display the selected image data. Therefore, according to the object image displaying system of the fifth embodiment of the present invention, it is possible to obtain the same effect as one of the first embodiment of the present invention and to represent precisely even a situation (presence) which cannot be represented by the conventional use of message and memo.

According to the object image displaying system of the fifth embodiment of the present invention, it is possible to display the image data, which agrees with the user's policy and which is created by the selected camera 1, as the presence (selected images data) by the display unit 8. For example, if one person permits to use an enlarged image of his/her own as his/her own presence, it is possible to display the detailed image data of the person as the presence (selected images data) by the display unit 8. On the other hand, if one person does not permit to use an enlarged image of his/her own as his/her own presence, it is possible to display the coarse image data of the person as the presence (selected images data) by the display unit 8.

A Sixth Embodiment of the Present Invention

According to the sixth embodiment of the present invention, an object image displaying system carries out operations 4''', which will be described later, instead of the operations 4", in the fifth embodiment of the present invention. Description of overlapping part of the sixth embodiment of the present invention with the fifth embodiment of the present invention is omitted.

[Configuration]

The control unit 10 selects a camera 1, which a group of users permits in advance and which is the nearest to the identified position (or camera 1 which is the nearest to the identified position and corresponding to priority level of user), out of a plurality of cameras 1 as the selected camera 1. That is, the group of users exists in the same imaging area, and the smallest imaging area (or imaging area corresponding to the priority level) out of the imaging areas is selected (operation 4''').

[Operation]

An operation of the object image displaying system will be described in the following, according to the sixth embodiment of the present invention. Here, it is exemplified that the user information of user is "00".

First, the position information storing process (refer to FIG. 8) and the camera image storing process (refer to FIG. 9) are carried out. Next, a presence storing process is carried out.

FIG. 26 is a flowchart showing the presence storing process.

The selecting part 32 of the control unit 10 retrieves the specific position information which is associated with the user information "00", with reference to the user position managing database 18. The selecting unit 32 reads the specific position information from the user position managing database 18.

Here, the selecting part 32 retrieves a group of user information which is associated with the specific position information, with reference to the user position managing database 18. The selecting part 32 reads the group of user information from the user position managing database 18. In case that a plurality of objects, a plurality of position measuring terminals 3 and a plurality of users exist, the group of users possess the group of position measuring terminals. The group of user information represents the group of users. The group of user information includes the user information "00" or the like and the identified position (specific position information) is identified as the position at which the group of users exists.

The selecting part 32 selects a group of security policy information, which corresponds to the group of user information, out of a plurality of security policy information, with reference to the user security policy managing database 52. The selecting part 32 reads the group of security policy information from the user security policy managing database 52.

The selecting part 32 selects position information, which corresponds to the specific position information, out of a plurality of position information as a group of candidate position information, with reference to the camera installation position (imaging position) managing database 16. The selecting part 32 selects camera information, which corresponds to the group of candidate position information, as a group of candidate camera information out of plural camera information (camera 1), with reference to the camera installation position (imaging position) managing database 16. The selecting part 32 reads the group of candidate position information and the group of candidate camera information from the camera installation position (imaging position) managing database 16.

The selecting part 32 carries out a most preferable camera deciding process by use of the specific position information, the group of security policy information, the group of candidate position information and the group of candidate camera information.

In the most preferable camera deciding process, the selecting part 32 of the control unit 10 examines whether the group of candidate camera information includes a group of security policy information. That is, the selecting part 32 examines whether the group of candidate camera information includes a group of permitted camera information representing a group of permitted cameras 1 which user, who sets the security policy with the highest priority level out of the group of security policy, permits in advance. Specifically, the selecting part 32 examines whether the group of candidate camera information includes the group of permitted camera information representing the group of permitted camera 1 which all users, who exist at the identified position, permit.

In case that the group of candidate camera information includes the group of permitted camera information, the selecting part 32 of the control unit 10 selects the group of permitted camera information out of the group of candidate camera information. Next, the selecting part 32 examines whether the group of permitted camera information includes camera information representing a first camera 1 (first camera information) and camera information representing a second camera 1 (the second camera information).

In case that the group of permitted camera information includes the first camera information and does not include the second camera information, the selecting part 32 of the control unit 10 selects the first camera information out of the group of permitted camera information as the selected camera information. That is, in case that the first camera 1 is the nearest to the identified position, the first camera information is selected as the selected position information. Here, in case of selecting the camera 1 nearest to the identified position, it is preferable to use the camera information (ID) of the camera installation position (imaging position) managing database 16 which is shown in, for example, FIGS. 18A and 18B.

In case that the group of permitted camera information includes the second camera information and does not include the first camera information, the selecting part 32 of the control unit 10 selects the second camera information out of the group of permitted camera information as the selected camera information. That is, in case that the second camera 1 is the nearest to the identified position, the second camera information is selected as the selected position information. Also in this case, it is preferable to use the camera information (ID) of the camera installation position (imaging position) managing database 16 which is shown in, for example, FIGS. 18A and 18B.

In case that the group of permitted camera information includes both the first camera information and the second camera information, the selecting part 32 of the control unit 10 selects the first camera information out of the group of permitted camera information as the selected camera information. That is, in case that the first camera 1 is the nearest to the identified position, the first camera information is selected as the selected position information. Also in this case, it is preferable to use the camera information (ID) of the camera installation position (imaging position) managing database 16 which is shown in, for example, FIGS. 18A and 18B.

As mentioned above, the selecting part 32 of the control unit 10 selects the camera information representing the camera 1, which is permitted by whole of the group of users in advance and which is the nearest to the identified position represented by the specific position information, out of a plurality of camera information (camera 1) as the selected camera information (selected camera 1), with reference to the user position managing database 18, the camera installation position (imaging position) managing database 16 and the user security policy managing database 52. That is, the group of users exists in the same imaging area and the smallest imaging area is selected out of the imaging areas.

The selecting part 32 of the control unit 10 selects the image data, which is created by the selected camera 1 represented by the selected camera information, as the selected image data with reference to the camera image managing database 17. The selecting part 32 reads the selected images data from the camera image managing database 17.

The selecting part 32 makes the user presence information managing database 19 store the selected images data which is associated with the user information "00".

Next, the display process (refer to FIG. 11) is carried out.

[Effect]

The object image displaying system carries out the operations 1, 2, 3" and 4'" under the conditions 1 and 2' mentioned above, according to the sixth embodiment of the present invention.

It is assumed that the object is person (user) (condition

Identification of the identified position, at which the object exists, is carried out by the positioning system (includes the position measuring terminal 3 possessed by user and a plurality of position measuring devices 2) and the server 4 (operation 1).

The positioning system carries out the reference point position measuring and then, the server 4 identifies the identified position (operation 2).

The first position measuring device 2 out of a plurality of position measuring devices 2 is installed at the position corresponding to the position at which the first camera 1 out of a plurality of cameras 1 is installed. The second position measuring device 2 out of a plurality of position measuring devices 2 is installed at the position separating from a plurality of positions at which a plurality of cameras 1 are installed. The second camera 1 out of a plurality of cameras 1 is installed at the position separating from the positions at which a plurality of position measuring devices 2 is installed. The first position measuring area, in which the first position measuring device 2 can carry out wireless communication, out of a plurality of position measuring areas, corresponds to the imaging area, which the first camera 1 can image, out of a plurality of imaging areas. Moreover, the imaging area, which the first camera 1 can image, and a plurality of position measuring areas are smaller than the imaging area which the second camera 1 can image (operation 3").

By selecting the installation positions of a plurality of cameras 1, the imaging area, which the second camera 1 can image, overlaps with the imaging area which the first camera 1 can image (condition 2').

The control unit 10 selects the camera 1, which whole of the group of users permit in advance and which is the nearest to the identified position (or camera 1 which is the nearest to the identified position and corresponding to the priority level of user), out of a plurality of cameras 1 as the selected camera 1. That is, the group of users exists in the same imaging area and the smallest imaging area (or the imaging area corresponding to the priority level of user) is selected out of the imaging area (Operation 4'").

As a result, the server 4 selects the selected image data created by the selected camera 1 out of the image data created by a plurality of cameras 1, and makes the display unit 8 display the selected image data. Therefore, according to the object image displaying system of the sixth embodiment of the present invention, it is possible to obtain the same effect as that of the first embodiment of the present invention and to represent precisely even a situation (presence) which cannot be represented by the conventional use of message and memo.

According to the object image displaying system of the sixth embodiment of the present invention, it is possible to make the display unit 8 display the image data, which is created by the selected camera 1 to be used for the presence of the other person and which agrees with all user's policies, as the presence (selected images data). For example, it is assumed that user A permits use of an enlarged image data, in which user A is imaged, as the presence, and user B does not permit use of an enlarged image data, in which user B is imaged, as the presence. Even if user B is near user A, it is possible to prevent the display unit 8 from displaying a detailed image data (selected image data) which includes also user B as the presence of the user A.

A Seventh Embodiment of the Present Invention

According to the seventh embodiment of the present invention, an object image displaying system carries out operations 2" and 3'", which will be described later, instead of the operations 2 and 3, in the first embodiment of the present invention. Description of overlapping part of the seventh embodiment of the present invention with the first embodiment of the present invention is omitted.

[Configuration]

Figure 27:
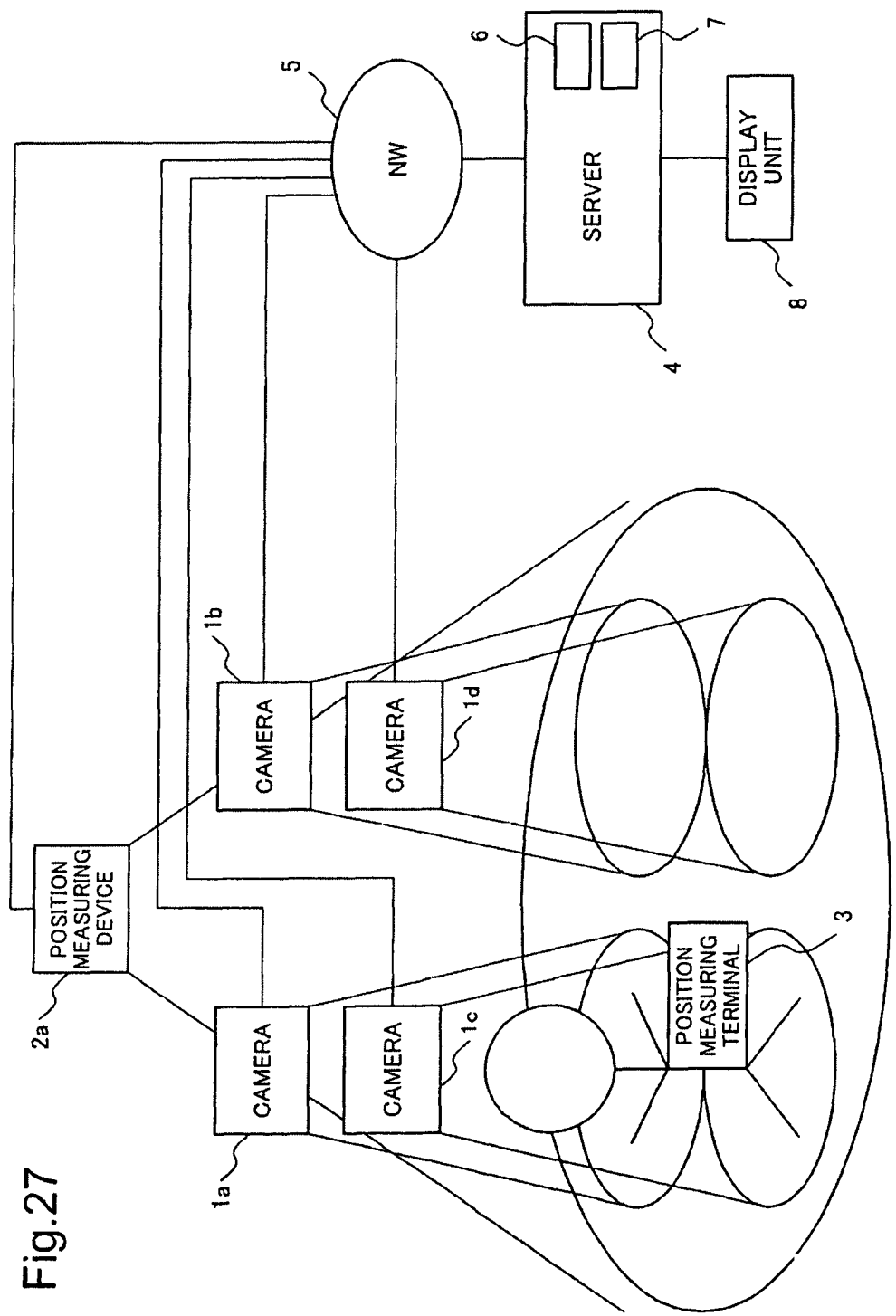
FIG. 27 indicates a configuration of the object image displaying system according to the seventh embodiment of the present invention.

FIG. 27 indicates a configuration of the object displaying system according to the seventh embodiment of the present invention. According to the embodiment of the present invention, the positioning system carries out the reference point position measuring by use of WLAN (Wireless Local Area Network), and then, the server 4 identifies the identified position (operation 2"). A plurality of position measuring devices 2 are installed at positions separating from a plurality of positions at which a plurality of cameras 1 are installed. Since the reference point position measuring by use of WLAN is carried out, a plurality of position measuring areas are larger than a plurality of imaging areas respectively (operation 3'").

For example, a position measuring device 2a out of a plurality of position measuring devices 2 is installed at a position separating from the positions at which cameras 1a, 1b, 1c and 1d out of a plurality of cameras 1 are installed. A position measuring area, in which the position measuring device 2a can carry out wireless communication, out of a plurality of measuring areas, is larger than imaging areas, which the cameras 1a, 1b, 1c and 1d can image, out of a plurality of imaging areas.

[Operation]

An operation of the object image displaying system will be described in the following according to the seventh embodiment of the present invention. Here, it is exemplified that the user information of user is "00".

First, the position information storing process (refer to FIG. 8) and the camera image storing process (refer to FIG. 9) are carried out. Next, a presence storing process is carried out.

FIG. 28 is a flowchart showing the presence storing process.

The selecting part 32 of the control unit 10 retrieves the specific position information which is associated with the user information "00", with reference to the user position managing database 18. The selecting unit 32 reads the specific position information from the user position managing database 18.

The selecting part 32 selects the camera information (cameras 1a, 1b, 1c and 1d), which corresponds to the specific position information, as the selected camera information (selected cameras 1a, 1b, 1c and 1d) out of a plurality of camera information (camera 1) with reference to the camera installation position (imaging position) managing database 16. Here, in case that the reference point position measuring by use of WLAN is carried out, it is preferable to use the camera information (ID) of the camera installation position (imaging position) managing database 16 which is shown in, for example, FIGS. 3B and 3C. The selecting part 32 reads the selected camera information from the camera installation position (imaging position) managing database 16.

The selecting part 32 selects the image data created by the selected cameras 1a, 1b, 1c and 1d, which the selected camera information represents, as a plurality of selected image data with reference to the camera image managing database 17. The selecting part 32 reads a plurality of selected image data from the camera image managing database 17.

As mentioned above, the selecting part 32 selects a plurality of selected image data, which correspond to the identified position, out of the image data created by a plurality of cameras 1.

The selecting part 32 makes the user presence information managing database 19 store a plurality of selected images data which are associated with the user information "00".

Next, the display process (refer to FIG. 11) is carried out.

For example, when the display control part 33 of the control unit 10 is given the user information "00", or the presence storing process has been completed, the display control part 33 of the control unit 10 acquires the selected images data associated with the user information "00", with reference to the user presence information managing database 19.

At this time, the display control part 33 creates a display screen to make the display unit 8 display the user information "00", and at least one or all of the selected images data.

The display control part 33 makes the display unit 8 display the display screen through the display interface 13.

Here, it is assumed that name of user, whose user information is "00", is "Morisaki" (refer to FIG. 5C). Moreover, it is assumed that cameras 1, which image the user and create the selected image data (a first to a fourth selected image data), are installed in "meeting room A" (refer to FIG. 5C).

Figure 29A:
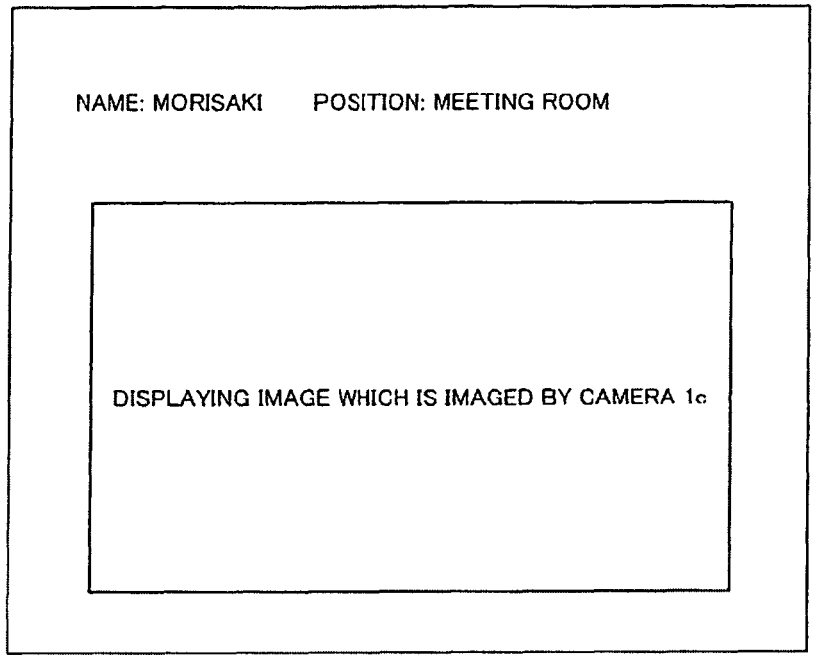
FIG. 29A indicates a display screen of a display unit of the object image displaying system according to the seventh embodiment of the present invention.
Figure 29B:
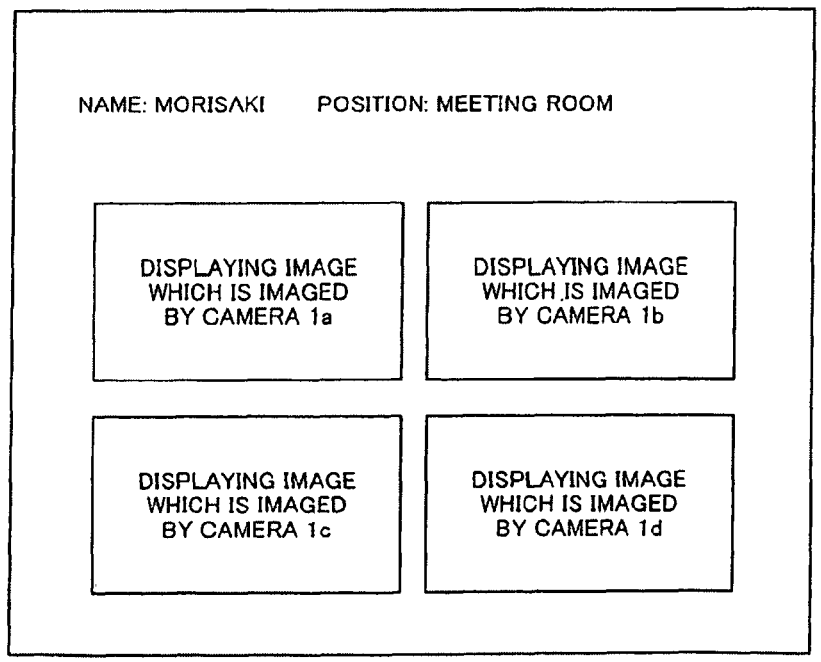
FIG. 29B indicates a display screen of the display unit of the object image displaying system according to the seventh embodiment of the present invention.
Figure 30:
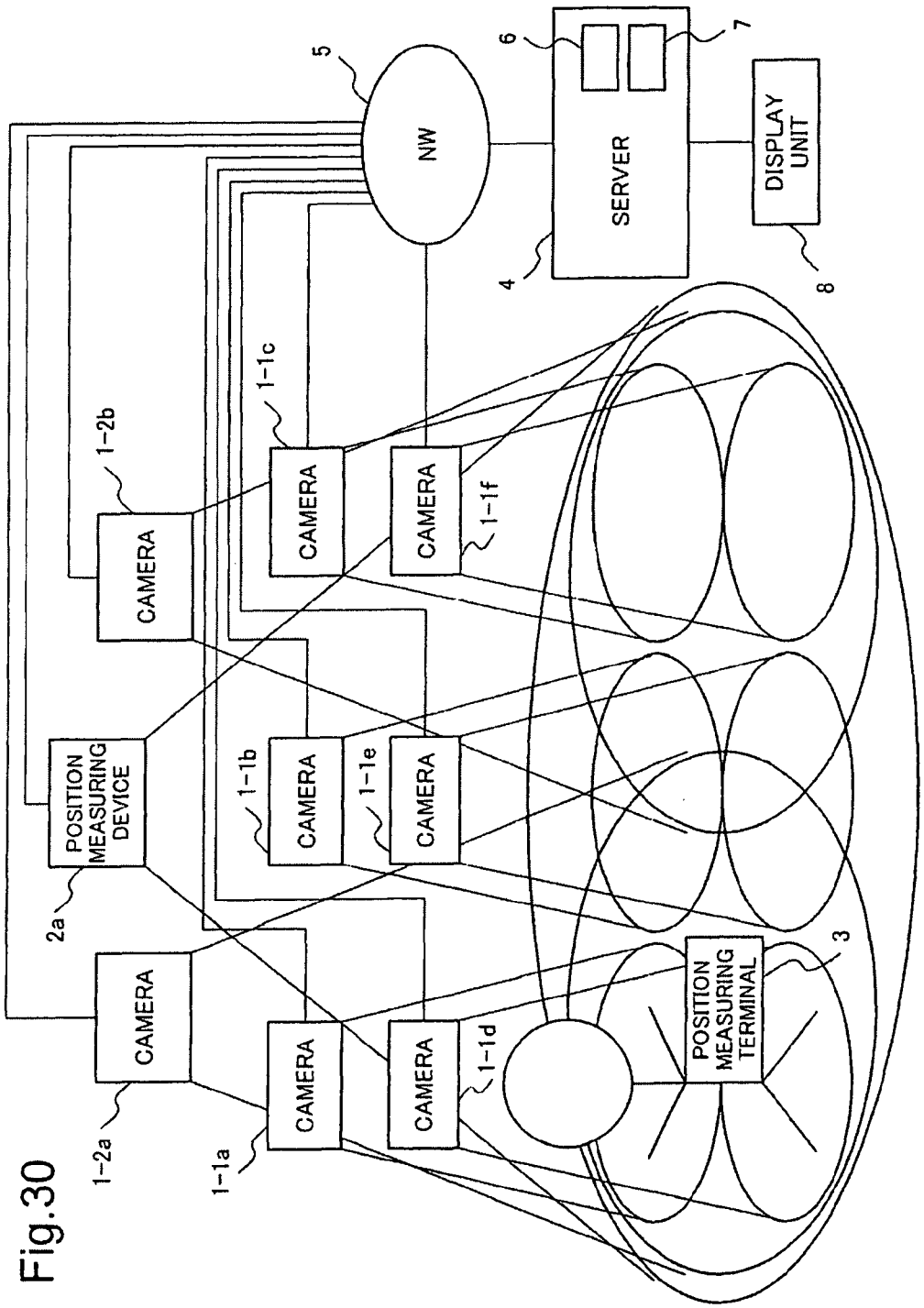
FIG. 30 indicates a configuration of the object image displaying system according to the seventh embodiment of the present invention.

In this case, the display control part 33 of the control unit 10 makes the display unit 8 display one display screen out of the first display screen, the second display screen, the third display screen and the fourth display screen as the display screen, as shown in FIG. 29A. The first display screen includes the first selected image data, which images "meeting room A", the user information "Morisaki" and the installation position of the camera 1a, which creates the first selected image data, that is, "meeting room A". The second display screen includes the second selected image data, which images "meeting room A", the user information "Morisaki" and the installation position of the camera 1b, which creates the second selected image data, that is, "meeting room A". The third display screen includes the third selected image data, which images "meeting room A", the user information "Morisaki" and the installation position of the camera 1c, which creates the third selected image data, that is, "meeting room A". The fourth display screen includes the fourth selected image data, which images "meeting room A", the user information "Morisaki" and the installation position of the camera 1d, which creates the fourth selected image data, that is, "meeting room A".

Moreover, the display control part 33 may make the display unit 8 display the first display screen, the second display screen, the third display screen and the fourth display screen in this order, as the display screen. Here, the display unit 8 may or may not display the installation position of the camera 1, that is, "meeting room A". Any method to select a display screen, for example, selection at random, selection in ascending or descending order of camera information (camera ID) representing the cameras 1a to 1d respectively or selection in order of installation time of the cameras 1a to 1d, is applicable.

Moreover, the display unit 8 may display the first to the fourth selected image data together as the display screen.

Here, number of the selected image data, which the display unit 8 can display, is "1" to "4". In this case, the display screen includes the first to the fourth selected image data in which "meeting room A" is imaged, the user information "Morisaki" and the installation position of the cameras 1a to 1d which create the first to fourth selected images data respectively, that is, "meeting room A". Here, it may be preferable that the display unit 8 does not display the installation position of the camera 1, that is, "meeting room A".

As mentioned above, the display control part 33 of the control unit 10 makes the display unit 8 display at least one or all of the selected image data corresponding to the identified position.

Further, according to the object image displaying system of the seventh embodiment of the present invention, it may be preferable that the condition 2' is applied instead of the condition 2, and the operations 3'''' and 4''' are carried out instead of the operations 3''' and 4.

A plurality of position measuring devices 2 are installed at positions separating from a plurality of positions at which a plurality of cameras 1 are installed. Accordingly, since the reference point position measuring by use of WLAN is carried out, a plurality of position measuring areas are larger than a plurality of imaging areas respectively. In case that a first position measuring device 2 out of a plurality of position measuring devices 2 is installed at a position separating from positions at which a first and a second cameras 1 out of a plurality of cameras 1 are installed, an imaging area, which the first camera 1 can image, is smaller than an imaging area, which the second camera 1 can image, out of a plurality of imaging areas (operation 3'''').

For example, the position measuring device 2a which corresponds to the first position measuring device 2 is installed at a position separating from positions of cameras 1-1a, 1-1b, 1-1c, 1-1d, 1-1e and 1-1f which correspond to the first cameras 1, and positions of cameras 1-2a and 1-2b which correspond to the second cameras 1. The position measuring area, in which the position measuring device 2a can carry out wireless communication, out of a plurality of measuring areas, is larger than imaging areas, which the cameras 1-1a, 1-1b, 1-1c, 1-1d, 1-1e, 1-1f, 1-2a and 1-2b can image, out of a plurality of imaging areas. Moreover, imaging areas, which the cameras 1-1a, 1-1b, 1-1c, 1-1d, 1-1e and 1-1f can image, are smaller than the imaging area which the cameras 1-2a and 1-2b can image.

By selecting the installation positions of a plurality of cameras 1, the imaging area, which the second camera 1 can image, overlaps with the imaging area which the first camera 1 can image. For example, the imaging area, which the camera 1-2a can image, overlaps with the imaging areas, which the cameras 1-1a and 1-1d can image, and overlaps with a part of the imaging area which the cameras 1-1b and 1-1e can image. Moreover, the imaging area, which the camera 1-2b can image, overlaps with the imaging areas, which the cameras 1-1c and 1-1f can image, and overlaps with a part of the imaging area which the cameras 1-1b and 1-1e can image (condition 2').

The control unit 10 selects a camera 1, which has the largest imaging area and corresponds to the identified position, out of a plurality of cameras 1 as the selected camera 1 (operation 4''').

First, the position information storing process (refer to FIG. 8) and the camera image storing process (refer to FIG. 9) are carried out. Next, the presence storing process (refer to FIG. 28) is carried out.

The selecting part 32 of the control unit 10 retrieves the specific position information which is associated with the user information "00", with reference to the user position managing database 18. The selecting unit 32 reads the specific position information from the user position managing database 18.

The selecting part 32 selects the camera information (cameras 1-2a and 1-2b) representing the camera 1 which have the largest imaging area and correspond to the specific position information, out of plural camera information (camera 1) as the selected camera information (selected cameras 1-2a and 1-2b) with reference to the camera installation position (imaging position) managing database 16. Here, in case that the reference point position measuring by use of WLAN is carried out, it is preferable to use the camera information (ID) of the camera installation position (imaging position) managing database 16 which is shown in, for example, FIGS. 3B and 3C. The selecting part 32 reads the selected camera information from the camera installation position (imaging position) managing database 16.

The selecting part 32 selects the image data created by a plurality of selected cameras 1-2a and 1-2b, which the selected camera information represents, as a plurality of selected image data with reference to the camera image managing database 17. The selecting part 32 reads a plurality of selected image data from the camera image managing database 17.

As mentioned above, the selecting part 32 selects a plurality of selected image data imaged by the cameras 1, which have the largest imaging area and correspond to the identified position, out of the image data created by a plurality of cameras 1.

The selecting part 32 makes the user presence information managing database 19 store a plurality of selected images data associated with the user information "00".

Next, the display process (refer to FIG. 11) is carried out.

Here, it is assumed that name of user, whose user information is "00", is "Morisaki" (refer to FIG. 5C). Furthermore, it is assumed that the installation positions of the cameras 1 which image the user and create the selected image data (a first and a second selected image data) is "meeting room A" (refer to FIG. 5C).

Figure 31A:
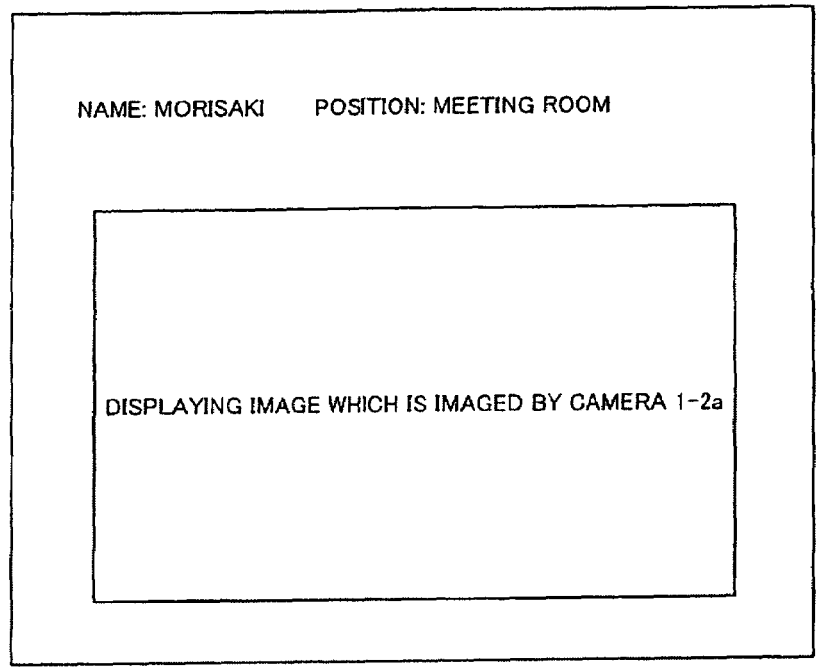
FIG. 31A indicates a display screen of the display unit of the object image displaying system according to the seventh embodiment of the present invention.

In this case, the display control part 33 of the control unit 10 makes the display unit 8 display one display screen out of a first display screen and a second display screen as the display screen, as shown in FIG. 31A. The first display screen includes the first selected image data in which "meeting room A" is imaged, the user information "Morisaki" and the installation position of the cameras 1-2a which creates the first selected images data, that is "meeting room A". The second display screen includes the second selected image data in which "meeting room A" is imaged, the user information "Morisaki" and the installation position of the cameras 1-2b which creates the second selected image data, that is "meeting room A".

Moreover, it may be preferable that the display control part 33 makes the display unit 8 display the first display screen and the second display in this order.

Here, it may be preferable that the installation position of the camera 1, that is, "meeting room A" is not displayed by the display unit 8.

Any method to select a display screen, for example, selection at random, selection in ascending or descending order of camera information (camera ID) representing the cameras 1-2a to 1-2b respectively or selection in order of installation time of the cameras 1-2a to 1-2b, is applicable.

Figure 31B:
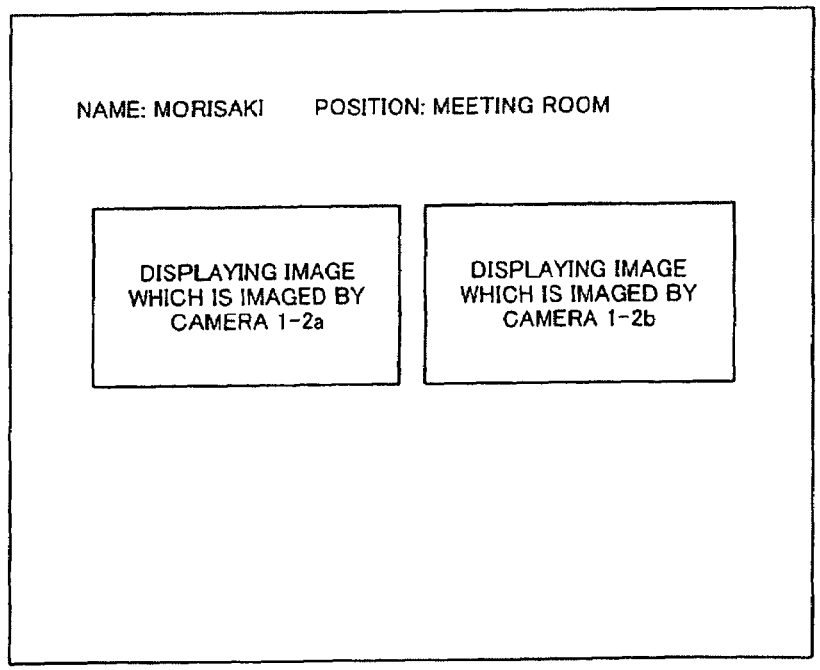
FIG. 31B indicates a display screen of the display unit of the object image displaying system according to the seventh embodiment of the present invention.

Moreover, as shown in FIG. 31B, the display unit 8 may display the first and the second selected image data not respectively but together as the display screen. Here, number of the selected image data which the display unit 8 can display is "1" to "4". In this case, the display screen includes the first and the second selected image data in which "meeting room A" is imaged, the user information "Morisaki" and the installation positions of the cameras 1-2a and 1-2b which create the first and the second selected image data respectively, that is, "meeting room A". Here, it may be preferable that the installation position of the camera 1, that is, "meeting room A" is not displayed by the display unit 8.

[Effect]

The object image displaying system carries out the operations 1, 2", 3'" and 4 under the conditions 1 and 2 mentioned above, according to the seventh embodiment of the present invention.

It is assumed that the object is person (user) (condition 1).

Identification of the identified position, at which the object exists, is carried out by the positioning system (includes the position measuring terminal 3 possessed by user and a plurality of position measuring devices 2) and the server 4 (operation 1).

The positioning system carries out the reference point position measuring by use of WLAN (Wireless Local Area Network) and the server 4 identifies the identified position (operation 2").

A plurality of position measuring devices 2 are installed at positions separating from a plurality of positions at which a plurality of cameras 1 are installed. Accordingly, since the reference point position measuring by use of WLAN is carried out, a plurality of position measuring areas are larger than a plurality of imaging areas respectively (operation 3'").

By selecting the installation positions of a plurality of cameras 1, a plurality of imaging areas do not overlap each other (the condition 2).

The control unit 10 selects the camera 1 corresponding to the identified position as the selected camera 1 out of a plurality of cameras 1 (operation 4).

Or the object image displaying system carries out the operations 1, 2", 3"" and 4'" under the conditions 1 and 2' mentioned above, according to the seventh embodiment of the present invention. That is, the condition 2' is applied instead of the condition 2, and operations 3"" and 4'" are carried out instead of operations 3'" and 4.

A plurality of position measuring devices 2 are installed at positions separating from a plurality of positions at which a plurality of cameras 1 are installed. Accordingly, since the reference point position measuring by use of WLAN is carried out, a plurality of position measuring areas are larger than a plurality of imaging areas respectively. In case that the first position measuring device 2 out of a plurality of position measuring devices 2 is installed at a position separating from the positions at which the first and the second cameras 1 out of a plurality of cameras 1 are installed, the imaging area, which the first camera 1 can image, out of a plurality of imaging areas, is smaller than the imaging area which the second camera 1 can image (operation 3"").

By selecting the installation positions of a plurality of cameras 1, the imaging area, which the second camera 1 can image, overlaps with the imaging area which the first camera 1 can image (condition 2').

The control unit 10 selects the camera 1, which has the largest imaging area and corresponds to the identified position, out of a plurality of cameras 1 as the selected camera 1 (operation 4'").

As a result, the server 4 selects the selected image data, which is created by the selected camera 1, out of the image data created by a plurality of cameras 1, and makes the display unit 8 display the selected image data. Therefore, according to the object image displaying system of the seventh embodiment of the present invention, it is possible to obtain the same effect as that of the first embodiment of the present invention and to represent precisely even a situation (presence) which cannot be represented by the conventional use of message and memo.

According to the object image displaying system of the seventh embodiment of the present invention, it is possible to make the display unit 8 display the image data created by the selected camera 1 as the presence (selected images data), even if the position measuring area is larger than the imaging area A Eighth Embodiment of the Present Invention According to the eighth embodiment of the present invention, an object image displaying system carries out operation 1', which will be described later, instead of the operation 1, in the first embodiment of the present invention. Furthermore, the operations 2 and 3 of the first embodiment of the present invention are not carried out. Description of overlapping part of the eighth embodiment of the present invention with the first embodiment of the present invention is omitted.

[Configuration]

Figure 32:
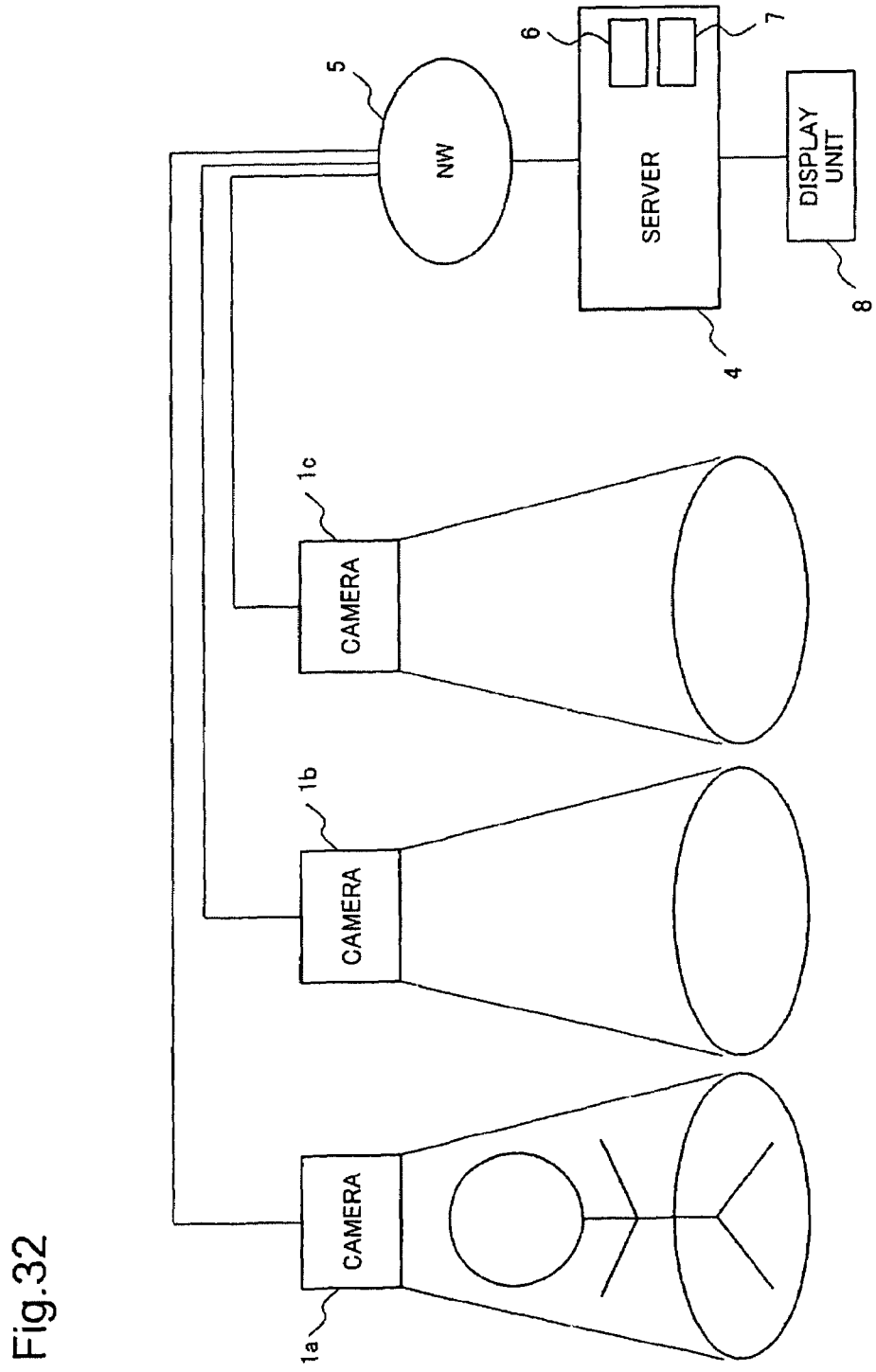
FIG. 32 indicates a configuration of the object image displaying system according to the eighth embodiment of the present invention.

FIG. 32 indicates a configuration of an object image displaying system according to the eighth embodiment of the present invention.

Identification of identified position of the object is carried out by a plurality of cameras 1 installed at a plurality of positions and the server 4. The object (user) is specified in advance, and the server 4 identifies user by use of a face recognizing process (operation 1').

In this case, the object image displaying system does not include the position measuring terminal 3 and a plurality of position measuring devices 2. When a specific camera 1 (for example, camera 1*a*) out of a plurality of cameras 1 images user, the identifying part 31 identifies the specific camera 1*a* with the face recognizing process and identifies also the position, at which the specific camera 1*a* is installed, as the above-mentioned identified position. The selecting part 32 selects the image data created by the specific camera 1*a* as the selected image data.

Figure 33:
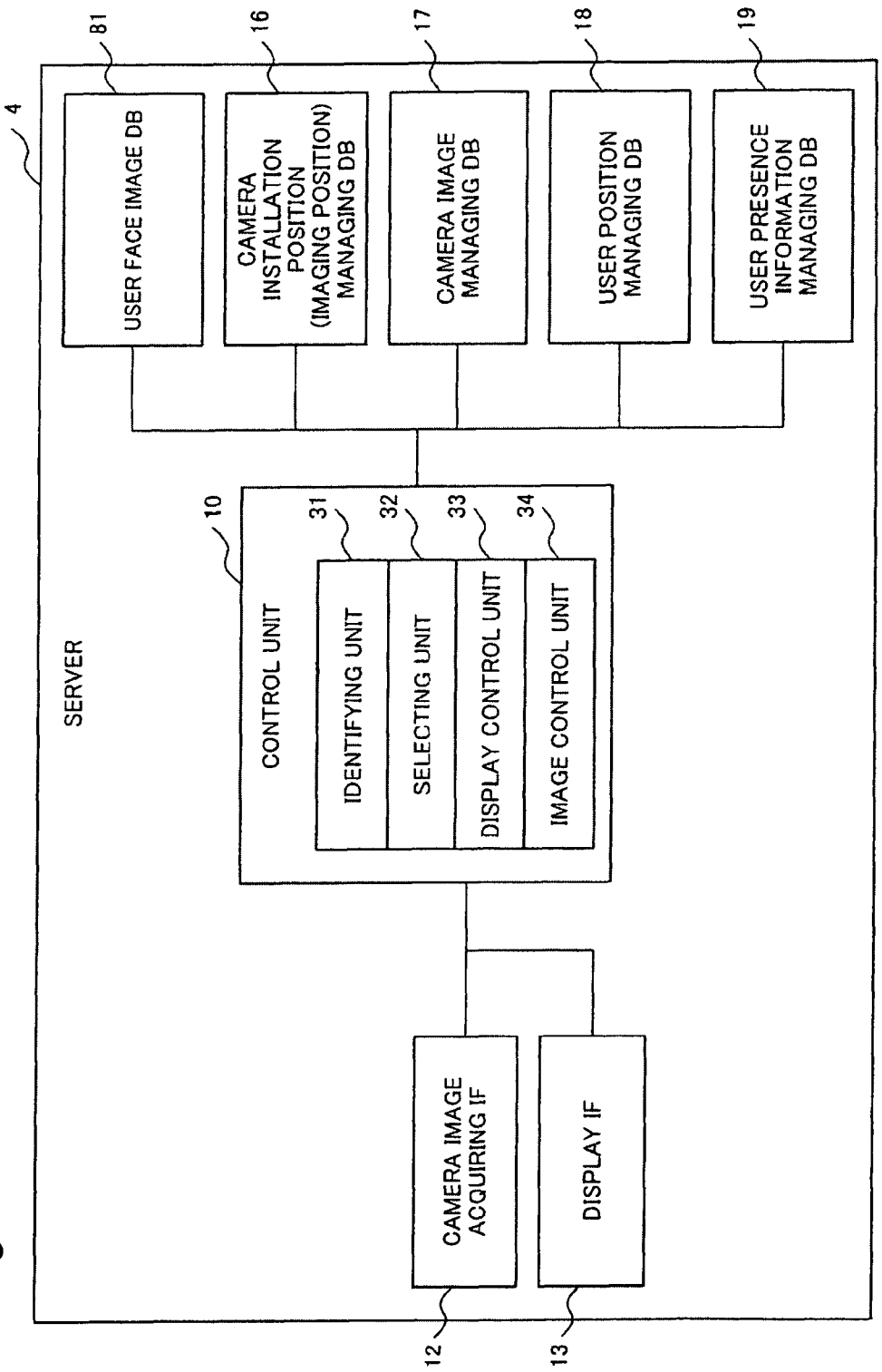
FIG. 33 indicates a configuration of the server of the object image displaying system according to the eighth embodiment of the present invention.

FIG. 33 indicates a configuration of the server 4. Further, the storage unit 7 includes a face image database 81. The server 4 does not include the user position information acquiring interface 11.

FIG. 34 indicates the face image database 81. The face image database 81 stores a plurality of user information representing a plurality of users respectively, and face image data representing face images of a plurality of users in advance.

Figure 35:
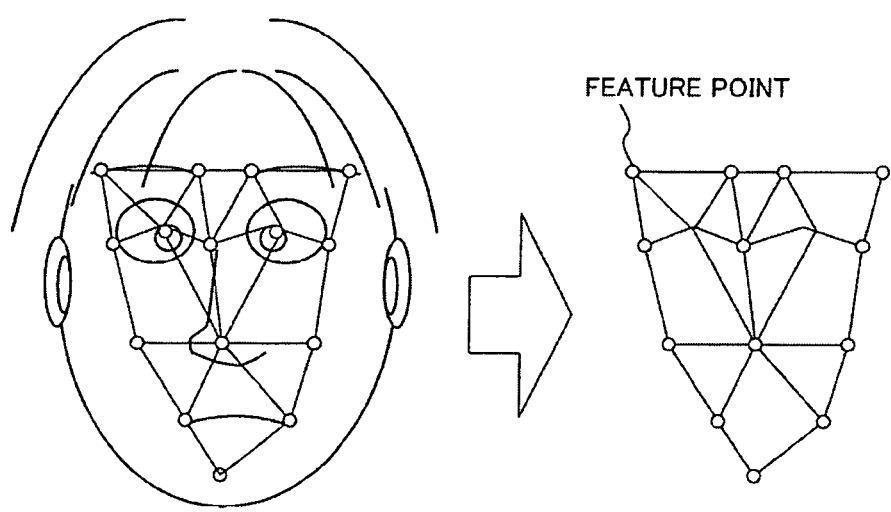
FIG. 35 indicates face image data stored in the face image database of the server of the object image displaying system according to the eighth embodiment of the present invention.

For example, in case that name of user, who is represented by the user information, is "Morisaki" (in case that the user information is ID as mentioned above, the user information is "00"), the face image data is represented in coordinates such as "(0, 0)", "(0, 10)", "(0, 20)" and "(0, 30)". The coordinates represents a facial feature point of user "Morisaki", as shown in FIG. 35.

[Operation]

An operation of the object image displaying system will be described in the following according to the eighth embodiment of the present invention. Here, it is exemplified that the user information of user is "00".

Figure 36:
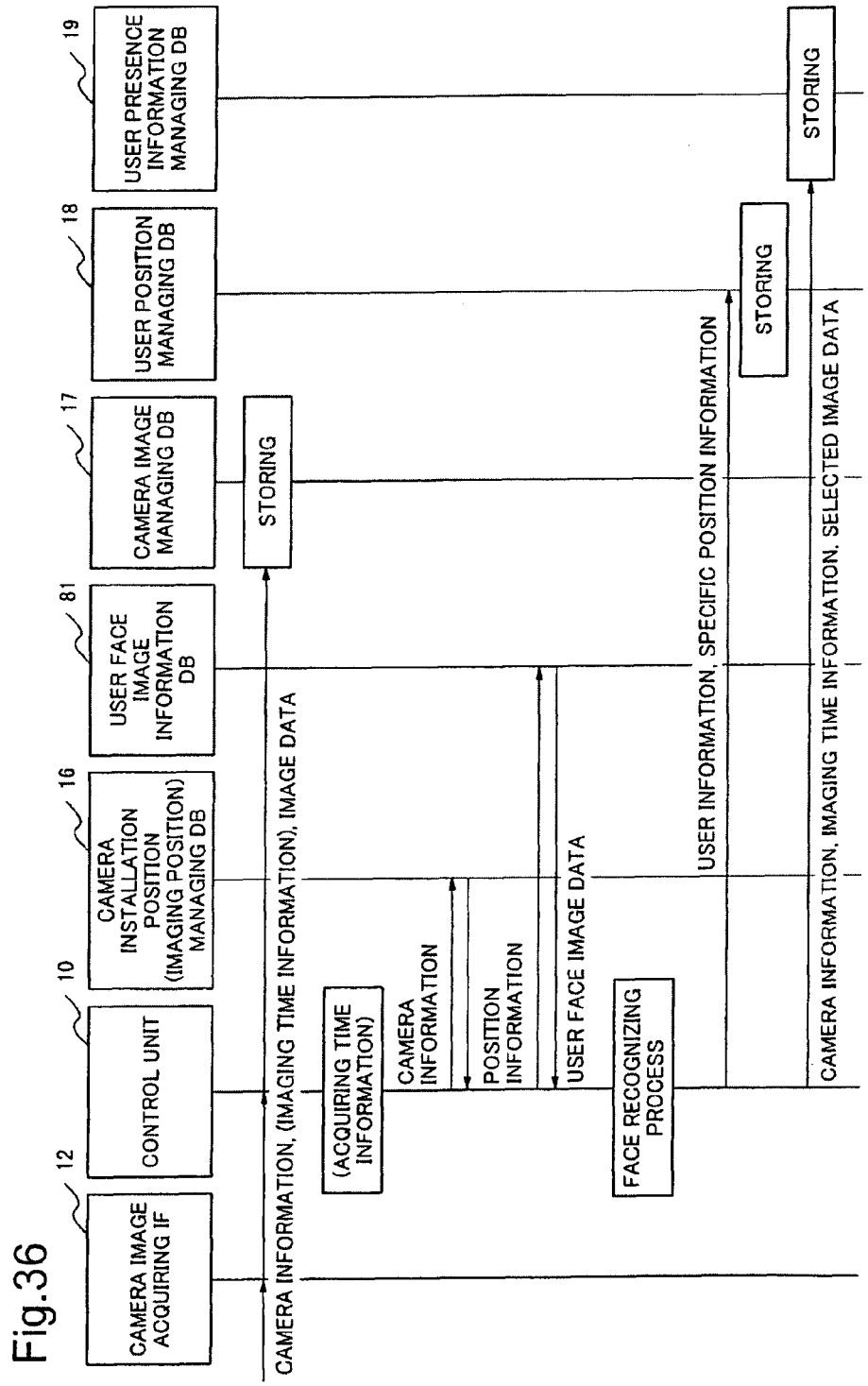
FIG. 36 is a flowchart showing a position information-camera image-presence storing process, as an operation of the object image displaying system according to the eighth embodiment of the present invention.

FIG. 36 is a flowchart showing a position information-camera image-presence storing process.

A plurality of cameras 1 images a plurality of imaging areas respectively and creates the image data representing the image. A plurality of cameras 1 output the camera information representing itself, and the created image data to the control unit 10 through the camera image acquiring interface 12 respectively.

The image control part 34 of the control unit 10 makes the camera image managing database 17 store the image data, which is created by a plurality of cameras 1, associated with a plurality of camera information respectively.

Moreover, the identifying part 31 of the control unit 10 reads a plurality of position information, which corresponds to the camera information (a plurality of camera information) outputted from the plurality of cameras 1, from the camera installation position (imaging position) managing database 16.

The identifying part 31 reads a plurality of user information and a plurality of face image data from the face image database 81.

The identifying part 31 carries out the face recognizing process, in which it is judged whether the images, which are represented by the image data created by a plurality of cameras 1, include any one of face images which a plurality of face image data represent.

In the face recognizing process, the identifying part 31 of the control unit 10 extracts a feature point from the images which the image data created by a plurality of cameras 1 represent. The identifying part 31 judges whether any one of the extracted feature point is identical to the feature point included in a plurality of face image data. Here, because the face recognizing process is publicly well known, detailed description is omitted.

The identifying part 31 identifies a camera 1, which images the image data including the face image data of, for example, user "Morisaki", out of image data created by a plurality of cameras as a specific camera 1*a*. That is, the specific camera 1*a* out of a plurality of cameras 1 creates the image data including the feature point which is identical to the feature point of user "Morisaki".

Accordingly, the identifying part 31 selects the position information, which corresponds to the camera information representing the specific camera 1, out of a plurality of position information as the specific position information. That is, the identifying part 31 identified the position, at which the specific camera 1 is installed, as the identified position.

The selecting part 32 of the control unit 10 selects the image data, which is created by the specific camera 1*a*, as the selected image data out of image data which is created by a plurality of cameras 1. The selecting part 32 selects user information, for example, user information "00", which corresponds to the face image data included in the selected image data, out of a plurality of user information. The selecting part 32 makes the user position managing database 18 store the user information "00" and the specific position information. The selecting part 32 makes the user presence information managing database 19 store the selected image data which is associated with the user information "00".

Next, the display process (refer to FIG. 11) is carried out.

Figure 37:
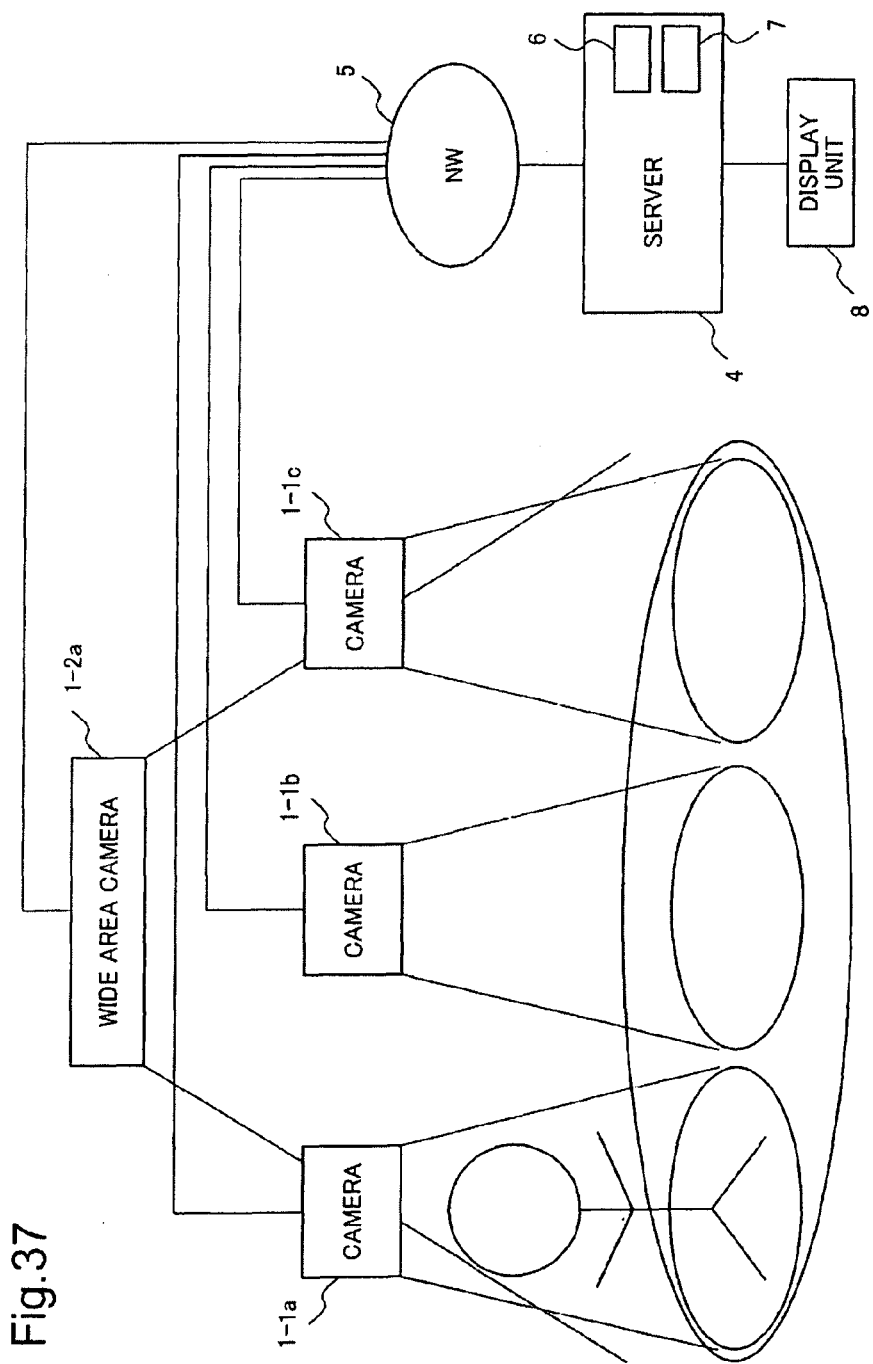
FIG. 37 indicates a configuration of the object image displaying system according to the eighth and the ninth embodiments of the present invention.

Further, according to the object image displaying system of the eighth embodiment of the present invention, the condition 2''' may be applied instead of the condition 2, as shown in FIG. 37.

A group of cameras 1-1*a*, 1-1*b* and 1-1*c* and a wide area camera 1-2*a* out of a plurality of cameras 1 are installed separately each other. The imaging areas, which the group of cameras 1-1a, 1-1b and 1-1c can image, out of a plurality of imaging areas are smaller than an imaging areas which the wide area camera 1-2a can image. By selecting the installation positions of a plurality of cameras 1, the imaging area, which the wide area cameras 1-2a can image, overlaps with the image areas which the group of cameras 1-1a, 1-1b and 1-1c can image (condition 2").

First, the position information-camera image-presence storing process (refer to FIG. 36) is carried out. Here, it is assumed that cameras 1 (specific camera 1) which image the image data including the face image data of user "Morisaki" are the wide area camera 1-2a and one camera 1 out of the group of cameras 1-1a, 1-1b and 1-1c.

The identifying part 31 of the control unit 10 extracts the feature point from the images, which the image data created by the group of cameras 1-1a, 1-1b and 1-1c represent, and judges whether the extracted feature point is identical to the feature point stored in the face image database 81, in the face recognizing process. It is assumed that the above mentioned camera 1, which creates the image data including the feature point identical to the feature point of user, is the specific camera 1 out of the group of cameras 1-1a, 1-1b and 1-1c.

Moreover, it is assumed that, for example, user "Morisaki" moves from the imaging area corresponding to the first camera 1-1a to the imaging area corresponding to the second camera 1-1b. In this case, it is assumed that the first camera 1-1a and the second camera 1-1b create the image data, which includes the face image, in this order as one camera 1. The identifying part 31 identifies the first camera 1-1a to be the specific camera 1 and next, identifies the second camera 1-1b to be the specific camera 1.

Next, the display process (refer to FIG. 11) is carried out.

Figure 38:
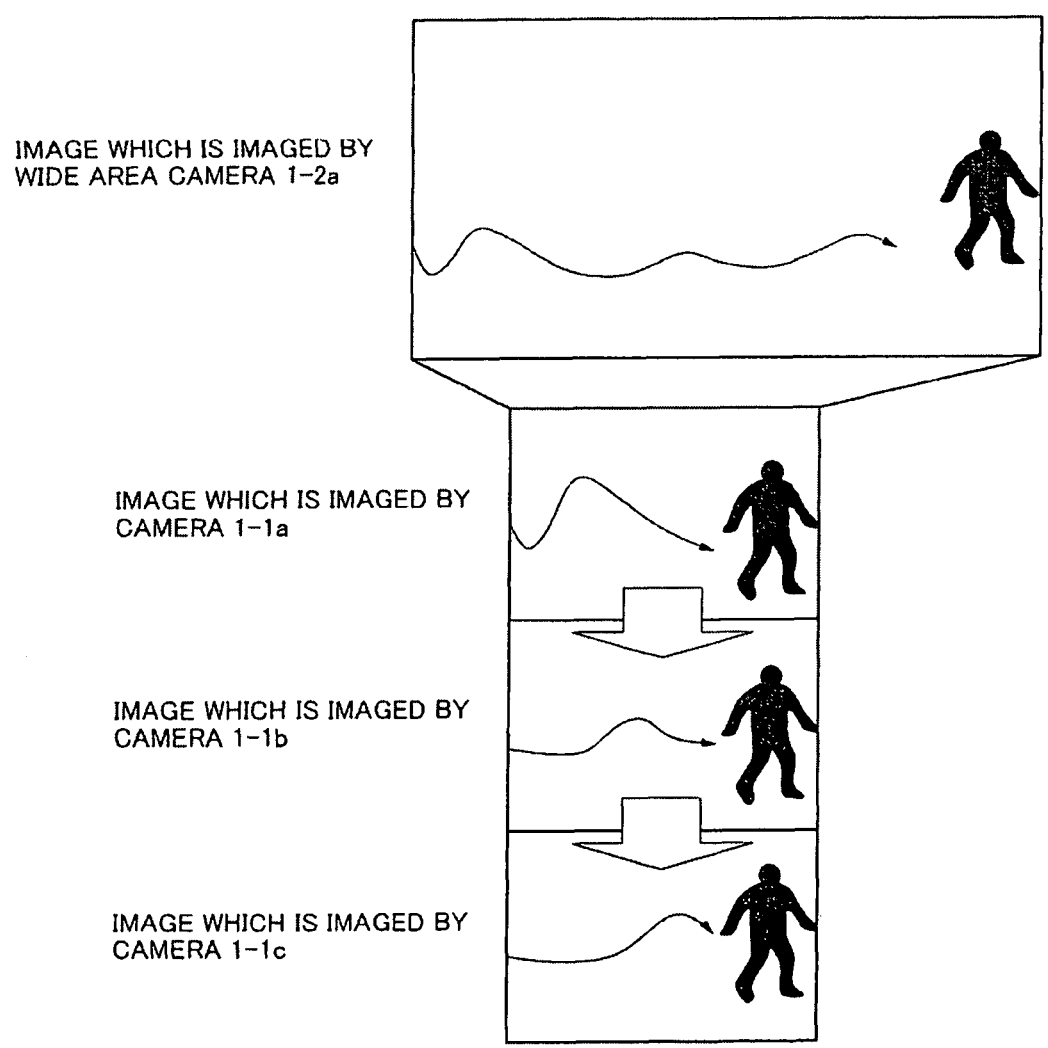
FIG. 38 indicates a display screen of a display unit of the object image displaying system according to the eighth and ninth embodiments of the present invention.

In this case, the display control part 33 of the control unit 10 makes the display unit 8 display the image data, which are created by the first camera 1-1a and the second camera 1-1b, in sequence as the selected images data, as shown in FIG. 38. As a result, user "Morisaki" is displayed by the display unit 8 as a moving object.

The display control unit 33 may make the display unit 8 display the image data created by the wide area camera 1-2a after replacing the selected image data mentioned above, or the display control unit 33 may make the display unit 8 display the image data created by the wide area camera 1-2a together with display of the selected image data mentioned above.

Here, while the identifying part 31 carries out the face recognizing process for the image data created by a plurality of cameras 1, the present invention is not limited to this case. The face recognizing process may be carried out for not all image data created by a plurality of cameras 1 but only image data created by the wide area camera 1-2a.

In case that in the face recognizing process, the face image of, for example, user "Morisaki" is included in the image, which the image data created by the wide area camera 1-2a represents, the identifying part 31 identifies the identified position, based on the position at which the wide area camera 1-2a is installed, and the position at which the face image is included in the image represented by the image data created by the wide area camera 1-2a.

Figure 39:
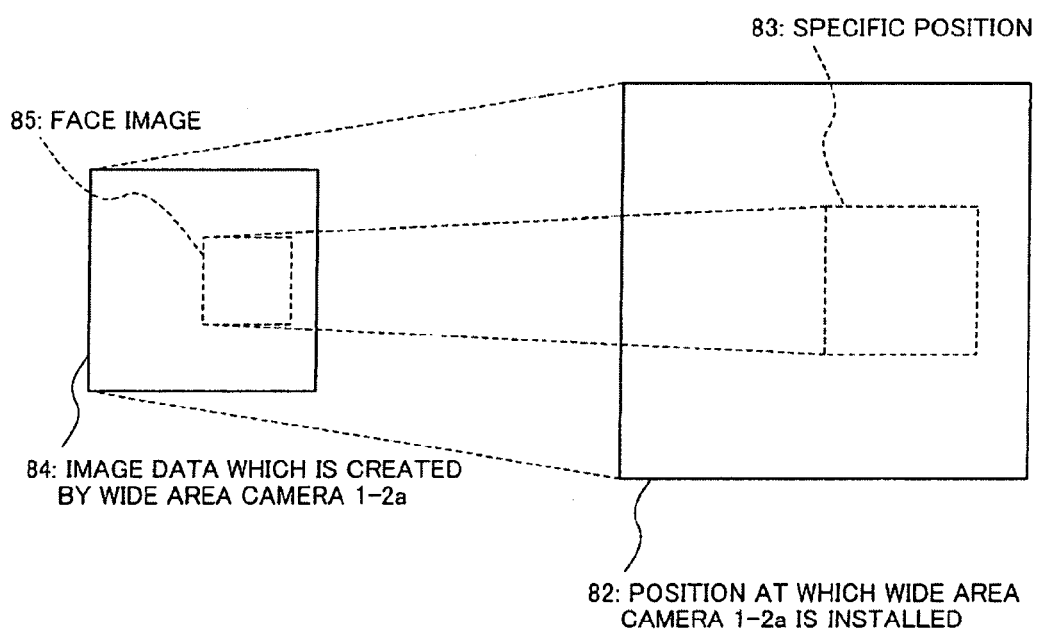
FIG. 39 shows an operation of the object image displaying system according to the eighth embodiment of the present invention.

Specifically, a position 82, at which the wide area camera 1-2a is installed, is associated with image data 84 created by the wide area camera 1-2a, as shown in FIG. 39. In the face recognizing process, a face image 85 of, for example, user "Morisaki" is included in an image which the image data 84 represents. A position, at which the face image 85 is included, in relation to the position 82, is identified as a identified position 83.

The identifying part 31 identifies one camera, which corresponds to the identified position, out of the group of cameras 1-1a, 1-1b and 1-1c as the specific camera 1.

As a result, it is possible to select the specific camera 1 without carrying out the face recognizing process for the image data created by all of the cameras 1.

[Effect]

The object image displaying system carries out the operations 1' and 4 under the conditions 1 and 2 mentioned above, according to the eighth embodiment of the present invention.

It is assumed that the object is person (user) (condition 1).

Identification of the identified position, at which the object exists, is carried out by a plurality of cameras 1 installed at a plurality of positions and the server 4 (operation 1). The object (user) is specified in advance, and the server 4 identifies user by use of the face recognizing process (operation 1').

Identification of identified position of the object is carried out by a plurality of cameras 1 installed at a plurality of positions and the server 4. The object (user) is specified in advance, and the server 4 identifies user by use of a face recognizing process (operation 1').

By selecting the installation positions of a plurality of cameras 1, a plurality of imaging areas do not overlap each other (condition 2).

The control unit 10 selects the camera 1 corresponding to the identified position as the selected camera 1 out of a plurality of cameras 1 (operation 4).

Or the object image displaying system carries out the operation 1' and 4 under the conditions 1 and 2" mentioned above, according to the eighth embodiment of the present invention. That is, the condition 2" is applied instead of the condition 2.

The group of cameras 1-1a, 1-1b and 1-1c and the wide area cameras 1-2a out of a plurality of cameras 1 are installed separately each other. The imaging areas which the group of cameras 1-1a, 1-1b and 1-1c can image, out of a plurality of imaging areas, are smaller than the imaging area which the wide area camera 1-2a can image. By selecting the installation positions of a plurality of cameras 1, the imaging area, which the wide area camera 1-2a can image, overlaps with the imaging areas which the group of cameras 1-1a, 1-1b and 1-1c can image (condition 2").

As a result, the server 4 selects the selected image data created by the selected camera 1 out of the image data created by a plurality of cameras 1, and makes the display unit 8 display the selected image data. Therefore, according to the object image displaying system of the eighth embodiment of the present invention, it is possible to obtain the same effect as that of the first embodiment of the present invention and to represent precisely even a situation (presence) which cannot be represented by the conventional use of message and memo.

According to the object displaying system of the eighth embodiment of the present invention, it is possible for the display unit 8 to display the image data, which is created by the selected camera 1, as the presence (selected image data), with no installation of the position measuring device 2 but installation of the camera 1.

A Ninth Embodiment of the Present Invention

An object image displaying system of the ninth embodiment of the present invention applies a condition 2" instead of the condition 2 and carries out an operation 1″ instead of the operation 1′, in the eighth embodiment of the present invention. Description of overlapping part of the ninth embodiment of the present invention with the eighth embodiment of the present invention is omitted.

[Configuration]

Identification of the identified position of the object is carried out by a plurality of cameras 1, which are installed at a plurality of positions, and the servers 4. The object (user) is unspecified in advance (operation 1″).

In case that user is imaged by a specific camera 1 (for example, camera 1-1a of FIG. 37) out of a plurality of cameras 1, the identifying part 31 identifies a position, at which the specific camera 1-1a is installed, as the identified position mentioned above. The selecting part 32 selects image data created by the specific cameras 1-1a as the selective image data.

As shown in FIG. 37, the group of cameras 1-1a, 1-1b and 1-1c and the wide area camera 1-2a out of a plurality of cameras 1 are installed separately each other. The imaging areas which the group of cameras 1-1a, 1-1b and 1-1c can image, out of a plurality of imaging areas, are smaller than the imaging area which the wide area camera 1-2a can image. By selecting the installation position of a plurality of cameras 1, the imaging area, which the wide area camera 1-2a can image, overlaps with the imaging areas which the group of cameras 1-1a, 1-1b and 1-1c can image (condition 2″).

Figure 40:
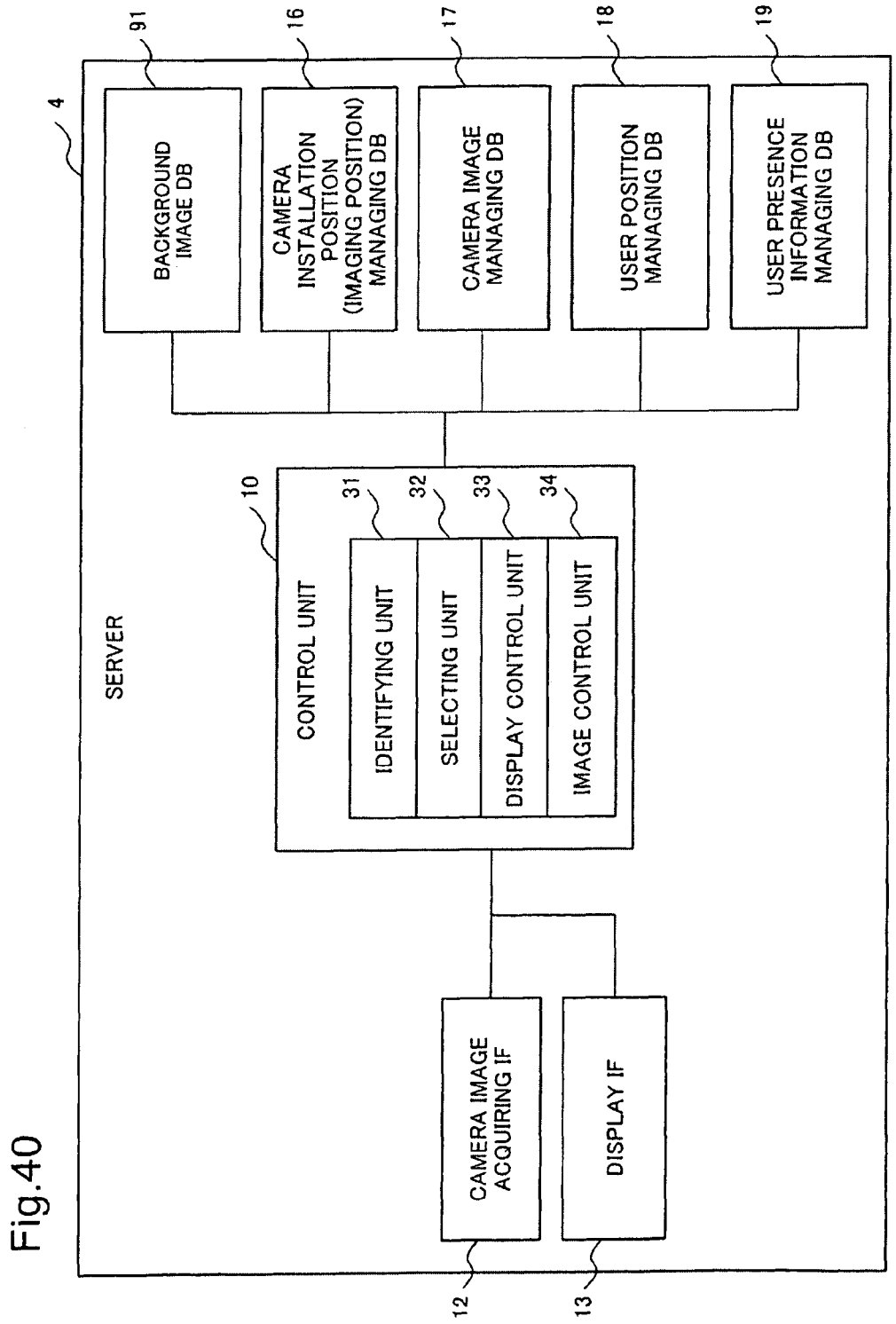
FIG. 40 indicates a configuration of the server of the object image displaying system according to the ninth embodiment of the present invention.

FIG. 40 shows a configuration of the server 4. The storage unit 7 includes a background image database 91 instead of the face image database 81. The background image database 91 stores in advance background image data of images, in which the object does not exist in a plurality of imaging areas.

[Operation]

An operation of the object image displaying system will be described in the following, according to the ninth embodiment of the present invention.

Figure 41:
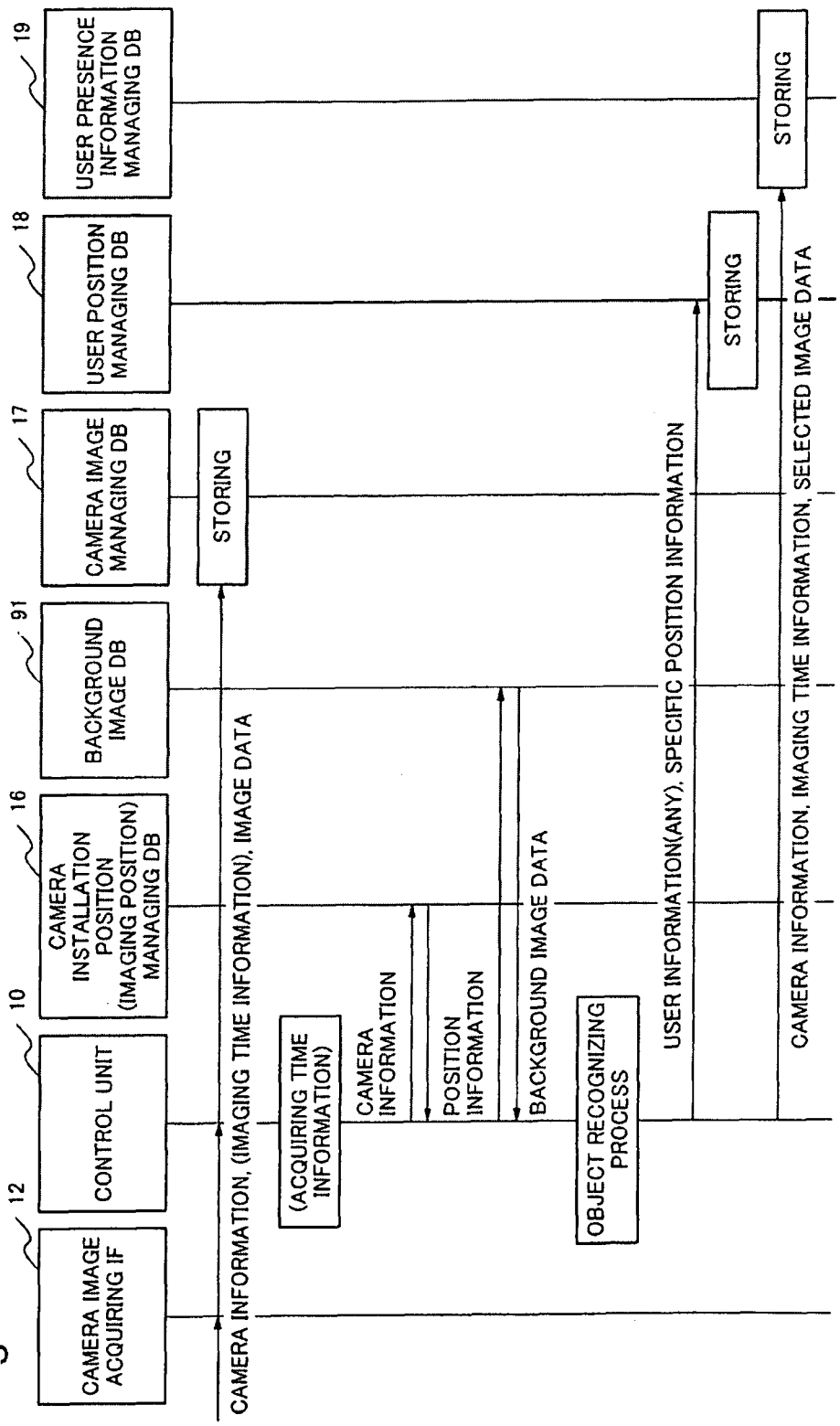
FIG. 41 is a flowchart showing a position information-camera image-presence storing process, as an operation of the object image displaying system according to the ninth embodiment of the present invention.

FIG. 41 is a flowchart showing a position information-camera image-presence storing process.

Here, it is a different point from the eighth embodiment of the present invention that the identifying part 31 does not read a plurality of user information and a plurality of face image data from the face image database 81 but reads the background image data of images of a plurality of imaging area from the background image database 91. Moreover, the identifying part 31 does not carries out the face recognizing process but carries out an object recognizing process. In the object recognizing process, it is judged whether the object is included in images which are represented by the image data created by a plurality of cameras 1.

According to the object recognizing process, the identifying part 31 of the control unit 10 calculates a subtraction between brightness of the image data created by each of a plurality of cameras 1 and brightness of the background image data of the image including no object in each of a plurality of imaging areas. The identifying part 31 identifies a camera 1, whose image has the above mentioned subtraction value not less than a threshold value, as the specific camera 1.

Moreover, it is a different point from the eighth embodiment of the present invention that the selecting part 32 does not select, for example, the user information "00" out of a plurality of user information. In case that information, which represents any name, is defined to be the user information mentioned above, the selecting part 32 makes the user position managing database 18 store the user information (any name) and the specific position information. In this case, the selecting part 32 makes the user presence information managing database 19 store the user information (any name) and the selected image data.

Here, it is assumed that the wide area camera 1-2a and one camera 1 out of the group of cameras 1-1a, 1-1b and 1-1c create the image data including the object.

As the object recognizing process, the identifying part 31 calculates a subtraction between brightness of the image data created by each of a plurality of cameras 1 and brightness of the background image data of the image, which includes no object in each of a plurality of imaging areas, and then, compares the subtraction value with the threshold value. In case that the wide area camera 1-2a and one camera 1 mentioned above have the subtraction value not less than the threshold value, the identifying part 31 identifies the position at which one camera 1 mentioned above is installed, as the identified position. The identifying part 31 identifies one camera 1 mentioned above, which corresponds to the identified position, out of the group of cameras 1-1a, 1-1b and 1-1c as the specific camera 1.

For example, it is assumed that the object (user) moves from an imaging area corresponding to the first camera 1-1a to an imaging area corresponding to the second camera 1-1b. Moreover, it is assumed that at this point of time, the first camera 1-1a and the second camera 1-1b create the image data including the object in this order as the one camera 1. In this case, the identifying part 31 identifies the first camera 1-1a as the specific camera 1 and next, identifies the second camera 1-1b as the specific camera 1.

Next, the display process (refer to FIG. 11) is carried out.

In this case, the display control part 33 of the control unit 10 makes the display unit 8 display the image data, which are created by the first camera 1-1a and the second camera 1-1b, in sequence as the selected image data, as shown in FIG. 38. As a result, the display unit 8 displays the object as a moving object.

The display control unit 33 may make the display unit 8 display the image data created by the wide area cameras 1-2a after replacing the selected image data mentioned above, or the display control unit 33 may make the display unit 8 display the image data created by the wide area cameras 1-2a together with display of the selected image data.

Here, while the identifying part 31 carries out the object recognizing process for the image data created by a plurality of cameras 1, the present invention is not limited to this case. It may be preferable that the object recognizing process is carried out for not all image data created by a plurality of cameras 1 but only image data created by the wide area cameras 1-2a.

In the object recognizing process, the identifying part 31 calculates a subtraction between brightness of the image data created by the wide area camera 1-2a and brightness of the background image data of the image, which includes no object in the imaging area corresponding to the wide area camera 1-2a out of a plurality of imaging areas, and then, compares the subtraction value with the threshold value. In case that as a result of comparison, the subtraction value is not less than the threshold value, the identifying part 31 identifies the identified position, based on the position at which the wide area camera 1-2a is installed, and the position, whose subtraction value is not less than the threshold value, in the image corresponding to the image data created by the wide area camera 1-2a.

Figure 42:
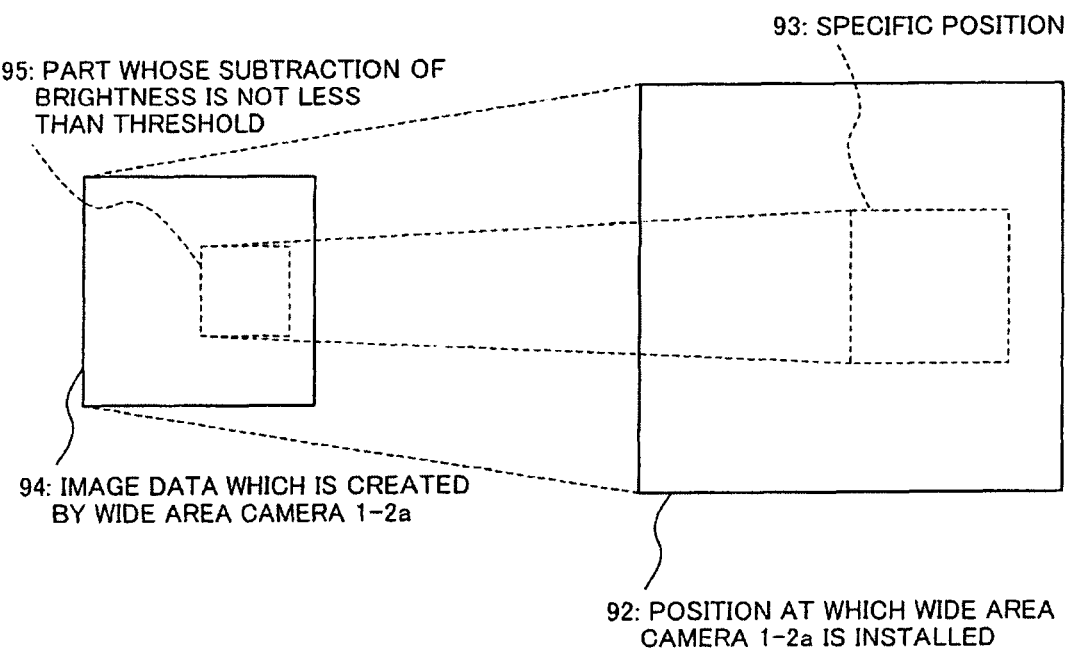
FIG. 42 shows an operation of the object image displaying system according to the ninth embodiment of the present invention.

Specifically, a position 92, at which the wide area camera 1-2a is installed, is associated with an image data 94 created by the wide area camera 1-2a, as shown in FIG. 42. In the object recognizing process, a partial image 95, whose value mentioned above is not smaller than the threshold value, is included in an image which the image data 94 represents. A position, at which the partial image 95 mentioned above is included, in relation to the position 92, is identified as a identified position 93.

The identifying part 31 identifies one camera, which corresponds to the identified position, out of the group of cameras 1-1a, 1-1b and 1-1c, as the specific camera 1.

As a result, it is possible to select the specific camera 1 without carrying out the object recognizing process for the image data which all of the cameras 1 create.

[Effect]

The object image displaying system carries out the operations 1" and 4 under the conditions 1 and 2" mentioned above, according to the ninth embodiment of the present invention.

It is assumed that the object is person (user) (condition 1).

Identification of the identified position, at which the object exists, is carried out by a plurality of cameras 1 installed at a plurality of positions and the server 4. The object (user) is unspecified in advance (operation 1").

The group of cameras 1-1a, 1-1b and 1-1c and the wide area camera 1-2a out of a plurality of cameras 1 are installed separately each other. The imaging areas, which the group of cameras 1-1a, 1-1b and 1-1c can image, out of a plurality of imaging areas, are smaller than the imaging area which the wide area camera 1-2a can image. By selecting the installation positions of a plurality of cameras 1, the imaging area which the wide area camera 1-2a can image, overlaps with the imaging areas which the group of cameras 1-1a, 1-1b and 1-1c can image (condition 2").

The control unit 10 selects the camera 1 corresponding to the identified position as the selected camera 1 out of a plurality of cameras 1 (operation 4).

As a result, the server 4 selects the selected image data created by the selected camera 1 out of the image data created by a plurality of cameras 1, and makes the display unit 8 display the selected image data. Therefore, according to the object image displaying system of the ninth embodiment of the present invention, it is possible to obtain the same effect as that of the first embodiment of the present invention and to represent precisely even a situation (presence) which cannot be represented by the conventional use of message and memo.

According to the object displaying system of the ninth embodiment of the present invention, it is possible for the display unit 8 to display the image data, which is created by the selected camera 1, as the presence (selected image data), with no installation of the position measuring device 2 but installation of the camera 1.

A Tenth Embodiment of the Present Invention

Figure 43:
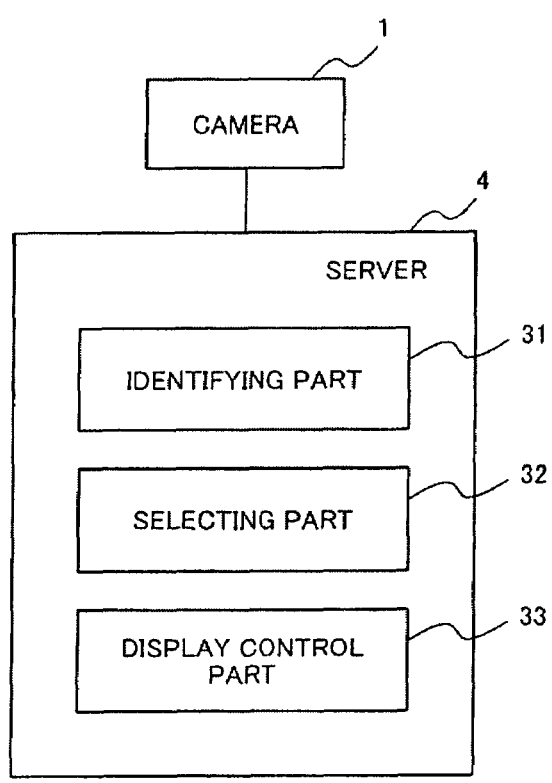
FIG. 43 indicates a configuration of an object image displaying system according to a tenth embodiment of the present invention.

FIG. 43 is a block diagram showing a configuration of an object image displaying system according to the tenth embodiment of the present invention.

The object image displaying system includes a plurality of cameras 1, which image a plurality of imaging areas respectively and create image data representing the image, and the server 4 which is connected to a plurality of cameras 1, according to the tenth embodiment of the present invention. The server 4 includes the identifying part 31, which identifies the position of the object as the identified position, and the selecting part 32 which selects the selected image data corresponding to the identified position out of the image data created by a plurality of cameras. Furthermore, the server 4 includes the display control part 33 which makes the display unit 8 display the selected image data.

Therefore, according to the object image displaying system of the tenth embodiment of the present invention, it is possible to represent precisely even a situation (presence) which cannot be represented by the conventional use of message and memo by virtue of the configuration mentioned above.

The previous description of embodiments is installed to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An object image displaying system, comprising:
    a plurality of cameras which image a plurality of imaging areas respectively and create image data representing said image areas;
    a server which is connected to said plural cameras, wherein said server includes a memory that stores policy information of a person as an object; and
    a positioning system including a position measuring terminal which is installed for said person and a plurality of position measuring devices,
    wherein said server is configured to:
        identify a position at which the person exists as an identified position;
        select selected image data which corresponds to said identified position out of said image data created by said plurality of cameras, wherein the selected image data is selected out of the image data created by a camera identified as permitted by the policy information of the person; and
        control a display unit to display said selected image data as a presence of the person, and
        wherein in case that a plurality of persons have said position measuring terminals respectively and a group of persons out of said plural persons exist at said identified position, said server selects permitted cameras which whole of said group of persons permit in advance out of said plural cameras.

2. The object image displaying system according to claim 1,
    wherein said plural position measuring devices can communicate with said position measuring terminal when said position measuring terminal exists in a plurality of position measuring areas respectively, and
    wherein said server identifies a position of a specific position measuring device as said identified position on the basis of communication between said position measuring terminal and said specific position measuring device when said position measuring terminal exists in a specific position measuring area out of said plural position measuring areas.

3. The object image displaying system according to claim 2,
    wherein each of said plural position measuring devices sends a unique ID, wherein said position measuring terminal receives a unique ID which is sent from said specific position measuring device out of said plural position measuring devices through said communication when said position measuring terminal exists in said specific position measuring area, wherein said server, which is connected to said position measuring terminal via a network, further includes a position identifying database which stores said unique ID sent from each of a plurality of position measuring devices and a plurality of position measuring device position information which represent positions of said plural position measuring devices respectively, and wherein said server identifies a position of said position measuring terminal as position of said specific position measuring device that corresponds to said unique ID received by said position measuring terminal out of positions of said plural position measuring devices with reference to said position identifying database as said identified position.

4. The object imaging displaying system according to claim 2, wherein said plural position measuring devices are installed at positions corresponding to a plurality of positions at which said plural cameras are installed respectively, wherein said plural position measuring areas correspond to said plural imaging areas respectively, and wherein said server selects a camera that corresponds to said identified position as a selected camera, and selects said image data that is created by said selected camera as said selected image data.

5. The object image displaying system according to claim 4, wherein said server selects a camera that is the nearest to said identified position out of said plural cameras as said selected camera.

6. The object image displaying system according to claim 4, wherein in case that there are a plurality of said identified positions and said selected image data corresponding to said plural identified positions are created simultaneously, said server controls said display unit to display at least one or all of said selected image data.

7. The object image displaying system according to claim 2, wherein said plural position measuring devices are installed at positions separating from a plurality of positions at which said plural of cameras are installed, wherein said plural position measuring areas are smaller than said plural imaging areas respectively, and wherein said server selects a camera that corresponds to said identified position out of a plurality of cameras as a selected camera and selects said image data that is created by said selected camera as said selected image data.

8. The object image displaying system according to claim 2, wherein said plural position measuring devices are installed at positions corresponding to a plurality of positions at which said plural cameras are installed respectively, wherein said plural position measuring areas correspond to said plural imaging areas respectively, and wherein said server selects a camera that is the nearest to said identified position out of said plural cameras as said selected camera.

9. The object image displaying system according to claim 2, wherein a first position measuring device out of said plural position measuring devices is installed at a position corresponding to a position at which a first camera out of said plural cameras is installed, a second position measuring device out of said plural position measuring devices is installed at a position separating from a plurality of positions at which said plural cameras are installed, a second camera out of said plural cameras is installed at a position separating from positions of said plural position measuring devices, a first position measuring area in which said first position measuring device can communicate out of said plural position measuring areas corresponds to an imaging area that said first camera can image out of said plural imaging areas, wherein an imaging area which said first camera can image and said plural position measuring areas are smaller than an imaging area which said second camera can image, wherein an imaging area which said second camera can image overlaps with an imaging area which said first camera can image, wherein said server selects a camera which is the nearest to said identified position out of said plural cameras as said selected camera and selects said image data which is created by said selected camera as said selected image data, and wherein in case that said first camera is the nearest to said identified position, said first camera is selected as said selected camera, and in case that said second camera is the nearest to said identified position, said second camera is selected as said selected camera.

10. The object image displaying system according to claim 9, wherein said server selects cameras which correspond to said identified position out of said plural cameras as a group of candidate cameras, wherein in case that said first camera is included in said group of candidate cameras and said second camera is not included in said group of candidate cameras, said selecting unit server selects said first camera out of said group of candidate cameras as said selected camera, wherein in case that said second camera is included in said group of candidate cameras and said first camera is not included in said group of candidate camera, said server selects said second camera out of said group of candidate cameras as said selected camera, and wherein in case that both said first camera and said second camera are included in said group of candidate camera, said server selects said first camera out of said group of candidate cameras as said selected camera.

11. The object image displaying system according to claim 9, wherein said person has said position measuring terminal, and wherein said server selects a group of permitted cameras which said person permits in advance out of said plural cameras and selects a camera which is the nearest to said identified position out of said group of permitted cameras as said selected camera.

12. The object image displaying system according to claim 9,
wherein said person has said position measuring terminal,
wherein each of said plural cameras includes a group of permitted cameras to each of which one priority level out of first priority level to last priority level is assigned respectively,
wherein one priority level out of first priority level to last priority level is assigned to said person, and
wherein said server selects cameras which are nearest to said identified position out of said plural cameras as said group of permitted cameras and selects a camera which corresponds to said priority level of said person out of said group of permitted cameras as said selected camera.

13. The object image displaying system according to claim 2,
wherein said plural position measuring devices are installed at positions separating from a plurality of positions at which said plural cameras are installed respectively,
wherein said plural position measuring areas are larger than said plural imaging areas respectively,
wherein said server selects cameras which correspond to said identified position out of said plural cameras as said selected camera and selects said image data which are created by said plural selected cameras as said selected image data respectively, and
wherein said server controls said display unit to display at least one or all of said selected image data.

14. The object image displaying system according to claim 13, wherein WLAN (Wireless Local Area Network) is applied to said communication.

15. The object image displaying system according to claim 2,
wherein said plural position measuring devices are installed at positions separating from a plurality of positions at which said plural cameras are installed respectively,
wherein said plural position measuring areas are larger than said plural imaging areas respectively,
wherein in case that a first position measuring device out of said plural position measuring devices is installed at a position separating from positions at which a first camera and a second camera out of said plural cameras are installed, an imaging area which said first camera can image out of said plural imaging area is smaller than an imaging area which said second camera can image,
wherein an imaging area which said second camera can image overlaps with an imaging area which said first camera can image,
wherein said server selects cameras which have the largest imaging area and correspond to said identified position out of said plural cameras as a selected camera, and selects said image data which are created by a plurality of said selected cameras as said selected image data respectively, and
wherein said server controls said display unit to display at least one or all of said selected images data corresponding to said identified position.

16. The object image displaying system according to claim 1,
wherein said plural cameras are installed at a plurality of positions respectively, wherein in case that a specific camera out of said plural cameras images said person, said server identifies a position at which said specific camera is installed as said identified position, and
wherein said server selects said image data which is created by said specific camera as said selected image data.

17. The object image displaying system according to claim 16,
wherein said server further includes a face image database which stores a face image data representing a face image of said person, and
wherein said server carries out a face recognizing process in which said server judges whether said face image is included in an image which is represented by said image data created by said plural cameras with reference to said face image database and identifies a camera which creates said image data including said face image out of said image data created by said plural cameras as said specific camera.

18. The object image displaying system according to claim 17,
wherein said face image data which said face image database stores represents a feature point of said person as said face image,
wherein in said face recognizing process, said server extracts a feature point from an image which said image data created by said plural cameras represents and judges whether said feature point is identical to a feature point stored in said face image database, and
wherein a camera which creates said image data including said feature point identical to a feature point of said person out of said plural cameras is identified as said specific cameras.

19. The object image displaying system according to claim 17,
wherein a group of cameras out of said plural cameras and a wide area camera are installed separately each other,
wherein imaging areas which said group of cameras can image out of said plural imaging areas are smaller than an imaging area which said wide area camera can image,
wherein an imaging area which said wide area camera can image overlaps with imaging areas which said group of cameras can image,
wherein in case that cameras which create said image data including said face image are said wide area camera and one camera out of said group of cameras, and a first camera and a second camera out of said group of cameras as said one camera create said image data including said face image sequentially in this order, said server identifies firstly said first camera as said specific camera and next, identifies said second camera as said specific camera, and
wherein said image data which are created by said first camera and said second camera are displayed in sequence as said selected image data by said display unit.

20. The object image displaying system according to claim 19,
wherein said server carries out said face recognizing process for said image data created by said wide area camera,
wherein in case that in said face recognizing process, said face image is included in an image which said image data created by said wide area camera represents, said server identifies said identified position, based on a position at which said wide area camera is installed, and a position, at which said face image is included, in an image presented by the image data created by said wide area camera, and wherein said server identifies said one camera out of said group of cameras which correspond to said identified position as said specific camera.

21. The object image displaying system according to claim 16, wherein a group of cameras out of said plural cameras and a wide area camera are installed separately each other, wherein imaging areas which said group of cameras can image out of said plural imaging areas, are smaller than an imaging area which said wide area camera can image, wherein an imaging area which said wide area camera can image overlaps with imaging areas which said group of cameras can image, wherein in case that cameras which create said image data representing an image of said person out of said image data created by said plural cameras are said wide area camera, and a first and a second cameras out of said group of cameras, and said first camera and said second camera create said image data representing an image of said person sequentially in this order, said server identifies firstly said first camera to be said specific camera as one camera out of said group of cameras and next, identifies said second camera to be said specific camera, and wherein said image data created by said first camera and said second camera are displayed sequentially by said display unit as said selected image data.

22. The object image displaying system according to claim 21, wherein said server calculates a subtraction between brightness of said image data created by each of said plural cameras and brightness of background image data of an image which includes no person in each of said plural imaging areas and compares said subtraction value with a threshold value, and wherein in case that said wide area camera and said one camera out of said group of cameras have said subtraction value not less than said threshold value, said server identifies a position at which said one camera is installed as said identified position and identifies said one camera which corresponds to said identified position as said specific camera.

23. The object image displaying system according to claim 21, wherein said server calculates a subtraction between brightness of said image data created by said wide area camera and brightness of background image data of an image which includes no person in an imaging area corresponding to said wide area camera out of a plurality of imaging areas and compares a subtraction value with a threshold value, wherein in case that said subtraction value is not less than said threshold value, said server identifies said identified position, based on a position at which said wide area camera is installed, and a position whose subtraction value is not less than said threshold value in an image corresponding to said image data created by said wide area camera, and wherein said server identifies said one camera out of said group of cameras which correspond to said identified position as said specific camera.

24. A computer system, comprising:
a memory that stores policy information of a person as an object; and
a controller configured to:
acquire image data created on the basis of photographing data corresponding to images of a plurality of imaging area;
identify a position of the person as an identified position;
select selected image data which corresponds to said identified position out of said image data created by said plurality of cameras, wherein the selected image data is selected out of the image data created by a camera identified as permitted by the policy information of the person; and
control a display unit to display said selected image data as a presence of the person and wherein in case that a plurality of persons have position measuring terminals respectively and a group of persons out of said plural persons exist at said identified position, said controller selects permitted cameras which whole of said group of persons permit in advance out of said plural cameras.

25. A method for displaying an object image, comprising the steps of:
receiving policy information of a person as an object in a memory;
identifying a position of the person as an identified position;
selecting selected image data corresponding to said identified position out of image data created by a plurality of cameras, wherein the selected image data is selected out of the image data created by a camera identified as permitted by the policy information of the person;
displaying said selected image data on a display unit as a presence of the person; and
wherein in case that a plurality of persons have position measuring terminals respectively and a group of persons out of said plural persons exist at said identified position, selecting permitted cameras which whole of said group of persons permit in advance out of said plural cameras.

26. The method for displaying the object image according to claim 25, wherein when a position measuring terminal which said person has exists in a specific position measuring area out of said plural position measuring areas, a position of a specific position measuring device which corresponds to said identified position measuring area out of said plural position measuring devices is identified as said identified position on the basis of communication between said position measuring terminal and said specific position measuring device, in said identifying said identified position.

27. The method for displaying the object image according to claim 26,
wherein each of said plural position measuring devices sends a unique ID,
wherein said position measuring terminal receives a unique ID which is sent from said specific position measuring device out of said plural position measuring devices through said communication when said position measuring terminal exists in said specific position measuring area, and
wherein a position of said position measuring terminal as position of said specific position measuring device which corresponds to said unique ID received by said position measuring terminal out of positions of said plural position measuring devices is identified as said identified position with reference to a position identifying database which stores said unique IDs sent from a plurality of position measuring devices, and a plurality of position measuring device position information representing positions of said plural position measuring devices respectively, in said identifying said identified position.

28. The method for displaying the object image according to claim 26,
wherein said plural position measuring devices are installed at positions corresponding to a plurality of positions at which said plural cameras are installed respectively,
wherein said plural position measuring areas correspond to said plural imaging areas respectively, and
wherein a camera corresponding to said identified position is selected out of said plural cameras as a selected camera, and said image data which is created by said selected camera is selected as said selected image data, in said selecting said selected image data corresponding to said identified position.

29. The method for displaying the object image according to claim 28, wherein a camera which is the nearest to said identified position is selected out of said plural cameras as said selected camera, in said selecting said selected images data corresponding to said identified position.

30. The method for displaying the object image according to claim 28,
wherein said plural position measuring devices are installed at positions corresponding to a plurality of positions at which said plurality of cameras are installed respectively,
wherein said plurality of position measuring areas correspond to said plural imaging areas respectively, and
wherein a camera which is the nearest to said identified position is selected out of said plural cameras as a selected camera, in said selecting said selected image data corresponding to said identified position.

31. The method for displaying the object image according to claim 28, wherein in case that a plurality of persons exist and said selected image data corresponding to said plural persons are created simultaneously, at least one or all of said selected image data is displayed by said display unit, in said displaying said selected image data on a display unit.

32. The method for displaying the object image according to claim 26,
wherein said plural position measuring devices are installed at positions separating from a plurality of positions at which said plural cameras are installed,
wherein said plural position measuring areas are smaller than said plural imaging areas respectively, and wherein
a camera corresponding to said identified position is selected out of said plural cameras as a selected camera, and said image data which is created by said selected camera is selected as said selected image data, in said selecting said selected image data corresponding to said identified position.

33. The method for displaying the object image according to claim 26,
wherein a first position measuring device out of said plural position measuring devices is installed at a position corresponding to a position at which a first camera out of said plural cameras is installed,
wherein a second position measuring device out of said plural position measuring devices is installed at a position separating from a plurality of positions at which said plural cameras are installed,
wherein a second camera out of said plural cameras is installed at a position separating from positions of said plural position measuring devices,
wherein a first position measuring area in which said first position measuring device can communicate, out of said plural position measuring areas, corresponds to an imaging area which said first camera can image out of said plural imaging areas,
wherein an imaging area which said first camera can image, and said plural position measuring areas are smaller than an imaging area which said second camera can image,
wherein an imaging area which said second camera can image overlaps with an imaging area which said first camera can image,
wherein a camera which is the nearest to said identified position is selected out of said plural cameras as said selected camera, and said image data which is created by said selected camera is selected as said selected image data, in said selecting said selected image data corresponding to said identified position, and
wherein in case that said first camera is the nearest to said identified position, said first camera is selected as said selected camera, and in case that said second camera is the nearest to said identified position, said second camera is selected as said selected camera, in said selecting said selected image data corresponding to said identified position.

34. The method for displaying the object image according to claim 33,
wherein cameras which correspond to said identified position are selected out of said plural cameras as a group of candidate cameras, in said selecting said selected images data corresponding to said identified position, and
wherein in case that said first camera is included in said group of candidate cameras and said second camera is not included in said group of candidate cameras, said first camera is selected out of said group of candidate cameras as said selected camera, and in case that said second camera is included in said group of candidate cameras and said first camera is not included in said group of candidate cameras, said second camera is selected out of said group of candidate cameras as said selected camera, and in case that both said first camera and said second camera are included in said group of candidate cameras, said first camera is selected out of said group of candidate cameras as said selected camera, in said selecting said selected images data corresponding to said identified position.

35. The method for displaying the object image according to claim 33,
wherein said person who is near said position measuring terminal, and
wherein a group of permitted cameras which said person permits in advance is selected out of said plural cameras, and a camera which is the nearest to said identified position is selected out of said group of permitted cameras as said selected camera, in said selecting said selected image data corresponding to said identified position.

36. The method for displaying the object image according to claim 33,
- wherein said person has said position measuring terminal,
- wherein each of said plural cameras includes a group of permitted cameras to each of which one priority level out of first priority level to last priority level is assigned,
- wherein one priority level out of first priority level to last priority level is assigned to said person, and
- wherein cameras which are nearest to said identified position are selected out of said plural cameras as said group of permitted cameras, and a camera which corresponds to said priority level of said person is selected out of said group of permitted cameras as said selected camera, in said selecting said selected image data corresponding to said identified position.

37. The method for displaying the object image according to claim 26,
- wherein said plural position measuring devices are installed at positions separating from a plurality of positions at which said plural cameras are installed respectively,
- wherein said plural position measuring areas are larger than said plural imaging areas respectively,
- wherein cameras which correspond to said identified position are selected out of said plural cameras as said selected camera, and said image data which are created by said plural selected cameras are selected as said selected image data respectively, in said selecting said selected image data corresponding to said identified position, and
- wherein at least one or all of said selected image data is displayed by said display unit, in said displaying said selected image data on a display unit.

38. The method for displaying the object image according to claim 37, wherein WLAN (Wireless Local Area Network) is applied to said communication.

39. The method for displaying the object image according to claim 26,
- wherein said plural position measuring devices are installed at positions separating from a plurality of positions at which said plural cameras are installed respectively,
- wherein said plural position measuring areas are larger than said plural imaging areas respectively,
- wherein in case that a first position measuring device out of said plural position measuring devices is installed at a position separating from positions at which a first camera and a second camera out of said plural cameras are installed, an imaging area which said first camera can image out of said plural imaging area, is smaller than an imaging area which said second camera can image,
- wherein an imaging area which said second camera can image overlaps with an imaging area which said first camera can image,
- wherein cameras which have the largest imaging area and correspond to said identified position are selected out of said plural cameras as a selected camera, and said image data which are created by a plurality of said selected cameras are selected as said selected image data respectively, in said selecting said selected image data corresponding to said identified position, and
- wherein at least one or all of said selected image data is displayed by said display unit, in said displaying said selected image data on a display unit.

40. The method for displaying the object image according to claim 25,
- wherein said plural cameras are installed at a plurality of positions respectively,
- wherein in case that a specific camera out of said plural cameras images said person, a position at which said specific camera is installed is identified as said identified position, in said identifying said identified position, and
- wherein said image data which is created by said specific camera is selected as said selected image data, in said selecting said selected image data corresponding to said identified position.

41. The method for displaying the object image according to claim 40,
- wherein a face recognizing process in which it is judged whether a face image is included in images represented by said image data which are created by said plural cameras is carried out with reference to a face image database which stores a face image data representing said face image of said person, and a camera which creates said image data including said face image out of said image data created by said plural cameras is identified as said specific camera, in said identifying said identified position.

42. The method for displaying the object image according to claim 41,
- wherein said face image data which said face image database stores represents a feature point of said person as said face image,
- wherein a feature point is extracted from images which said image data created by said plural cameras represent, and it is judged whether said feature point is identical to a feature point stored in said face image database, in said face recognizing process of said identifying said identified position, and
- wherein a camera which creates said image data including said feature point identical to a feature point of said person is identified out of said plural cameras as said specific camera, in said identifying said identified position.

43. The method for displaying the object image according to claim 41,
- wherein a group of cameras out of said plural cameras and a wide area camera are installed separately each other,
- wherein imaging areas which said group of cameras can image out of said plural imaging areas, are smaller than an imaging area which said wide area camera can image,
- wherein an imaging area which said wide area camera can image overlaps with imaging areas which said group of cameras can image,
- wherein in case that cameras which create said image data including said face image are said wide area camera and one camera out of said group of cameras, and a first camera and a second camera out of said group of cameras as said one camera create said image data including said face image sequentially in this order, firstly said first camera is identified as said specific camera and next, said second camera is identified as said specific camera, in said identifying said identified position, and
- wherein said image data which are created by said first camera and said second camera are displayed in sequence as said selected image data by said display unit.

44. The method for displaying the object image according to claim 43,
wherein in said identifying said identified position, said face recognizing process for said image data created by said wide area camera, is carried out, and in case that in said face recognizing process, said face image is included in an image which said image data created by said wide area camera represents, said identified position is identified, based on a position at which said wide area camera is installed, and a position at which said face image is included in an image represented by the image data created by said wide area camera, and
wherein said one camera out of said group of cameras corresponding to said identified position is identified as said specific camera, in said identifying said identified position.

45. The method for displaying the object image according to claim 40,
wherein a group of cameras out of said plural cameras and a wide area camera are installed separately each other,
wherein imaging areas which said group of cameras can image out of said plural imaging areas, are smaller than an imaging area which said wide area camera can image,
wherein an imaging area which said wide area camera can image overlaps with imaging areas which said group of cameras can image,
wherein in case that cameras which creates said image data representing an image of said person out of said image data created by said plural cameras are said wide area camera, and a first and a second cameras out of said group of cameras, and moreover, said first camera and said second camera create said image data which represents an image of said person sequentially in this order, firstly said first camera out of said group of cameras is identified to be said specific camera as one camera out of said group of cameras and next, said second camera is identified to be said specific camera, in said identifying said identified position, and
wherein said image data created by said first camera and said second camera is displayed sequentially by said display unit as said selected image data.

46. The method for displaying the object image according to claim 45, wherein in said identifying said identified position, a subtraction between brightness of said image data created by each of said plural cameras and brightness of background image data of an image which includes no person in each of said plural imaging areas is calculated and said subtraction value is compared with a threshold value, and in case that said wide area camera and said one camera out of said group of cameras have said subtraction value not less than said threshold value, a position, at which said one camera is installed is identified as said identified position and said one camera which corresponds to said identified position is identified as said specific camera.

47. The method for displaying the object image according to claim 45,
wherein in said identifying said identified position, a subtraction between brightness of said image data created by said wide area camera and brightness of background image data of an image which includes no person in an imaging area corresponding to said wide area camera out of a plurality of imaging areas is calculated and subtraction value is compared with a threshold value, and in case that said subtraction value is not less than said threshold value, said identified position is identified, based on a position at which said wide area camera is installed, and a position, whose said subtraction value is not less than said threshold value, in an image represented by said image data created by said wide area camera, and
wherein said one camera out of said group of cameras which correspond to said identified position is identified as said specific camera.

48. A non-transitory computer readable medium having executable instructions operable to cause an apparatus to:
receive policy information of a person as an object in a memory;
identify a position of the person as an identified position;
select selected image data corresponding to said identified position out of image data created by a plurality of cameras, wherein the selected image data is selected out of the image data created by a camera identified as permitted by the policy information of the person;
display said selected image data on a display unit as a presence of the person; and
wherein in case that a plurality of persons have position measuring terminals respectively and a group of persons out of said plural persons exist at said identified position, select permitted cameras which whole of said group of persons permit in advance out of said plural cameras.

49. A computer system, comprising:
a memory that stores policy information of a person as an object; and
a controller that is configured to
acquire image data corresponding to images of a plurality of imaging areas,
identify a position of the person as an identified position,
select selected image data corresponding to said identified position out of said acquired image data, wherein the selected image data is selected out of the image data created by a camera identified as permitted by the policy information of the person, and
wherein in case that a plurality of persons have position measuring terminals respectively and a group of persons out of said plural persons exist at said identified position, select permitted cameras which whole of said group of persons permit in advance out of said plural cameras.

50. The computer system according to claim 49, wherein the controller controls a display to display said selected image data at the image quality.

51. The computer system according to claim 49, wherein the security policy information is user-determined.

52. The computer system according to claim 51, wherein the security policy information corresponds to a priority level.

53. A non-transitory computer readable medium having executable instructions operable to cause an apparatus to:
acquire image data corresponding to images of a plurality of imaging areas;
identify a position of a person as an identified position;
select selected image data corresponding to said identified position out of said acquired image data, wherein the selected image data is selected out of the image data created by a camera identified as permitted by the policy information of the person; and
wherein in case that a plurality of persons have position measuring terminals respectively and a group of persons out of said plural persons exist at said identified position, select permitted cameras which whole of said group of persons permit in advance out of said plural cameras.

54. The non-transitory computer readable medium according to claim 53, wherein the executable instructions are operable to further cause the apparatus to control a display to display said selected image data at the image quality.

55. The non-transitory computer readable medium according to claim 53, wherein the security policy information is user-determined.

56. The non-transitory computer readable medium according to claim 55, wherein the security policy information corresponds to a priority level.

* * * * *